(12) United States Patent
Bergman et al.

(10) Patent No.: US 8,913,831 B2
(45) Date of Patent: Dec. 16, 2014

(54) PERCEPTUAL SEGMENTATION OF IMAGES

(75) Inventors: Ruth Bergman, Haifa (IL); Hila Nachlieli, Haifa (IL); Gitit Ruckenstein, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 925 days.

(21) Appl. No.: 13/055,118

(22) PCT Filed: Jul. 31, 2008
(Under 37 CFR 1.47)

(86) PCT No.: PCT/US2008/009311
§ 371 (c)(1),
(2), (4) Date: Apr. 19, 2011

(87) PCT Pub. No.: WO2010/014067
PCT Pub. Date: Feb. 4, 2010

(65) Prior Publication Data
US 2012/0033875 A1 Feb. 9, 2012

(51) Int. Cl.
*G06K 9/34* (2006.01)
*G06K 9/46* (2006.01)
*G06T 7/00* (2006.01)

(52) U.S. Cl.
CPC .................................. *G06T 7/0081* (2013.01)
USPC ........................................ 382/173; 382/190

(58) Field of Classification Search
None
See application file for complete search history.

(56) References Cited

U.S. PATENT DOCUMENTS

| 5,748,789 A * | 5/1998 | Lee et al. ...................... 382/243 |
| 5,956,468 A * | 9/1999 | Ancin ............................. 358/1.9 |
| 6,047,085 A * | 4/2000 | Sato et al. ...................... 382/165 |
| 6,075,875 A * | 6/2000 | Gu .................................. 382/107 |
| 6,078,688 A * | 6/2000 | Cox et al. ....................... 382/173 |
| 6,141,433 A * | 10/2000 | Moed et al. ................... 382/103 |
| 6,504,951 B1 * | 1/2003 | Luo et al. ....................... 382/165 |
| 6,545,743 B1 * | 4/2003 | Luo et al. ........................ 355/18 |
| 6,549,660 B1 * | 4/2003 | Lipson et al. ................. 382/224 |
| 6,801,661 B1 * | 10/2004 | Sotak et al. ................... 382/203 |

(Continued)

FOREIGN PATENT DOCUMENTS

| CN | 101162503 A | 4/2008 |
| JP | 2002-216133 | 8/2002 |

(Continued)

OTHER PUBLICATIONS

Deforges, et al, "Supervised Segmentation at low bit rates for region representation & color image compression," IEEE Intl Conf on Multimedia, vol. 1, S, 2002, 665-668.

(Continued)

*Primary Examiner* — Manav Seth

(57) ABSTRACT

Method and system embodiments of the present invention are directed to automated identification of regions within digitally-encoded images that correspond to objects and features of scenes captured in the digitally-encoded images, a process referred to as 'perceptual segmentation' of an image. Regions or segments within an image are first identified by any of various region-identifying or segmentation methods. For each region or segment, features of pixels within the region or segment are employed to compute one or more segment features. The segment features are used, in turn, to identify the region or segment as belonging to a particular type of region or segment, and the region is then accordingly labeled or tagged as a region or segment of the determined type.

11 Claims, 52 Drawing Sheets

(56) References Cited

U.S. PATENT DOCUMENTS

| | | | |
|---|---|---|---|
| 6,928,233 B1* | 8/2005 | Walker et al. | 386/241 |
| 6,993,185 B2* | 1/2006 | Guo et al. | 382/176 |
| 6,996,277 B2* | 2/2006 | Fan | 382/224 |
| 7,103,225 B2* | 9/2006 | Yang et al. | 382/225 |
| 7,106,366 B2* | 9/2006 | Parker et al. | 348/222.1 |
| 7,212,668 B1* | 5/2007 | Luo et al. | 382/165 |
| 7,949,181 B2* | 5/2011 | Padfield et al. | 382/164 |
| 8,098,936 B2* | 1/2012 | Guerzhoy et al. | 382/181 |
| 8,107,726 B2* | 1/2012 | Xu et al. | 382/173 |
| 8,126,244 B2* | 2/2012 | Lu et al. | 382/131 |
| 8,131,077 B2* | 3/2012 | King | 382/173 |
| 8,135,216 B2* | 3/2012 | Piramuthu | 382/173 |
| 8,335,374 B2* | 12/2012 | Boardman | 382/165 |
| 8,428,354 B2* | 4/2013 | Prasad et al. | 382/173 |
| 8,433,101 B2* | 4/2013 | Xu et al. | 382/107 |
| 8,655,093 B2* | 2/2014 | El Dokor et al. | 382/254 |
| 2002/0131641 A1* | 9/2002 | Luo et al. | 382/218 |
| 2003/0108250 A1 | 6/2003 | Luo | |
| 2003/0179931 A1 | 9/2003 | Sun | |
| 2004/0037460 A1 | 2/2004 | Luo | |
| 2004/0091153 A1 | 5/2004 | Nakano | |
| 2008/0089561 A1 | 4/2008 | Zhang | |
| 2008/0247648 A1* | 10/2008 | Piramuthu et al. | 382/173 |
| 2008/0310717 A1* | 12/2008 | Saathoff et al. | 382/173 |
| 2009/0003691 A1* | 1/2009 | Padfield et al. | 382/164 |

FOREIGN PATENT DOCUMENTS

| | | |
|---|---|---|
| JP | 2004-062505 | 2/2004 |
| JP | 2005-107885 | 4/2005 |
| WO | WO 97-48067 | 12/1997 |

OTHER PUBLICATIONS

Garcia-Ugarriza, et al, "Automatic color image segmentation by dynamic region growth & multimodel merging of color and texture information," IEEE, ICASSP 2008, 961-964.

International Search Report for Application No. PCT/US2008/009311 dated Mar. 30, 2009 (11 pages).

* cited by examiner

PERCEPTUAL SEGMENTATION OF IMAGES

TECHNICAL FIELD

The present invention is related to image processing and, in particular, to methods and systems that identify regions of images that correspond to sky, human faces, human skin, foliage, and other such commonly encountered types of regions within images that can be identified by one or more computed metrics or characteristics.

BACKGROUND OF THE INVENTION

Automated image processing has been the subject of extensive research for many decades, and image-processing methods have been widely and advantageously applied to many problem domains. With the advent of inexpensive digital cameras and inexpensive and widely available means for transferring digital images among consumers and for transmitting digital images and video through the Internet to consumers, image-processing components and systems are increasingly frequently included in modern digital cameras, personal computers, workstations, and other consumer electronic devices and systems.

There are many different types of image-processing methods and systems, and image-processing systems vary in complexity and expense, from industrial image-processing systems, executing on large, distributed, high-throughput computer systems, to small collections of image-processing routines executed within hand-held consumer-electronics devices. Many image-processing methods and systems are devoted to rendering, restoration, and enhancement of two-dimensional photographic images and video frames, while other types of image-processing systems are directed to automated recognition of objects and events in digital images and video streams for a wide variety of different purposes, including image and video classification, storage, and retrieval, automated surveillance, automated monitoring and tracking systems, and a variety of other purposes.

In both restoration and enhancement of images and video frames as well as for automated visual systems, a capability for identifying and labeling particular types of regions and features within images is generally useful and can even critical, in certain applications. Many different approaches and methods have been developed, for example, for recognizing human faces in images and regions of images corresponding to sky and other commonly encountered objects and features. As in most computational processes, there are fundamental tradeoffs between computational overhead and processing time for applying image-processing techniques and the correctness, precision, and robustness of automatic region and object identification within images and video frames. In certain cases, high precision and correctness is required, and the time of analysis and processing is of less importance. In such cases, one or more computationally expensive and time-consuming analytical methods can be applied, and the analysis and processing may be repeated and results from different techniques compared and contrasted in order to achieve the greatest possible correctness and precision. In other cases, such as in real-time processing of video frames within consumer-electronics devices, the amount of computational overhead and time that can be devoted to image processing is quite constrained, and a primary goal is to achieve the highest precision and correctness obtainable under severe time and computing constraints. Image-processing researchers, manufacturers and vendors of consumer electronics devices and image-processing systems, and users of consumer electronics devices, and consumers of images and image-related services all recognize the need for continued development of image-processing methods and systems that can improve the correctness and precision of automated object and feature recognition as well as provide automated object and feature recognition in a computationally efficient and time-efficient manner.

SUMMARY OF THE INVENTION

Method and system embodiments of the present invention are directed to automated identification of regions within digitally-encoded images that correspond to objects and features of scenes captured in the digitally-encoded images, a process referred to as "perceptual segmentation" of an image. Regions or segments within an image are first identified by any of various region-identifying or segmentation methods. For each region or segment, features of pixels within the region or segment are employed to compute one or more segment features. The segment features are used, in turn, to identify the region or segment as belonging to a particular type of region or segment, and the region is then accordingly labeled or tagged as a region or segment of the determined type.

DETAILED DESCRIPTION OF THE INVENTION

Figure 1:
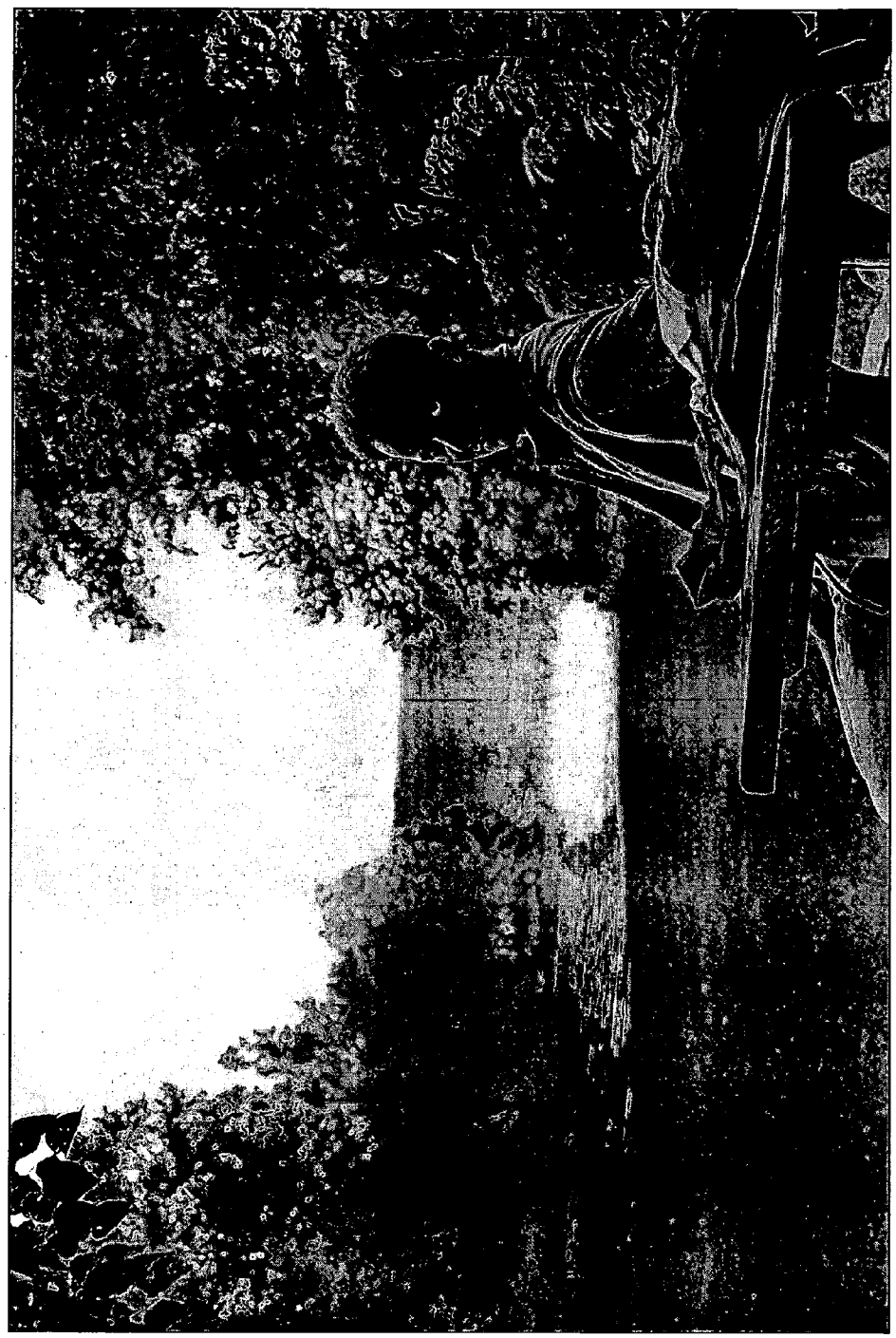
FIGS. 1 and 2 illustrate application of one image-processing method of the present invention.
Figure 2:
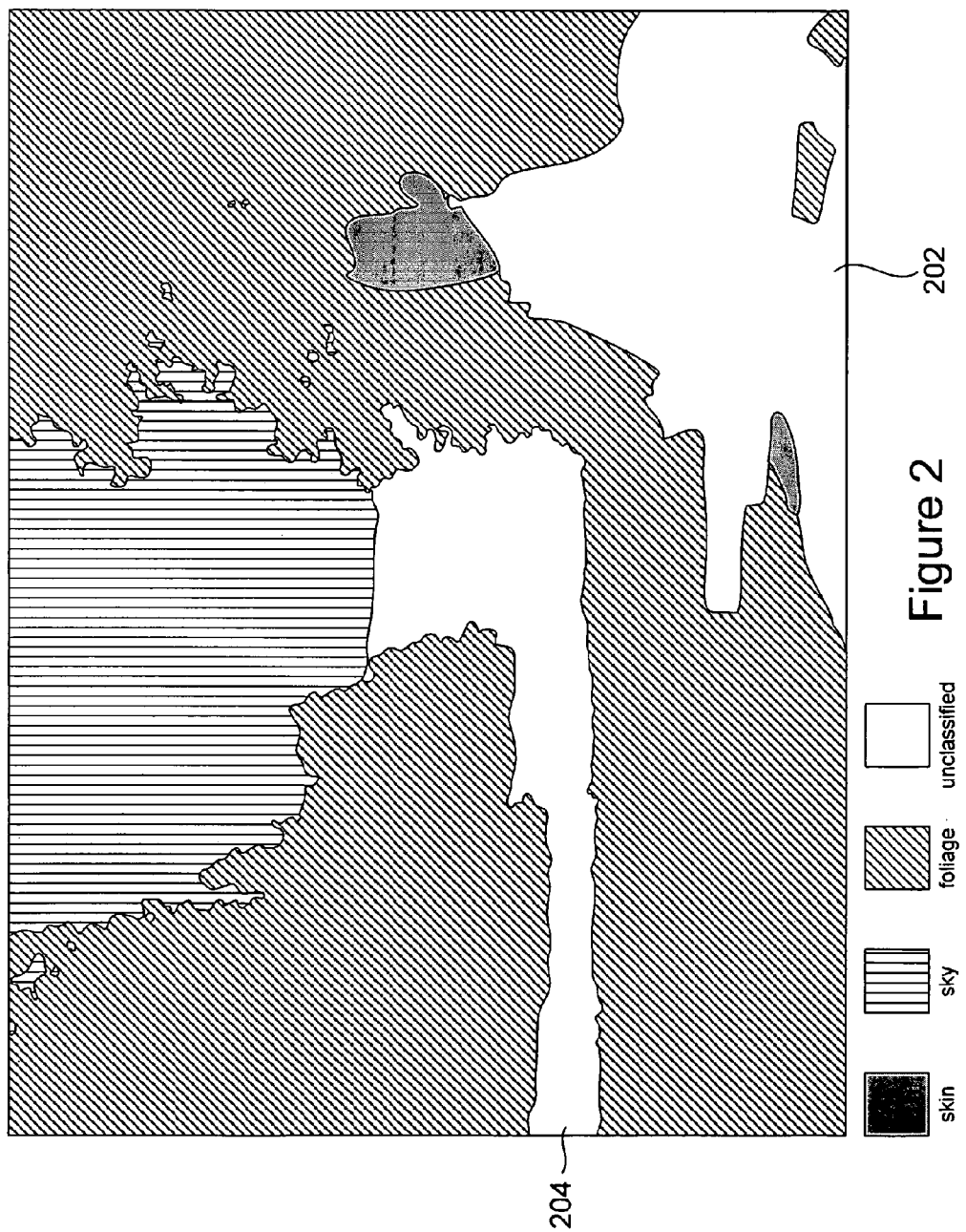

The present invention is directed to recognizing and identifying objects and regions within digitally-encoded images that correspond to particular types of objects and features in scenes captured in the images, including sky, human face, human skin, foliage, and other such objects and regions. FIGS. 1 and 2 illustrate application of one image-processing method of the present invention. FIG. 1 shows a visual rendering of a digitally-encoded photograph of a man sitting on park bench on a lawn near a lake or inlet. FIG. 2 shows classification, or tagging, of regions within the image, shown in FIG. 1, that correspond to skin, sky, and foliage. Regions of the image corresponding to the park bench and the man's clothing 202 and corresponding to water 204 are not classified. However, given appropriate sets of characteristics and methods that employ the sets of characteristics, image regions corresponding to water, clothing, processed wood, and other such objects and features can additionally be classified by extended embodiments of the present invention.

Classification, or tagging, of regions of an image, such as the classification illustrated in FIG. 2, is vital for a wide variety of additional image-processing-related methods as well as for various computer-vision applications and image-categorization applications. For example, the presence of extensive sky and foliage regions in the image shown in FIG. 1 would allow the image to be automatically classified as an outdoor scene. Such classifications are useful in automated storage and retrieval of, and searching for, images and videos. As another example, various image-processing techniques can be employed to enhance digital images for consumers, including sharpening detail, smoothing operations performed to remove noise and image-capture-related aberrations, and other such processing techniques. By properly classifying regions of images as corresponding to skin, sky, and foliage, as shown in FIG. 2, different processing techniques appropriate for particular types of objects and features can be applied to each classified region. For example, many consumers prefer smoothed and blue-color-normalized sky in photographs, but also prefer that foliage regions be sharpened to provide fine, sharp detail. Similarly, many consumers prefer smoothed body-skin and facial-skin regions so that image-capture-related aberrations, including chromatic aberrations, noise, and small details are de-emphasized or removed, while, at the same time, prefer preservation and enhancement of fine details of certain facial features, such as eyes, that provide information about mood and expression. Thus, classification of regions within an image allow for applying region-type-specific image-enhancement methods to those regions. As yet another example, various computer-vision applications may be implemented to recognize people and even particular individuals within images, and such analyses may be facilitated by starting from accurately identified regions of an image corresponding to human faces.

The following discussion is divided into a number of subsections. In a first subsection, one approach to perceptual segmentation of images according to the present invention is outlined, at high level. In a second subsection, an overview of digitally-encoded images and color models is provided. In a third subsection, various mathematical image-processing concepts are introduced. In a fourth subsection, one approach to initial image segmentation is discussed. In a fifth section, characteristics of blue-sky regions in images are discussed, as well as a discussion of general region-type-specific color models. In a sixth section, a detailed discussion of the approach to perceptual segmentation of images according to the present invention, outlined in the first subsection, is provided. In a seventh subsection, a general approach to perceptual segmentation according to the present invention is discussed.

Figure 3:
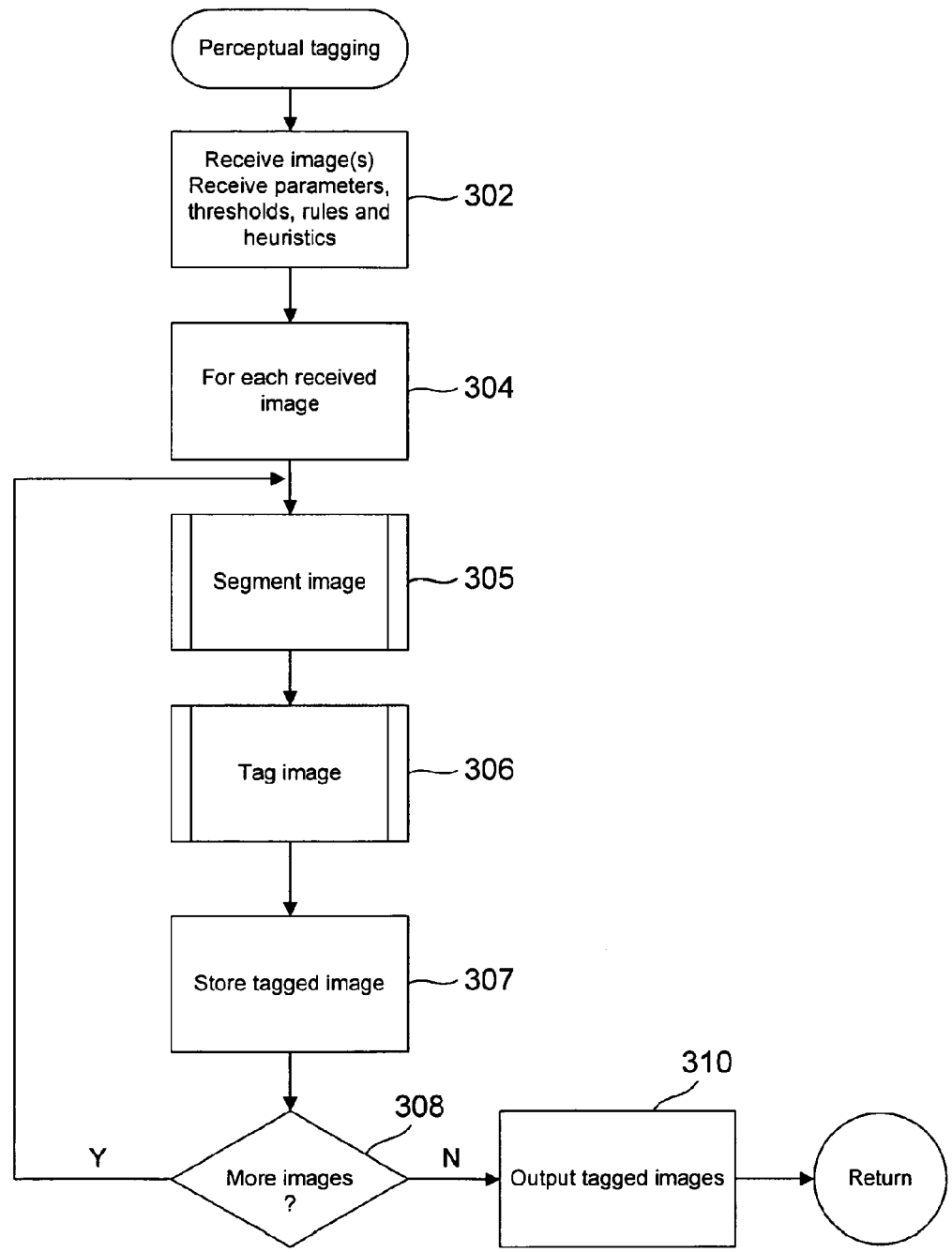
FIG. 3 provides a control-flow diagram illustrating one approach for identifying particular types of regions in images according to one embodiment of the present invention.

Outline of One Approach to Perceptual Segmentation of Images According to the Present Invention FIG. 3 provides a control-flow diagram illustrating one approach for identifying particular types of regions in images according to one embodiment of the present invention. As should be obvious to those familiar with automation and image processing, the method embodiments of the present invention involve complex, tedious numeric calculations that can be practically performed only by computer programs executing on a computer system. As well-understood by those familiar with computing, execution of computer programs transforms a general-purpose computer system into a special-purpose image-processing system, one component of which is the computer programs that provide high-level control and functionality.

In step 302, one or more images to which region-identifying methods are to be applied are received by the routine "perceptual segmentation and tagging." In addition to the image or images, the routine may also receives various parameters, thresholds, rules, and heuristics that may control segmentation and tagging and tailor the analysis to particular types of images and regions. In certain embodiments, the values for these parameters and thresholds, as well as any supplied rules and heuristics, may be encoded within the routines that implement perceptual segmentation of images, or may be discovered by an image-processing system in the course of processing images or during specific training sessions in which human feedback is used to determine and refine the values of parameters and thresholds and to develop and refine rules and heuristics. In the following discussion, the parameters and thresholds, as well as rules and heuristics, are discussed as if encoded within specific routines. It should be understood that, in alternative embodiments of the present invention, the values of parameters and thresholds, and various rules and heuristics, may be obtained from databases, may be obtained interactively from users or administrators, may be defined, developed, and refined over time and during training sessions, and/or may be alternatively specified.

In the for-loop of steps 304-308, each received image is successively processed. In step 305, the currently processed image is segmented according to color and texture, as described, in detail, below. Then, in step 306, those segments of the image constructed in step 305 that can be identified as belonging to certain types of regions within the image, including, in the described embodiment, sky, human face, human skin, and foliage, are tagged according to the identification, while those segments that cannot be identified remain unclassified, or, equivalently, remain tagged as "unknown" or "unidentified." In general, following tagging, indications of the tagged regions are electronically stored, in step 307, for subsequent output in step 310. However, in alternative embodiments, indications of the types of regions identified within images may be immediately output to other components of an image-processing system or displayed to a user.

Overview of Digitally-Encoded Images and Color Models

The following discussion focuses on two-dimensional digitally-encoded images. Such images make up the bulk of images currently processed by image-processing systems, and include both still digital photographs, video frames within video streams, digitally-encoded figures, drawings, and other artwork, and other such two-dimensional images. However, the method and system embodiments of the present invention may be employed on additional types of digitally-encoded images, including three-dimensional images stored as stereo pairs or in various types of true three-dimensional representations.

Figure 4:
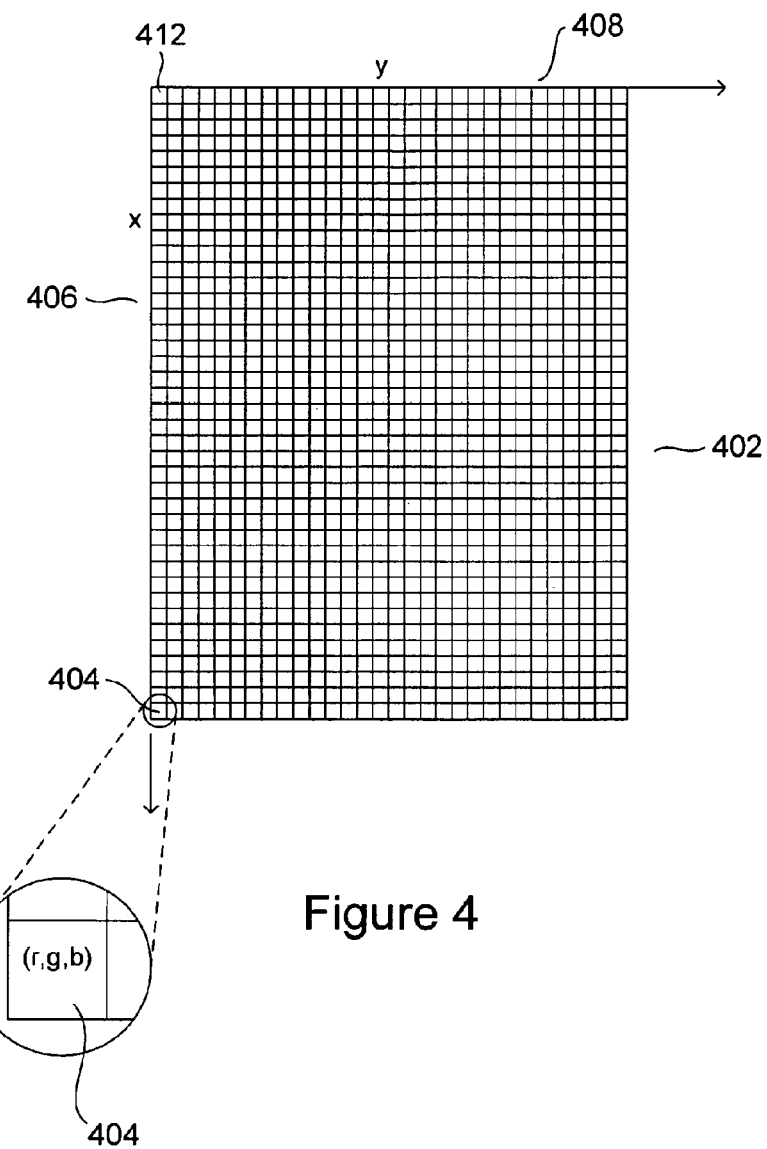
FIG. 4 illustrates a typical digitally-encoded image.

FIG. 4 illustrates a typical digitally-encoded image. The image comprises a two-dimensional array of pixels 402. In FIG. 4, each small square, such as square 404, is a pixel, generally defined as the smallest-granularity portion of an image, the color or grayscale value of which that can be numerically specified in a digital encoding. Pixel sizes are generally related to image-capture optics as well as the capabilities of display and printer devices.

Each pixel has a location within the image, generally represented as a pair of numeric values corresponding to orthogonal x 406 and y 408 axes, respectively. Thus, for example, pixel 404 has x, y coordinates (39,0), while pixel 412 has coordinates (0,0). In the digital encoding, each pixel is associated with one or more numeric values that specify how the region of the image corresponding to the pixel is to be rendered upon printing, displayed on a display-device screen, or otherwise rendered by some other means. Commonly, for black-and-white images, a single numeric value in the set of values {0, 1, . . . , 255} is used to represent each pixel, although other ranges of values, such as {0, 1, . . . , 65535} may used in alternative digital encodings. The numeric value specifies the grayscale level at which the pixel is to be rendered, with the value "0" representing black and the value "255" representing white. For color images, any of a variety of different color-specifying sets of numeric values, color-space coordinates, or color components may be employed. In one common color model, as shown in FIG. 4, each pixel is associated with three values, or color components (r,g,b) which specify the red, green, and blue components of the color, according to the RGB color model, to be displayed in the region corresponding to the pixel.

Figure 5A:
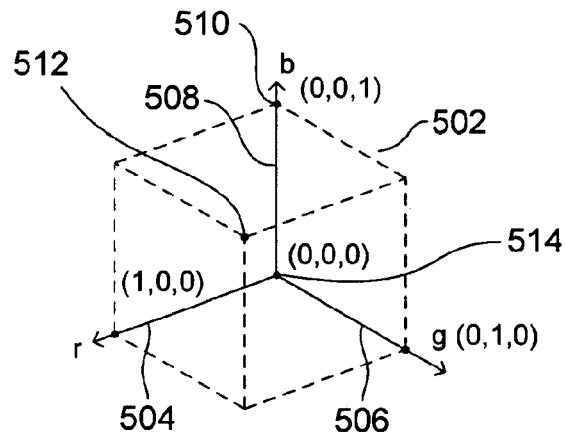
FIGS. 5A-D illustrate four different color models.

FIGS. 5A-D illustrate four different color models. FIG. 5A illustrates one version of the RGB color model. The entire spectrum of colors is represented, as discussed above with reference to FIG. 4, by a three primary-color components (r,g,b). These can be considered to be coordinates in a three-dimensional color space. In the RGB color model, different colors can be considered to correspond to different points within a unit cube 502 of a three-dimensional color space defined by three orthogonal axes: r 504; g 506; and b 508. The individual color components range from 0.0 to 1.0 along each of the three primary-color axes. The pure blue color, for example, of greatest possible intensity and saturation corresponds to the point 510 on the b axis with coordinates (0,0,1). The color white corresponds to the point 512, with coordinates (1,1,1) and the color black corresponds to the point 514, the origin of the coordinate system, with coordinates (0,0,0).

Figure 5B:
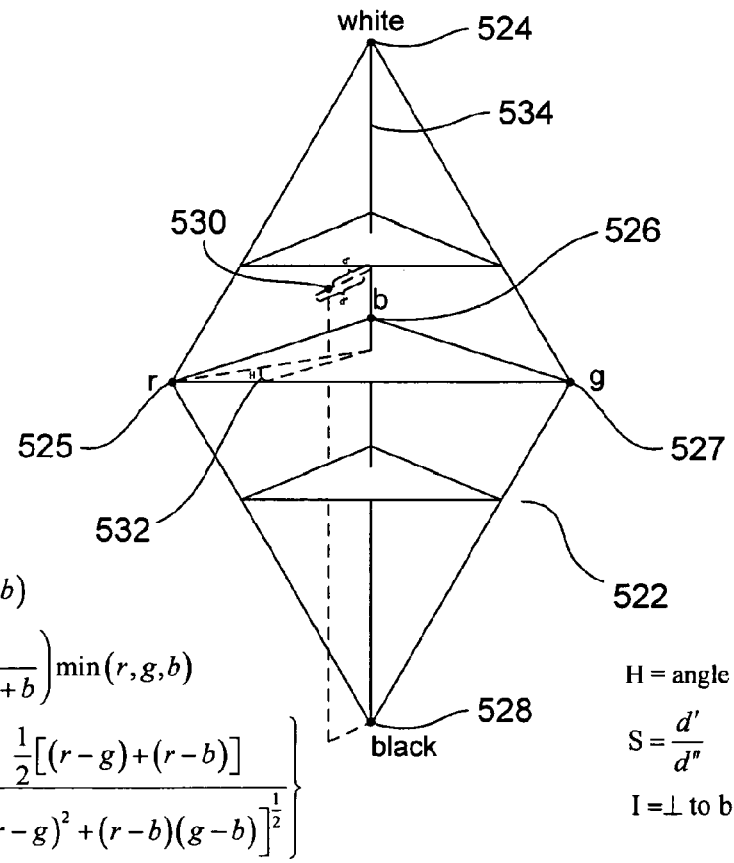

FIG. 5B shows a different color model, referred to as the "HSI" color model or the "hue-saturation-intensity" color model. In this color model, all possible colors are contained within a three-dimensional trigonal bipyramid 522. The fully saturated colors red, blue, and green correspond to points 525, 526, and 527, respectively, while white and black correspond to points 524 and 528, respectively. For an arbitrary color, represented in FIG. 6 by point 530, the hue is defined as the angle 532 between a vector from point 525 to the vertical axis 534 of a trigonal bipyramid, the saturation is represented by the ratio of the distance of point 610 from the vertical axis 614 d' divided by the length of a horizontal line passing through point 610 from the vertical axis 614 to the exterior of the trigonal bipyramid, d", and the intensity is the vertical distance from point 610 to the level of the point representing black 608. The components or coordinates for a particular color in the HSI color model, (h,s,i), can be obtained from the components of the color in the RGB color model, (r,g,b), as follows:

$$i = \frac{1}{3}(r + g + b)$$

$$s = 1 - \left(\frac{3}{r+g+b}\right)\min(r, g, b)$$

$$h = \cos^{-1}\left\{\frac{\frac{1}{2}[(r-g)+(r-b)]}{[(r-g)^2+(r-b)(g-b)]^{1/2}}\right\}$$

Figure 5C:
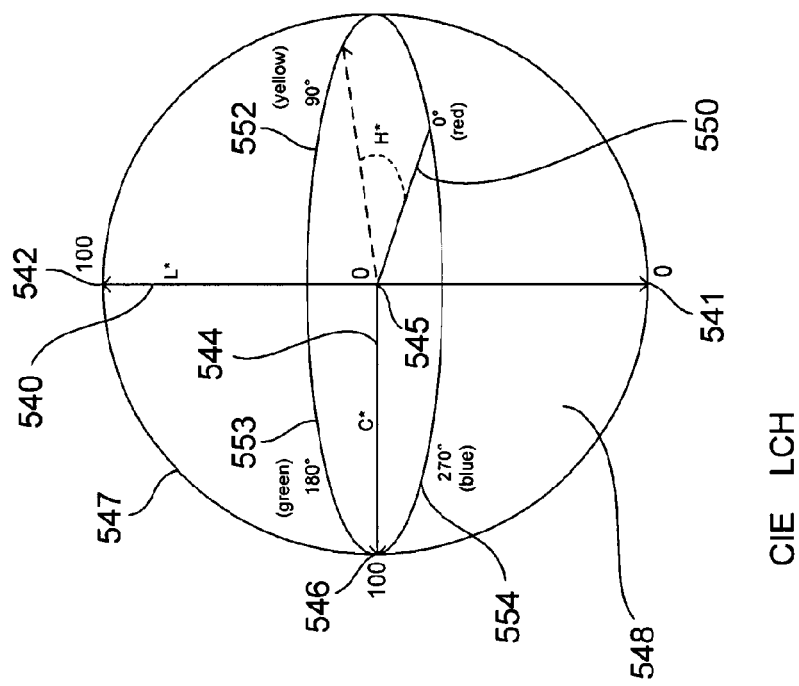

FIG. 5C illustrates yet another color model, referred to as the "CIE LCH" color model. The acronym "CIE" stands for "Commission Internationale de l'Eclairage." The acronym "LCH" stands for the three dimensions L*, C*, and H*, used to define the CIE LCH color model, often referred to as the "LCH" color model. The LCH color model, unlike the RGB color model, discussed above, is not device dependent, but is instead designed to correspond to human perception of colors. The L* axis represents lightness, and values along this axis range from 0, or "absolute black," 541 to 100, or "absolute white" 542. The C* axis is essentially any horizontal, radial line segment, such as the line segment 544. The C* axis represents saturation, with saturation values ranging from 0, or completely unsaturated, 545 along the L* axis to 100 546 at any point on the surface of the spherical boundary 547 of the LCH color space 548. The H* axis is essentially a angle measured in an arbitrary direction, counterclockwise in FIG. 5C, from a direction 550 of 0° corresponding to red. The hues yellow, green, and blue correspond to H* angles of 90° 552, 180° 553, and 270° 554, respectively.

Figure 5D:
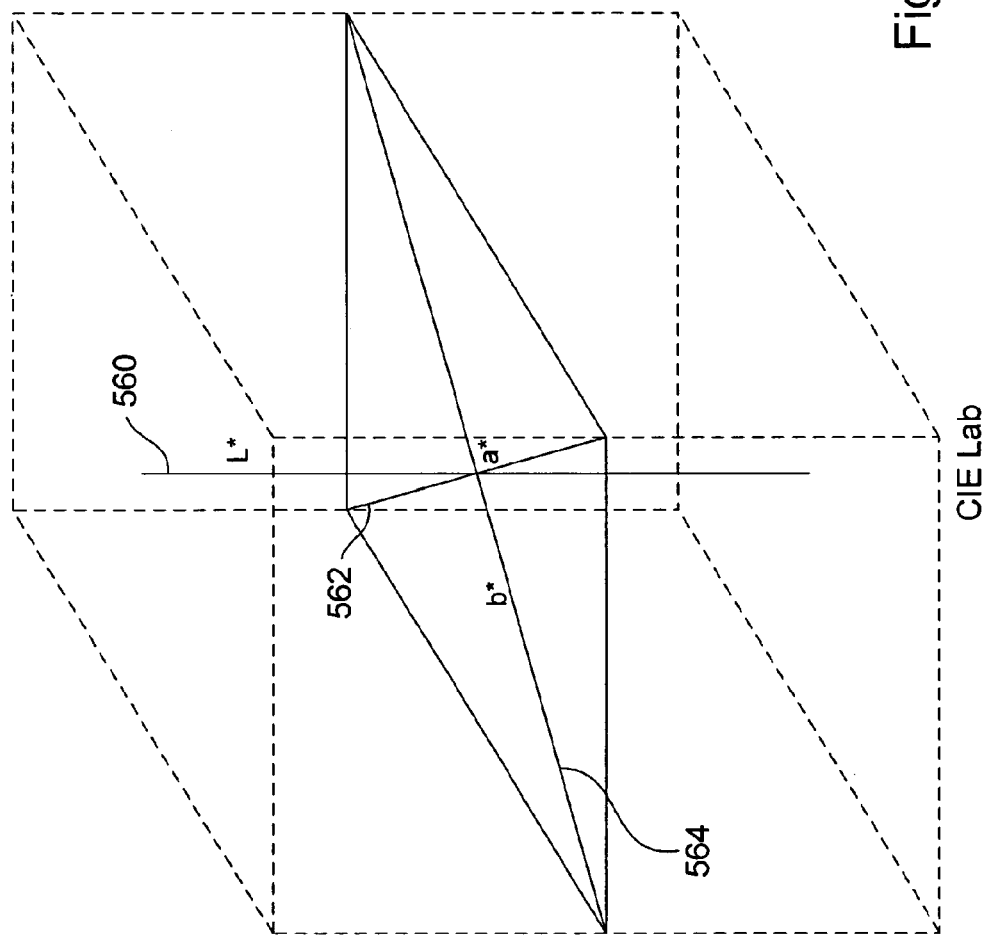

FIG. 5D illustrates the CIE Lab color model. This color model uses an L* vertical axis corresponding to the L* axis of the LCH color model. The Lab color space is therefore a rectangular prism. The a* 562 axis and b* axis 564 are orthogonal, and lie in a horizontal, central plane 566. At one extreme, a*=−128, lies the pure color green, and at the other extreme, a*=127, lies the pure color red. Similarly, the endpoints of the b* axis, b*=−128 and b*=127, represent blue and yellow, respectively. Like the LCH color model, the Lab color model is device independent.

There are a variety of other color models, some suited for specifying colors for printed images and others more suitable for images displayed on CRT screens or on LCD screens. In many cases, the components or coordinates that specify a particular color in one color model can be easily transformed to components or coordinates for the color in another color model, as shown in the above example by three equations that transform RGB components to HSI color components. In other cases, such as converting from RGB colors to LCH colors, the device-dependent RGB colors are first converted into a device-independent RGB color model, and then, in a second step, transformed to the LCH color model. In many embodiments of the present invention, color-related values, including color-related pixel features, are computed based on the LCH and/or Lab color models.

Most color models employ three primary colors, corresponding to the wavelengths of maximum sensitivity of three different pigments in the human retina. Intensity is related to the amount of energy emanating from a light source or incident upon the retina of an eye, photographic film, or a charged-couple device. Luminescence is a measure of perceived energy. Thus, intensity and luminance are related, and, in the following discussion, the terms "intensity" and "luminance" are used interchangeably. Saturation is inversely related to the amount of white light mixed in with particular dominant wavelengths, or hues. For example, the pure color red is fully saturated, with saturation s=1.0, while the color pink has a saturation value less than 1.0 but greater than 0.0, and the color white is fully unsaturated, with saturated value s=0.0. Hue refers to the relative magnitudes of the primary-color components that specify a particular color. Further detail concerning color model and visual perception can be found in numerous textbooks.

Mathematical Image-Processing Concepts

Figure 6:
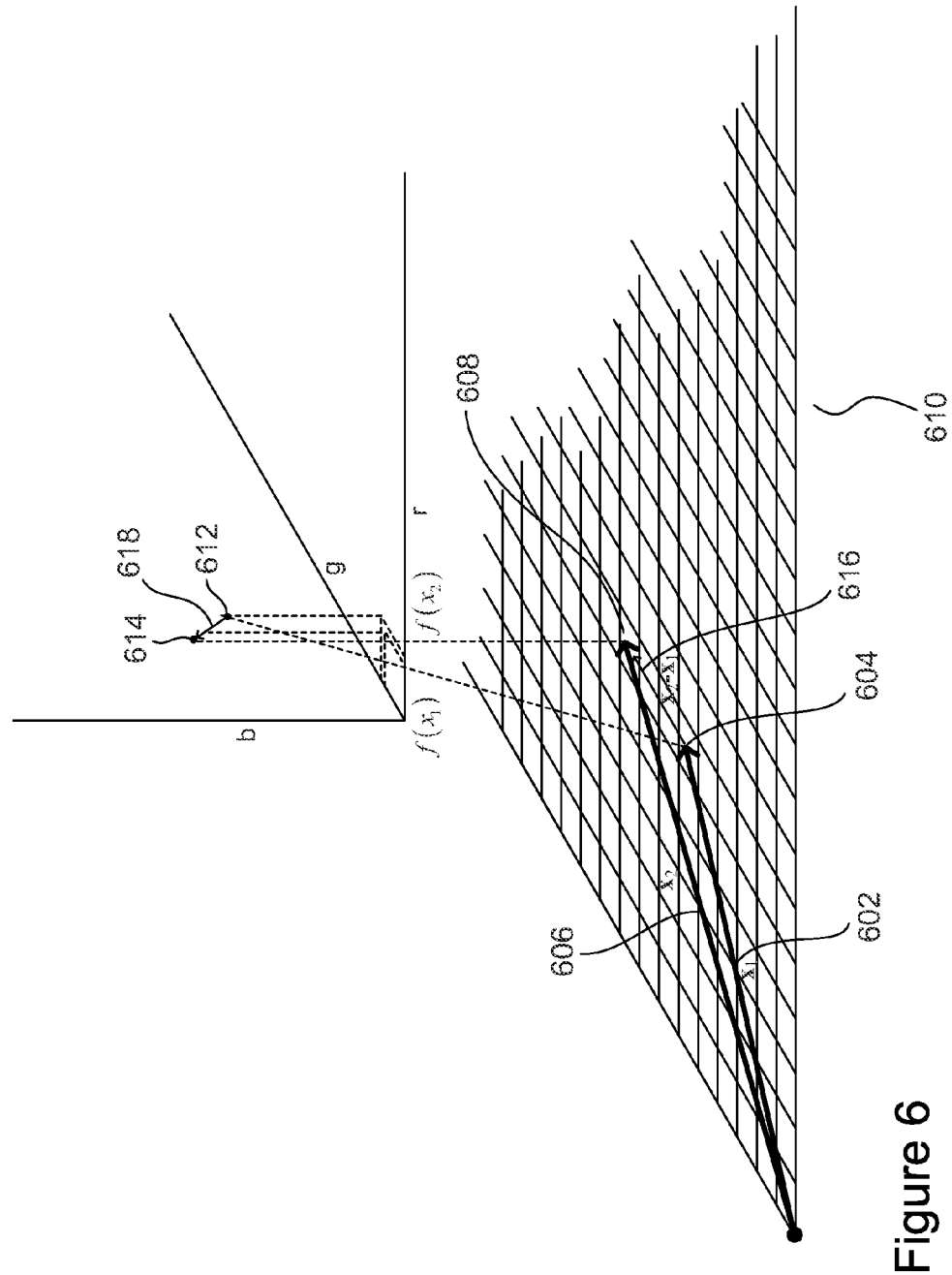
FIG. 6 illustrates the notion of relative positions of pixels in two-dimensional space of an image and in three-dimensional RGB color space.

FIG. 6 illustrates the notion of relative positions of pixels in two-dimensional space of an image and in three-dimensional RGB color space. In FIG. 6, the vector $x_1$ 602 specifies the position of a first pixel 604 and the vector $x_2$ 606 specifies the position of a second pixel 608 in a two-dimensional image 610. Each of the pixels 604 and 608 is associated with a color that is represented by a position within RGB color space. In FIG. 6, the color associated with pixel 604 occurs at point 612 in RGB color space, and the color associated with pixel 608 occurs at point 614 in RGB color space. The distance from the first pixel 604 to the second pixel 608 is expressed by the vector $x_2 - x_1$ 616, and that distance in two-dimensional image space corresponds to a distance 618 between the first and second pixels in RGB color space.

Figure 7:
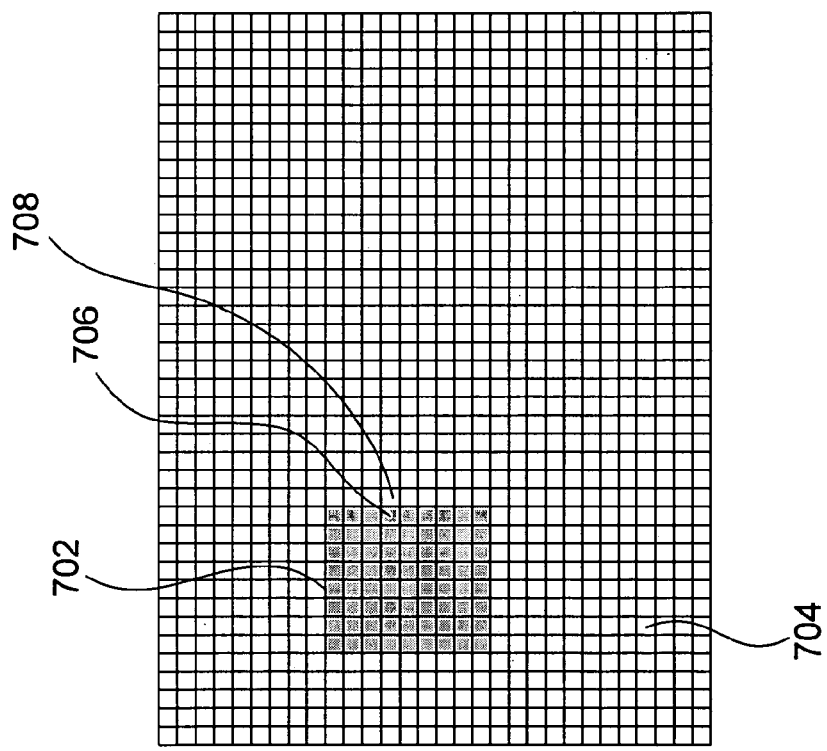
FIG. 7 shows a portion of an image that includes a dark square region.

FIG. 7 shows a portion of an image that includes a dark square region. The dark, square region 702 is surrounded by a light-colored background 704. Many image-processing techniques rely on being able to detect the boundaries or edges of regions such as the dark square 702 in FIG. 7. In image processing, it is desirable to compute a metric or value related to the presence of edges, or boundaries, between dissimilar regions within the image. For example, it is useful to have a metric that can be applied to pixel 706 and pixel 708 in FIG. 7 to determine that the two pixels lie adjacent to, and on opposite sides of, an edge or boundary. One well-known quantity used in mathematics to detect changes in the value of a scalar function is the gradient, which produces a vector field from the scalar function.

Figure 8:
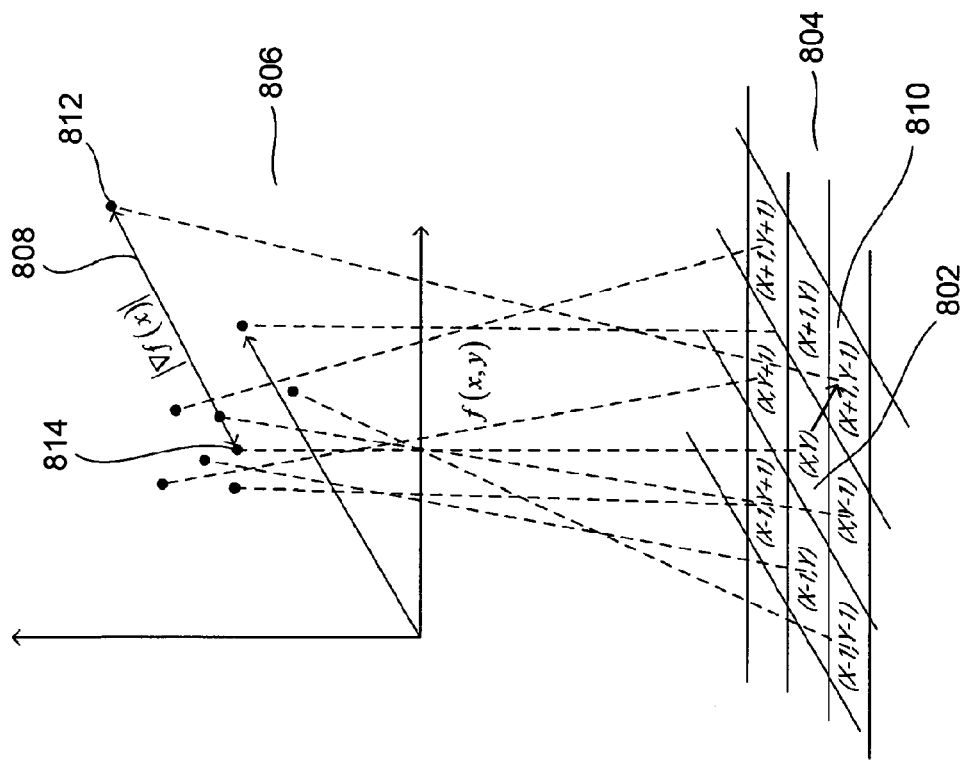
FIG. 8 illustrates a discrete, image-based analog of the gradient vector generated by the $\nabla$ operator in continuous mathematics.

FIG. 8 illustrates a discrete, image-based analog of the gradient vector generated by the $\nabla$ operator in continuous mathematics. In FIG. 8, a pixel with spatial coordinates (x,y) 802 is shown within a pixel neighborhood 804 that comprises all pixels horizontally, vertically, and diagonally adjacent to pixel (x,y) 802. In FIG. 8, colors associated with all of the pixels in the neighborhood of pixel (x,y), as well as the color associated with pixel (x,y), are plotted as points in RGB color space 806. Using one possible distance metric in two-dimensional image space, all of the pixels in the neighborhood of (x,y) shown in FIG. 8 can be considered to lie at a distance 1 from pixel (x,y). In RGB space 806, one can compute the corresponding color-space distances between the color associated with pixel (x,y) and the colors associated with the pixels in the neighborhood of pixel (x,y). The largest color-space distance between the pixel (x,y) and all pixels in the neighborhood of pixel (x,y) 808 can be considered to be the magnitude, or absolute value, of the gradient computed at point (x,y) in two-dimensional image space. The direction of the gradient is the direction of the vector, in two-dimensional image space, pointing from pixel (x,y) to the pixel 810 associated with a point in RGB color space 812 furthest from the point in RGB color space 814 associated with the central pixel (x,y) 802. The gradient vector points in the direction of greatest corresponding change in color, and the magnitude of the vector is related to the distance, in RGB color space, between the central pixel and neighborhood pixel lying in the direction of the gradient vector from the central pixel (x,y).

In image processing, it is common to borrow equations from continuous mathematics in order to derive techniques applicable to discrete problem domains, such as two-dimensional digitally-encoded images. For example, the mapping of position, within an image, to color can be expressed as:

$$f(x) \rightarrow (r,g,b)$$

Thus, function (f) maps a position in two-dimensional image space, represented by a vector x, to a point (r,g,b) in RGB color space. The gradient at a point (x,y) in two-dimensional image space is expressed as:

$$\nabla f = \frac{\partial f}{\partial x} e_x + \frac{\partial f}{\partial y} e_y$$

The gradient operator can be expressed, in matrix form, as:

$$D(x) \equiv \begin{bmatrix} \frac{\partial r}{\partial x} & \frac{\partial r}{\partial y} \\ \frac{\partial g}{\partial x} & \frac{\partial g}{\partial y} \\ \frac{\partial b}{\partial x} & \frac{\partial b}{\partial y} \end{bmatrix}$$

and the transpose of the gradient operator is expressed as:

$$D^T(x) \equiv \begin{bmatrix} \frac{\partial r}{\partial x} & \frac{\partial g}{\partial x} & \frac{\partial b}{\partial x} \\ \frac{\partial r}{\partial y} & \frac{\partial g}{\partial y} & \frac{\partial b}{\partial x} \end{bmatrix}$$

The distance between a point x and a point x+u in two-dimensional image space, where the vector u has magnitude equal to 1, corresponds to a distance between the colors at the two points in RGB color space, which can be computed as:

$$d_s(x,x+u) \leftrightarrow d_c(f(x),f(x+u)) = \sqrt{u^T D^T D u}$$

The vector that maximizes the distance in color space, $d_c$, can thus be found as the solution of an eigenvalue problem, as follows:

$$G \equiv D^T D$$

$$Gy = G\lambda$$

$$|\nabla f| = \frac{\text{avgmax}}{y}\sqrt{\lambda}$$

where the vectors y are unit vectors in all possible directions from the point x. The discrete image-based computation of the magnitudes of the color gradient at each point in the image can be analogously computed using simple closed-form expressions derived from the above continuous-mathematics equations.

Figure 9A:
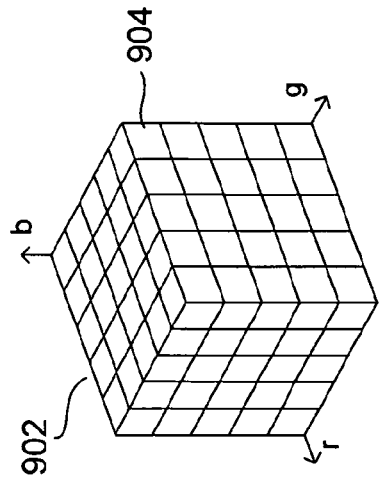
FIGS. 9A-B illustrate computation of one type of texture metric for each pixel in a two-dimensional matrix.
Figure 9B:
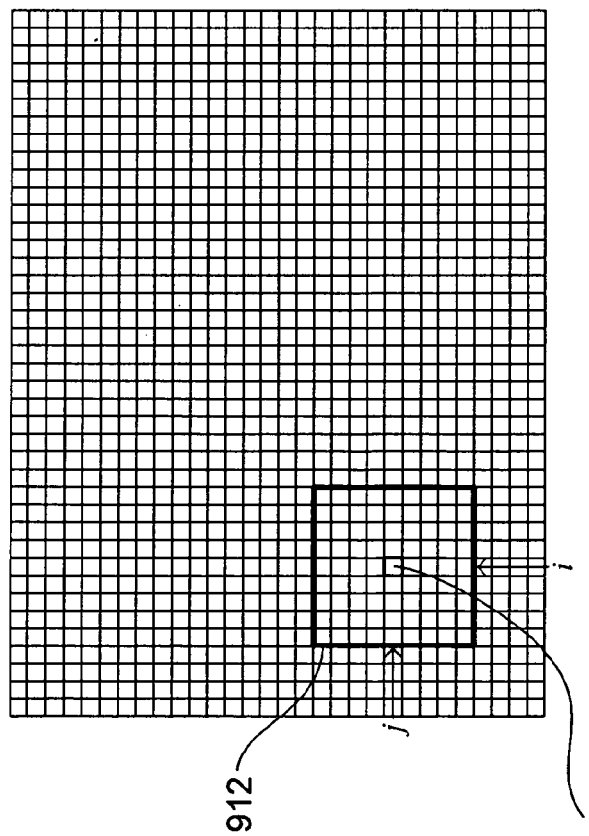

FIGS. 9A-B illustrate computation of one type of texture metric for each pixel in a two-dimensional matrix. The gradient provides a metric for the presence of edges or boundaries between differently colored regions at each point in a two-dimensional image. The average gradient magnitude within a region of an image, or a computed distribution of gradient magnitudes within a region, is indicative of the smoothness of the region. It is also useful to have a metric that expresses the presence of texture at each point in the image. Texture relates to the degree to which regular patterns are present in a region of an image, in turn related to the predictability of the color of pixels within a region. Predictability of color can be expressed as the entropy H of the color signal within the region. A monochromatic region has an entropy of 0.0, since the color of each pixel in the region is known with certainty, while a randomly variegated region would have a very high entropy. A region that includes a regular pattern, such as a brick wall or checker-board-like tiled floor, would have a relatively low entropy, since the color of pixels within the region is known to a relatively high degree of certainty.

In certain embodiments of the present invention, an entropy-based texture metric is employed for region identification and merging. The local entropy is computed at each point in the two-dimensional image. First, the RGB color space is quantized. FIG. 9A illustrates quantization of RGB color space. As shown in FIG. 9A, the continuous volume of the unit cube that describes RGB color space 902 is divided into a fixed number of fixed-size sub-volumes, such as sub-volume 904. All of the points in RGB color space within each sub-volume can then be considered to have a quantized color q, where q is a single numeric value equal to a number that identifies the sub-volume within an ordered set of the sub-volumes contained within the unit cube. For example, in the example shown in FIG. 9A, there are 125 sub-volumes, and therefore all possible colors are quantized into 125 colors associated with numbers q in the set of values {0, 1, . . . , 124}. Thus, quantization can be expressed as:

$$q=Q(r,g,b)$$

or, in terms of two-dimensional image coordinates:

$$q=q(i,j)=Q(f(i,j))$$

where $f(i,j)$ is a function that maps pixels in two-dimensional image space to corresponding points in three-dimensional RGB color space.

With RGB color space quantized, the local entropy for each pixel can be computed from a neighborhood of pixels surrounding the pixel. FIG. 9B illustrates computation of the texture metric T(i,j) for pixel (i,j) within a two-dimensional image. The pixel (i,j) 910 is considered to be the central pixel of a nine-pixel-by-nine-pixel neighborhood 912. The texture metric for the pixel, T(i,j), is essentially the entropy computed for the nine-pixel-by-nine-pixel neighborhood 912:

$$T(i,j) = -\sum_{k=i-4}^{i+4}\sum_{l=j-4}^{j+4} P(q(k,l))\log_2 P(q(k,l))$$

where P(q(k,l)) is the probability that the pixel (k,l) has quantized color q(k,l), based on the distribution of quantized color values q(k,l) within the image. The entropy H commonly encountered in information science, and is, in fact, directly related to the entropy of chemistry and physics.

Figure 10:
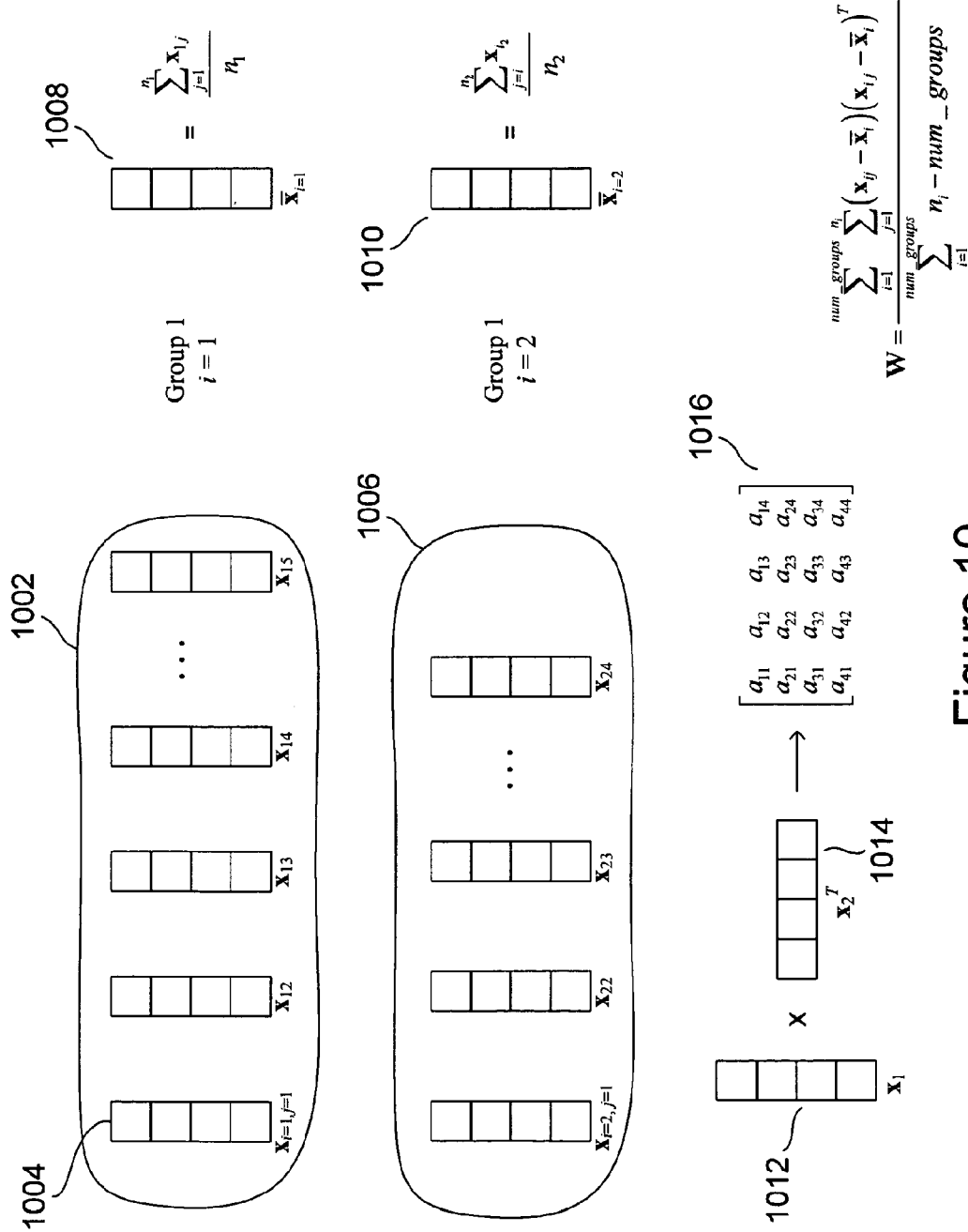
FIG. 10 illustrates certain computations related to a four-dimensional-vector representation of pixels within a two-dimensional image.

In certain embodiments of the present invention, segmentation of an image involves considering each pixel in the image as a four-dimensional vector. The four dimensions include three dimensions of a color model, such as the RGB color model, and a single texture dimension that corresponds to the local entropy value computed, by the above-described technique, for the pixel. FIG. 10 illustrates certain computations related to a four-dimensional-vector representation of pixels within a two-dimensional image. In FIG. 10, a first region, or group of pixels, within a two-dimensional image 1002 is represented as a set of four-dimensional vectors, such as vector 1004, with each vector described as $x_{ij}$ where i is a numeric identifier of the group and j is the identifier of the pixel, or four-dimensional vector, within the pixels, or four-dimensional vectors, that comprise the group i. In FIG. 10, a second region, or group of pixels, 1006 is shown below the first group 1002. An average value, or average four-dimensional vector, $\bar{x}_i$, can be computed for a group or region i as:

$$\frac{\sum_{j=i}^{n_i} x_{ij}}{n_i}$$

where $n_i$ is the number of pixels or four-dimensional vectors in group i. In FIG. 10, the average vector 1008 is shown for group 1 1002 and the average vector 1010 is shown for group 2 1006.

Two vectors can be multiplied together in different ways. In one form of vector multiplication, a vector $x_1$ 1012 can be multiplied by the transpose of a vector $x_2$, $x_2^T$, 1014 to produce a 4×4 matrix 1016. A covariance matrix that describes the codependence between the dimensions of two sets of vectors, W, can be computed as:

$$W = \frac{\sum_{i=1}^{num\_groups}\sum_{j=1}^{n_i}(x_{ij}-\bar{x}_i)(x_{ij}-\bar{x}_i)^T}{\sum_{i=1}^{num\_groups} n_i - num\_groups}$$

Figure 11:
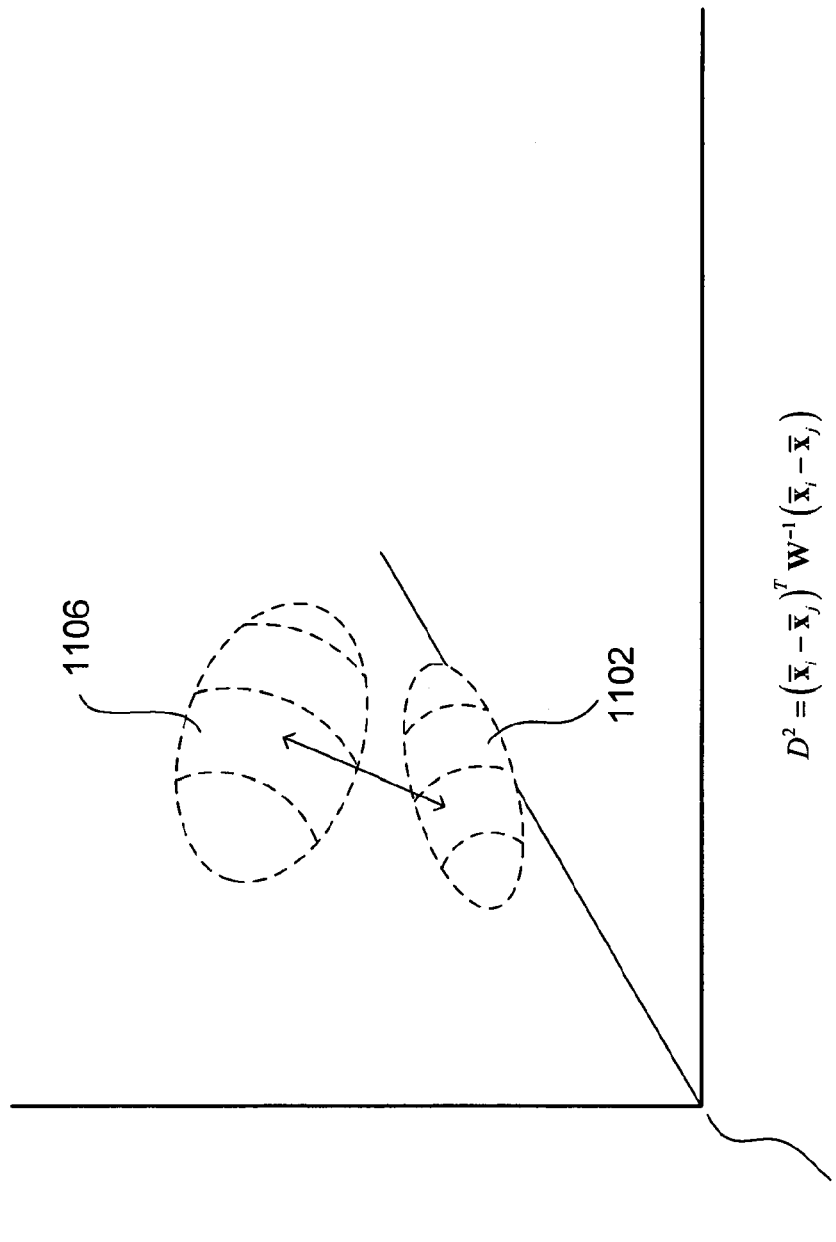
FIG. 11 illustrates a metric for the distance between, or similarity of, two sets of vectors.

FIG. 11 illustrates a metric for the distance between, or similarity of, two sets of vectors. In FIG. 11, the endpoints of a first set of three-dimensional vectors 1102 is shown as contained within an ellipsoid in three-dimensional space

1104. An ellipsoid 1106 corresponding to a second set of vectors is also shown within three-dimensional space 1104. A measure of the aggregate distance between the two groups can be computed as:

$$D^2 = (\bar{x}_i - \bar{x}_j)^T W^{-1} (\bar{x}_i - \bar{x}_j)$$

where $W^{-1}$ is the inverse of the covariance matrix W, discussed above with reference to FIG. 10. The metric $D^2$, as expressed above, does not depend on the dimensionality of the vectors, and thus can be computed for sets of vectors of any dimension, provided that all of the vectors are of equal dimensionality. The distance metric $D^2$, or $D = \sqrt{D^2}$, referred to as the Mahalanobis distance, when computed for two sets of the above-described four-dimensional vectors that represent pixels in two regions of an image, is inversely related to the similarity, in color and texture, of the two regions.

One Approach to Initial Image Segmentation

Figure 12A:
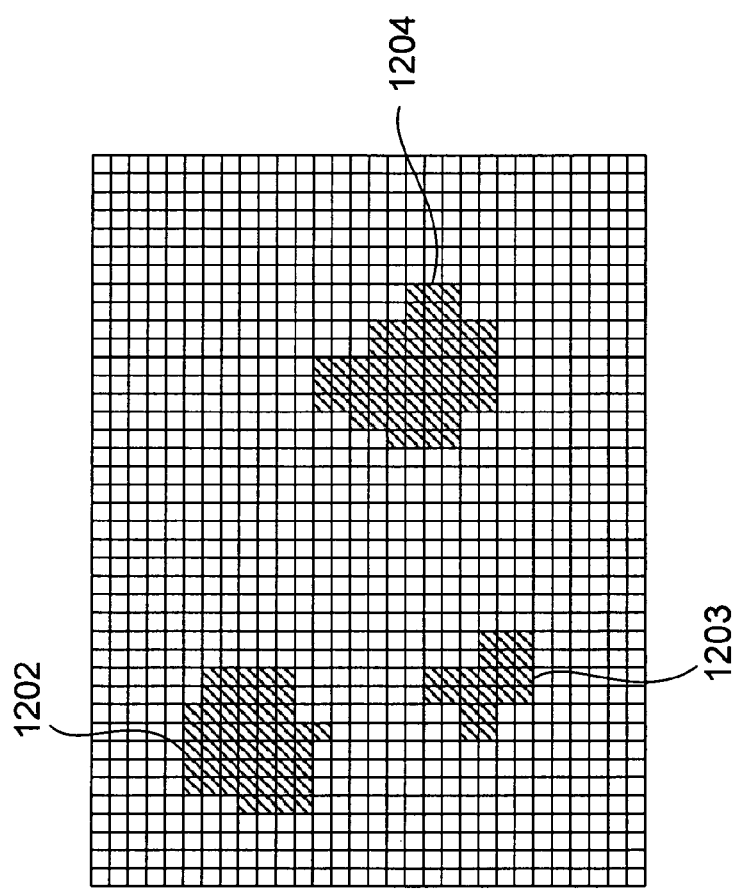
FIGS. 12A-C illustrate an initial iteration of a segmentation process used by certain embodiments of the present invention.
Figure 12B:
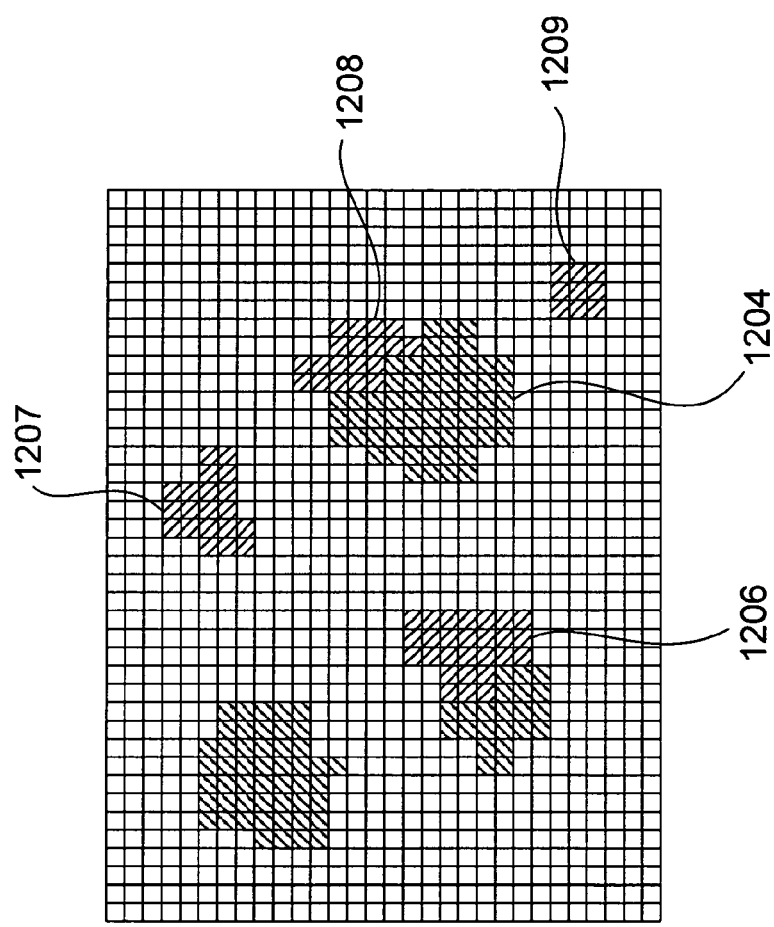
Figure 12C:
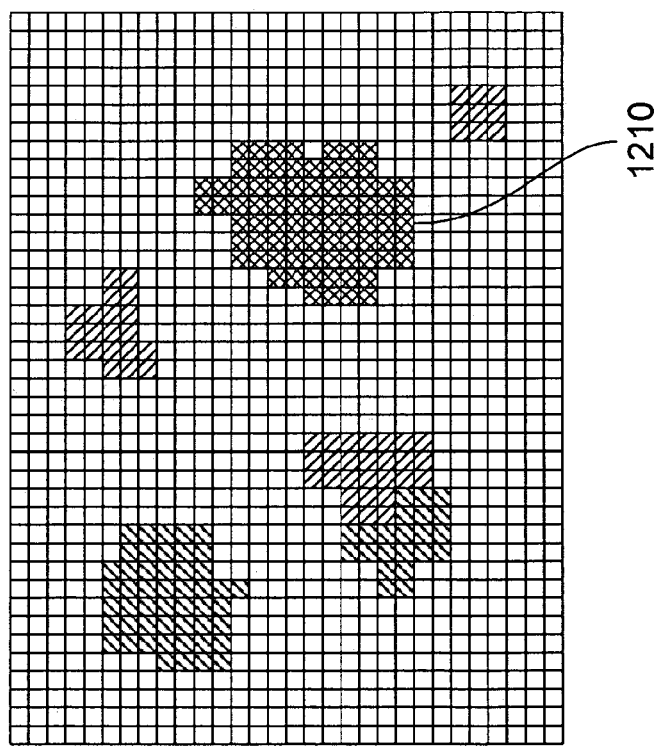

As discussed above with reference to FIG. 3, in an initial step, one method and system embodiment of the present invention segments an image into regions of pixels having similar colors and texture. FIGS. 12A-C illustrate an initial iteration of a segmentation process used by certain embodiments of the present invention. In an initial step, shown in FIG. 12A, the image is analyzed in order to identify initial, seed regions 1202-1204 that are smooth and homogenous with respect to one of the features (e.g. color value). As discussed above, such segments have low average gradient magnitudes, or can be identified by gradient magnitude distributions that are tightly clustered around low gradient-magnitude values. Then, the two steps illustrated in FIGS. 12B and 12C are iterated in order to identify new segments and to merge any newly identified segments with existing, adjacent segments in order to grow segments. First, as shown in FIG. 12B, a smoothness or edginess threshold, initially quite low in the initial step of finding seed regions illustrated in FIG. 12A, is raised sufficiently to identify a number of additional, less smooth regions 1206-1209. Then, as shown in FIG. 12C, pairwise comparisons of the regions are made in order to identify adjacent regions that can be merged together into a single region. In other words, if, upon comparing two adjacent regions, it is determined that, when merged, the resulting larger region will be sufficiently homogenous with respect to color, the two segments are merged. In FIG. 12C, the two regions 1204 and 1208 of FIG. 12B are determined to be sufficiently similar to merge together to produce the resulting, larger region 1210. The steps illustrated in FIGS. 12B and 12C can be then repeated to identify new regions and to merge certain of the newly identified regions with existing regions. Once all pixels within an image are incorporated into regions, an additional, more thorough merging process can be undertaken to merge the regions together to form segments, based both on similarity in color as well as on similarity in texture.

Figure 13A:
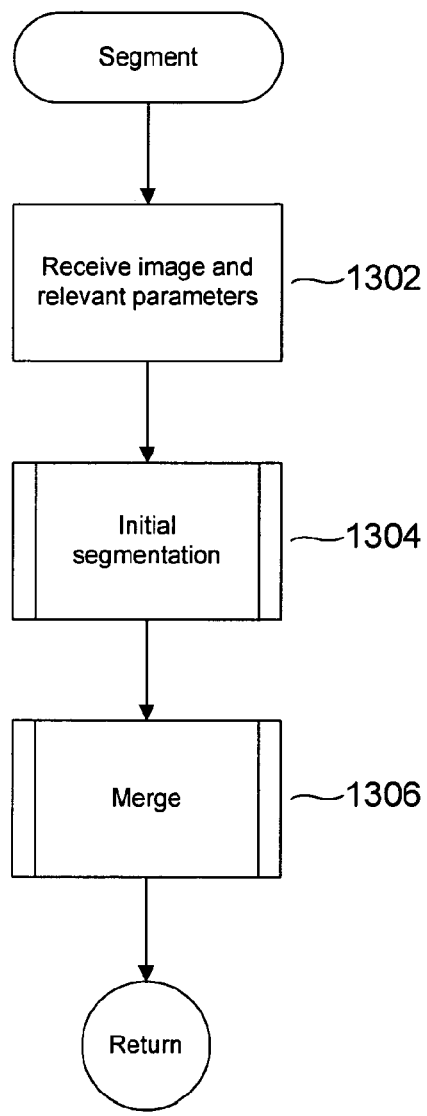
FIGS. 13A-C provide control-flow diagrams that illustrate one approach to image segmentation that is used as the first step of certain method and system embodiments of the present invention.
Figure 13B:
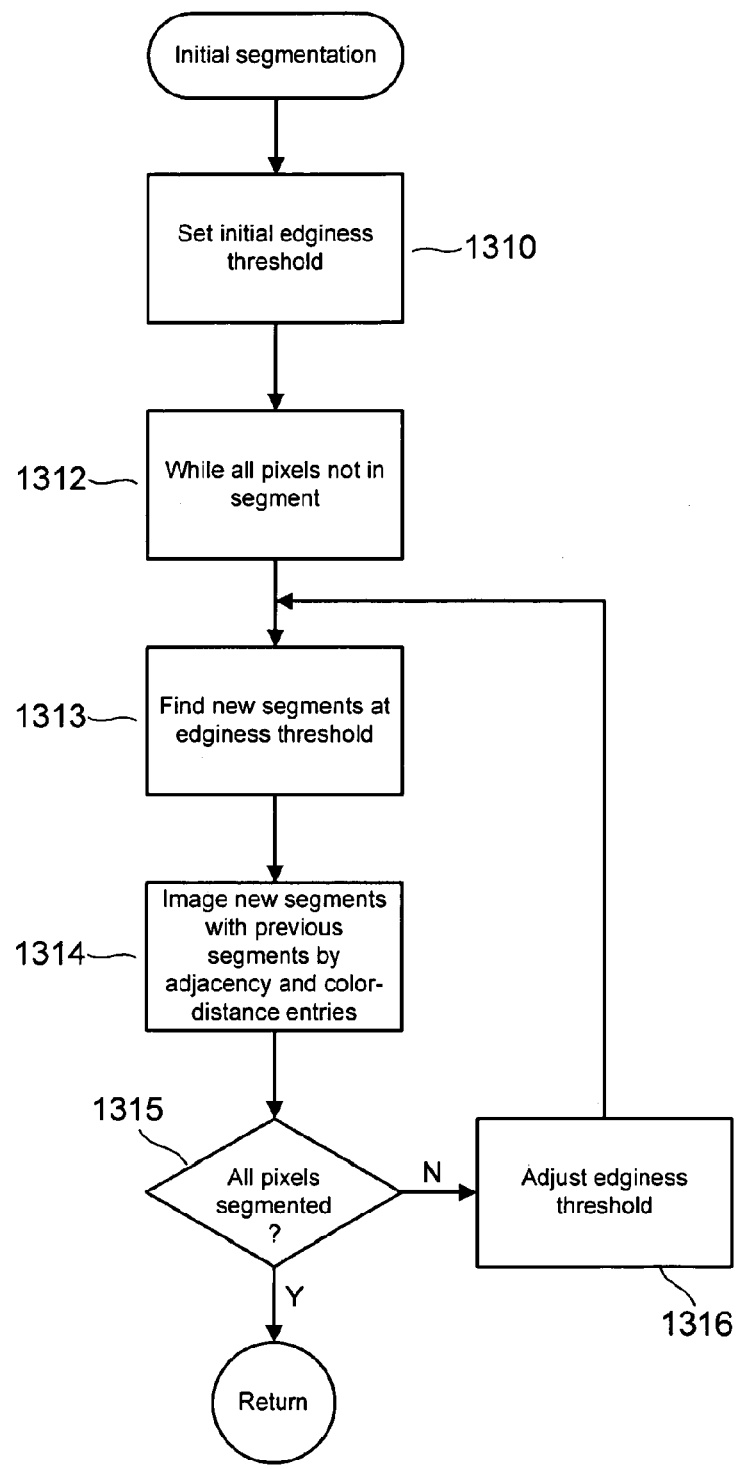
Figure 13C:
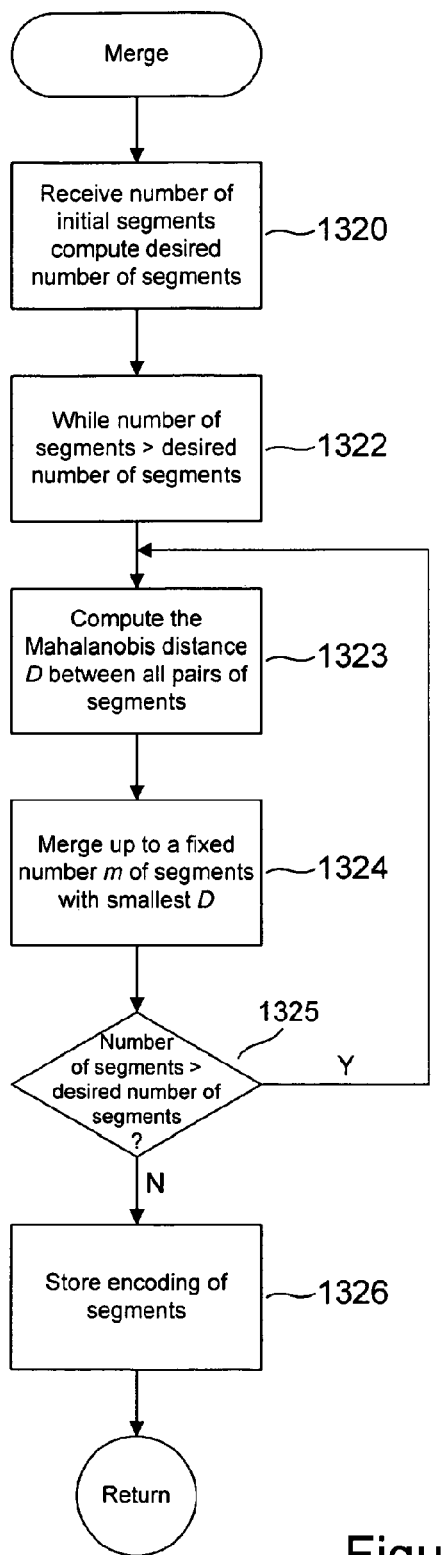

FIGS. 13A-C provide control-flow diagrams that illustrate one approach to image segmentation that is used as the first step of certain method and system embodiments of the present invention. FIG. 13A provides a high-level control-flow diagram for the segmentation method used in certain embodiments of the present invention. In step 1302, an image to be segmented is received, along with any relevant parameters for specifying and controlling the segmentation process. Next, in step 1304, an initial segmentation, described above with reference to FIGS. 12A-C, is carried out in order to incorporate each pixel in the received image within an initial segment. Then, in step 1306, initial segments are pairwise compared with one another in order to merge together those segments with similar colors and textures to construct final, generally larger segments.

FIG. 13B provides a control-flow diagram for the initial segmentation step 1304 in FIG. 13A. In step 1310, an initial edginess threshold is set. Then, in the while-loop of steps 1312-1316, the procedure discussed with reference to FIGS. 12A-C is iteratively carried out until all pixels are incorporated within an initial segment. In step 1313, new regions, each with a cumulative edginess up to the current edginess threshold, are found. Initially, the edginess threshold is set to a very low value, so that the initial seed regions generally correspond to flat, featureless portions of an image, such as blue sky. With each iteration, the edginess threshold is raised, in step 1316, so that increasingly less smooth segments are identified with each iteration. Regions can be identified, in step 1303, by locating the pixels with smallest gradient magnitudes that are not already incorporated into a segment and growing a region around those pixels up to the current, cumulative edginess threshold. Next, in step 1314, any new segments identified in step 1313 are considered for merging with adjacent segments constructed during previous iterations. During initial segmentation, the criteria for merging segments is closeness in color, or, in other words, Euclidean distance between the regions in RGB color space, as well as adjacency of the regions in two-dimensional image space. At the completion of the current iteration, the edginess threshold is increased, in step 1316, to allow new less smooth regions to be found in the next iteration. If all pixels are incorporated into a segment, as determined in step 1315, then initial segmentation is finished.

FIG. 13C provides a control-flow diagram for the merge step 1306 in FIG. 13A. In step 1320, an encoded list of the initial segments for the image is received, along with an indication of the number of segments desired in the final segmentation. The number of segments desired may be a parameter input to the segmentation routine, in step 1302 in FIG. 13A, or, alternatively, may be derived from various computed characteristics of the image, including the number of initial segments, distribution of the entropies and cumulative edginess metrics of the segments, and other such characteristics and factors. Next, in the while-loop of steps 1322-1325, segments are merged together until the final number of segments in the image is less than or equal to the desired number of segments, as determined in step 1325. First, the Mahalanobis distances D between all pairs of segments currently within the image are computed. Then, in step 1324, some fixed number m of pairs of segments separated by smallest Mahalanobis distances D are merged together to form larger segments. Upon completion of the while-loop of steps 1322-1325, an encoding of the final segments is stored for use by subsequent steps of the perceptual segmentation method of the present invention. Locations of segments can be stored in various ways. For example, segments can be stored as sets of coordinate pairs for the pixels within the segments, as the coordinate pairs for the boundary pixels of a region along with an indication of which side of the boundary comprises the interior of the segment, or may alternatively be stored as an expression from which the coordinates of the pixels within the segment can be computed.

Characteristics of Blue-Sky Regions and Region-Type-Specific Color Models

Figure 14A:
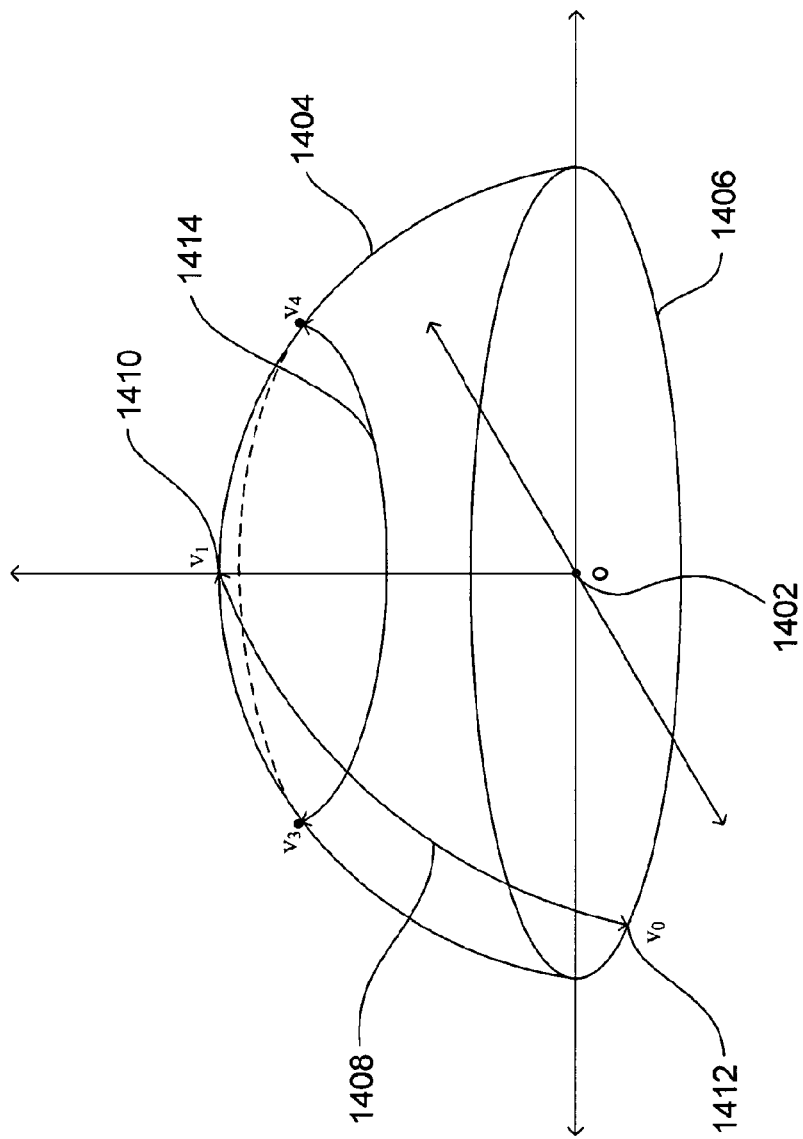
FIGS. 14A-B illustrate a particular color characteristic of sky regions within images.
Figure 14B:
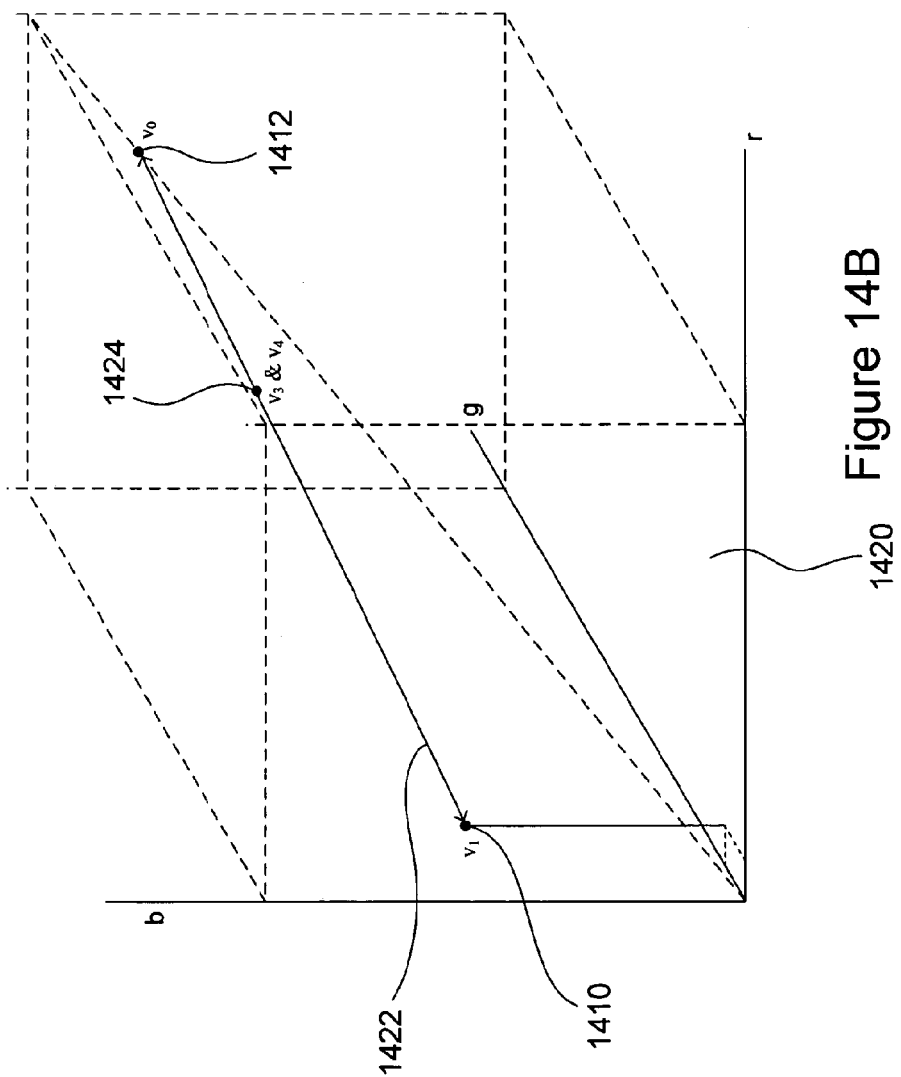

FIGS. 14A-B illustrate a particular color characteristic of sky regions within images. FIG. 14A illustrates the color characteristics of sky regions from the standpoint of an observer positioned at the origin 1402 of a two-dimensional coordinate system representing the surface of the earth. The sky appears as a hemisphere 1404 with the observer at the center of the circular base 1406 of the hemisphere. There are two special directions with regard to the color characteristics of sky. The first direction, represented by trace 1408, is a direction for which the elevation angle varies from directly overhead, at point $v_1$ 1410 to a point 1412 on the horizon, with the azimuthal angle fixed. The second special direction is a horizontal direction, represented by trace 1414, in which the azimuthal angle varies, while the elevation angle is held constant. For blue-sky regions, the variation in color along traces in the two special directions is quite different. FIG. 14B illustrates variation in color in the special directions represented by traces 1408 and 1414 in FIG. 14A. FIG. 14B shows the unit cube 1420 of RGB space. The change in color along trace 1408 is represented by the line segment 1422 in FIG. 14B. At point $v_1$ 1410, which represents a point in the sky directly above the observer, as shown in FIG. 14A, the sky has a mostly blue hue of medium-to-low intensity. As the point moves downward, toward the horizon, along trace 1408, the corresponding color moves upward and to the right, along line segment 1422, to reach the final point $v_0$ 1412 at the horizon. At the horizon, the sky color is close to white, having steadily gained red and green components of increasing magnitude. The overall intensity, or luminance, at the horizon is generally greater than for points directly overhead. By contrast, along the horizontal trace 1414, the color generally does not change, and is therefore represented by a single point 1424 in FIG. 14B that corresponds to all points along trace 1414 in FIG. 14A. Of course, in general, there are some color variations along a horizontal trace, and ideal point 1424 would most likely correspond to an ellipsoid with volume related to the magnitudes of color variation within the image. Furthermore, the presence of the sun in a region of the sky may alter or completely change the above-described color-variation characteristics, although, in general, the sun is generally photographed only when low in the sky, at sunset or sunrise.

These general color characteristics of blue sky can be effectively employed to differentiate blue-sky regions of an image from other, generally featureless blue regions in an image, such as blue walls or surfaces of bodies of water. For example, one can compute the variation along orthogonal traces in a blue-sky region, and rotate orthogonal traces through 90 degrees in order to determine whether characteristics such as those shown in FIG. 14B can be found within the blue-sky region. If so, there is a strong indication that the blue region indeed corresponds to blue sky.

In general, certain types of objects and features have characteristic colors, and regions of an image that exhibit these characteristic colors can be identified, at least in part, as corresponding to these certain types of objects and features. The characteristic colors can be specified by a region-type-specific color model. As one example, regions that correspond to gray sky can be recognized as having pixels with color values (l, c, h) in the LCH color space within some threshold-defined subvolume of LCH space:

(l, c, h) is a gray-sky-characteristic color when:

$l_{lowThresholdForGraySky} < l < l_{highThresholdForGraySky}$ AND
$c_{lowThresholdForGraySky} < c < c_{highThresholdForGraySky}$ AND
$h_{lowThresholdForGraySky} < h < h_{highThresholdForGraysky}$ Alternatively, one can assume that the characteristic colors for an object are specified by an independent Gaussian color model:

$$P(l, c, h) \propto \left( \frac{1}{\sigma_L \sqrt{2\pi}} e^{-\frac{w_L(l-\mu_L)^2}{2\sigma_L^2}} \right) * \left( \frac{1}{\sigma_C \sqrt{2\pi}} e^{-\frac{w_C(c-\mu_C)^2}{2\sigma_C^2}} \right) * \left( \frac{1}{\sigma_H \sqrt{2\pi}} e^{-\frac{w_H(h-\mu_H)^2}{2\sigma_H^2}} \right)$$

where P (l, c, h) is the probability that color (l,c,h) is a gray-sky color;

$\sigma_L$, $\sigma_C$, $\sigma_H$ are approximated as standard deviations for color-component distributions within gray-sky regions;

$\mu_L$, $\mu_C$, $\mu_H$ are approximated as mean color-component values within gray-sky regions; and $w_L$, $w_C$, and $w_H$ are weights, determined empirically or determined based on machine-learning carried in the course of processing a variety of images or analyzing already-processed images.

There are many additional ways to specify characteristic colors for types of regions. For example, the colors of the color model may be specified according to the Lab color space. In general, color models can be developed from region classifications in a library of images, may be developed from regions classified as belonging to a particular type within a single image, or may alternatively be derived from physical models of objects and image acquisition and from other sources, data, and considerations.

Figure 15:
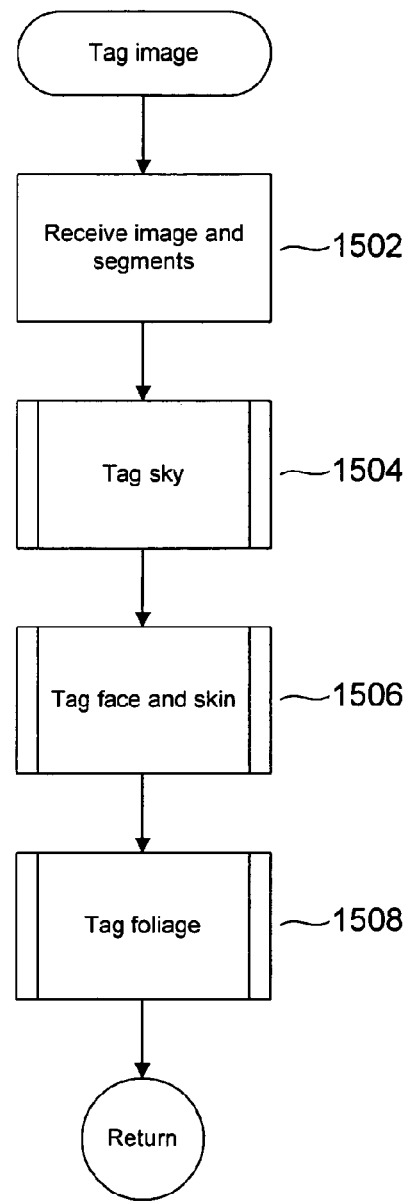
FIG. 15 provides a high-level control-flow diagram for the routine "tag image" called in step 306 of FIG. 3.

Detailed Discussion of the Approach to Perceptual Segmentation of Images According to the Present Invention FIG. 15 provides a high-level control-flow diagram for the routine "tag image" called in step 306 of FIG. 3. In step 1502, an image along with the segmentation map of the image, computed by the routine "segment" discussed with reference to FIGS. 13A-C, is received. Additional parameters, threshold, rules, and heuristics may also be received in step 1502, as discussed above. Initially, the segments in the segmentation map are untagged, or, equivalently, tagged as "unknown." In step 1504, the routine "tag sky" is called in order to identify segments within the segmented image representing blue sky or gray sky. Next, the routine "tag face and skin" is called in step 1506 in order to identify any remaining, untagged segments that correspond to human-face and human-skin regions of the image and to accordingly tag those segments. Then, in step 1508, the routine "tag foliage" is called to identify any of the remaining untagged segments that correspond to foliage, such as trees, bushes, grass, forest, or other such foliage-related image regions, and tag the identified segments as foliage. In alternative embodiments of the present invention, additional routine calls may be made, following the call to the routine "tag foliage" in step 1508, to tag any other regions for which well-defined, characteristics can be determined and incorporated into region-tagging methods similar to those represented by the routines called in steps 1504, 1506, and 1508. In other alternative embodiments of the present invention, the order in which types of regions are identified may be permuted.

FIGS. 16A-H provide control-flow diagrams for the routine "tag sky" called in step 1504 of FIG. 15. For convenience of illustration, this routine is broken into six sequentially called subroutines, including the initial control-flow diagram shown in FIG. 16A. However, as with all control-flow diagrams, the diagrams are intended to show the logic and overall flow of a routine, rather than a specific modular organization of subroutines that together comprise the illustrated routine. The routine "tag sky" can alternatively be implemented as one single, monolithic routine, or as many smaller, hierarchically organized routines called from a parent, tag-sky top-level routine.

Figure 16A:
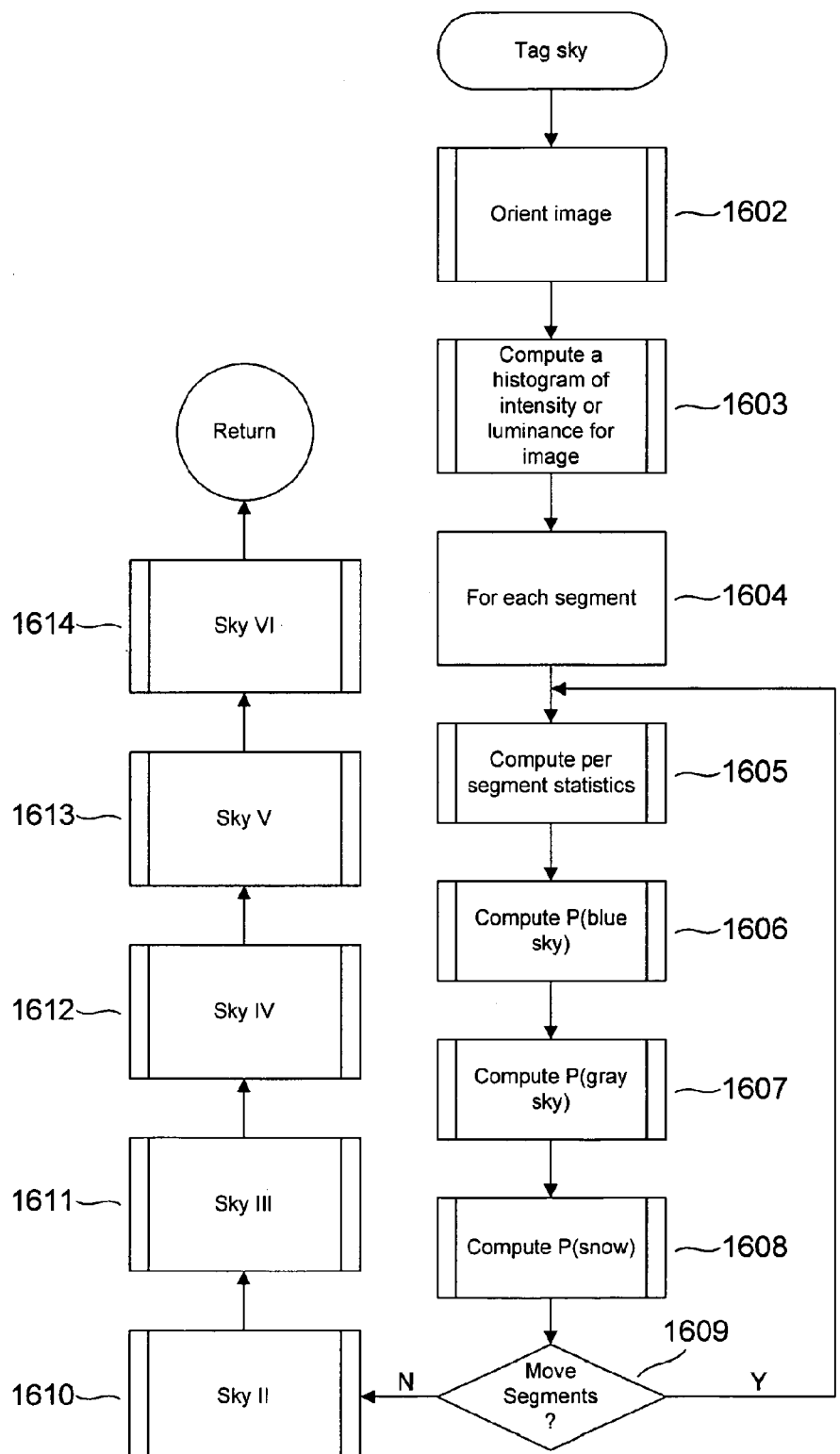
FIGS. 16A-H provide control-flow diagrams for the routine "tag sky and snow" called in step 1504 of FIG. 15.

FIG. 16A shows the first of six sequential subroutines that together comprise the routine "tag sky" called in step 1504 of FIG. 15. In step 1602, an orientation routine is called in order to orient the image. For example, many outdoor scenes, when properly oriented, feature sky at the top of the scene and land or water in lower portions of the image. Image orientation may involve choosing between a portrait or landscape orientation of the image and may further involve choosing image edges as corresponding to up and down. More sophisticated orientation may choose a vertical axis within the image that is not necessarily parallel to the edge of an image. Details for the image orienting routine called in step 1602 are not further provided, since they are not within the scope of the presently disclosed invention.

Next, in step 1603, a routine is called to compute an intensity or luminance histogram for the entire image, along with an average intensity 1 or average luminance $\overline{L}_i$. Then, in the for-loop of steps 1604-1609, each segment within the image is separately processed by computing per-segment statistics, in step 1605, computing the probability that the segment corresponds to blue sky, in step 1606, computing the probability that the segment corresponds to gray sky, in step 1607, and computing the probability that the segment corresponds to snow, in step 1608. Once these per-segment statistics and initial probabilities are computed, processing continues with sequential calls to the subroutines "sky II" 1610, "sky III" 1611, "sky IV" 1612, "sky V" 1613 and "sky VI" 1614.

Figure 16B:
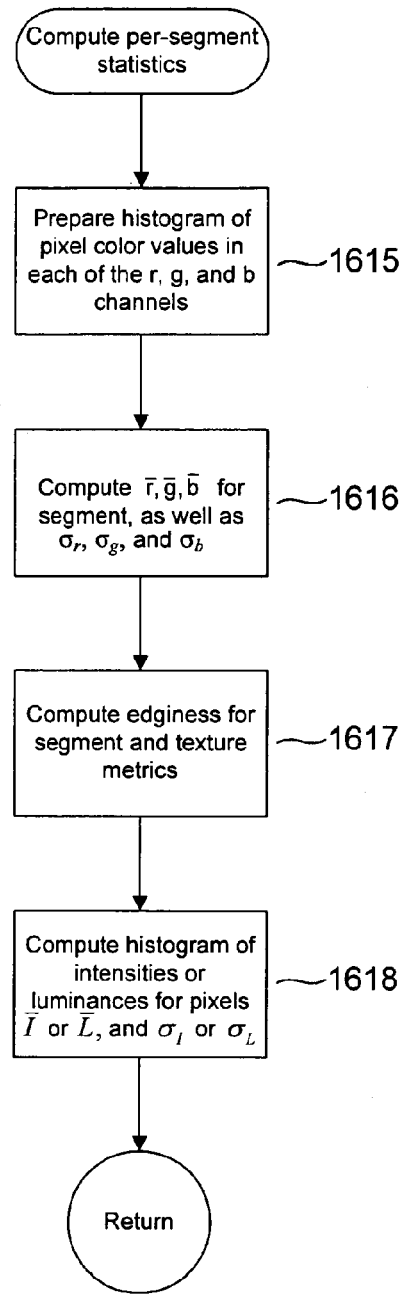

FIG. 16B provides a control-flow diagram for the per-segment-statistics computing routine called in steps 1605 of FIG. 16A. In step 1615, histograms of pixel color values in each of the three r, g, and b channels are prepared for the currently considered segment. In step 1616, average r, g, and b components for the segment, $\overline{r}$, $\overline{g}$, and $\overline{b}$, are computed and standard deviations for the r, g, and b components, $\sigma_r$, $\sigma_g$, and $\sigma_b$, may also be computed. In step 1617, the edginess and texture metrics for each pixel in the segment, as well as an average or cumulative-edginess or edginess distribution, are computed. The edginess is simply the magnitude of the gradient computed for each pixel, as discussed above with reference to FIGS. 6-8. The texture metric for a pixel is simply the neighborhood-based entropy, discussed above with reference to FIGS. 9A-B. In step 1618, an average intensity or luminance, $\overline{I}_s$ or $\overline{L}_s$, and standard deviations of intensity or luminance, $\sigma_I$ or $\sigma_L$ are computed.

The various statistics mentioned in FIG. 16B are exemplary of the types of per-segment statistics that may be computed and used in subsequent calculations. In various alternative embodiments of the present invention, additional statistics or metrics may be computed, and in other alternative embodiments of the present invention, fewer metrics and statistics may be computed. When computational overhead and processing time are significant constraints for an implementation of a method and/or system embodiment of the present invention, per-pixel metrics and statistics may be replaced by metrics and statistics computed at larger granularities within segments.

Figure 16C:
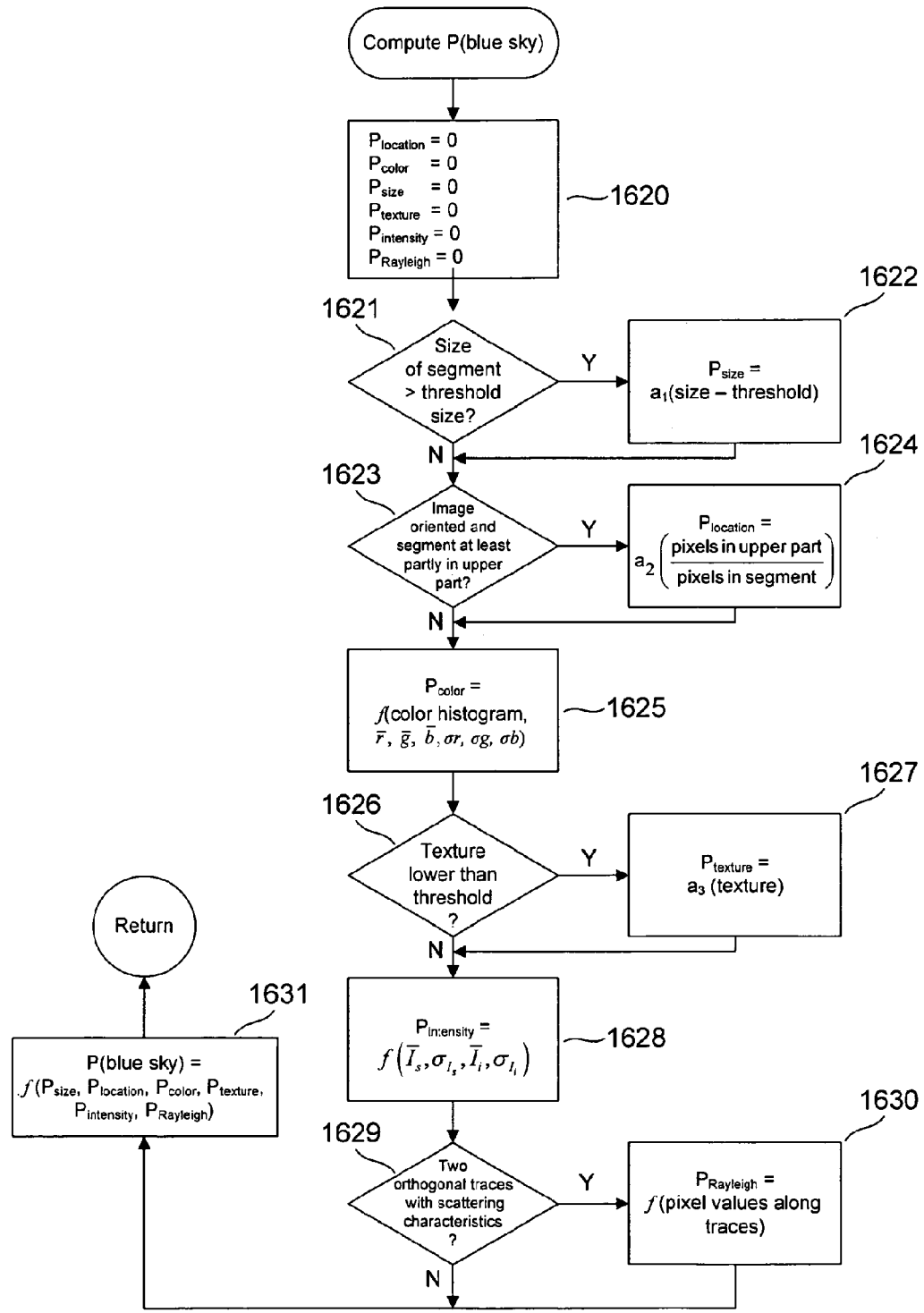

FIG. 16C provides a control-flow diagram for the routine, called in step 1606 of FIG. 16A, that computes the probability that the segment corresponds to blue sky within the image. This routine is exemplary of the routines for computing probabilities called in steps 1606-1608. Control-flow diagrams for the routines called in steps 1607 and 1608 are sufficiently similar to the routine for computing the probability of blue sky that they are omitted, in the interest of brevity. In step 1620, values of a variety of probabilities are initially set to zero. These probabilities includes: (1) $P_{location}$, the probability that the location of the segment corresponds to a blue-sky location; (2) $P_{color}$, the probability that the color of the segment corresponds to blue-sky color; (3) $P_{size}$, the probability that the size of the segment corresponds to the expected size of blue-sky segments; (4) $P_{texture}$, the probability that the computed texture metric for the segment corresponds to the lack of texture expected from a blue-sky region; (5) $P_{intensity}$, the probability that the intensity computed for the segment corresponds to the expected intensity of a blue-sky region; and (6) $P_{Rayleigh}$, the probability that segment is blue sky based on the best two orthogonal traces that can be identified in the segment corresponding to the traces discussed with reference to FIGS. 14A-B.

In following steps, values are determined for all of the above-mentioned probabilities. The order of the steps in FIG. 16c describes one embodiment of the present invention, and can vary in other embodiments of the present invention. If the size of the current segment is greater than a threshold size, as determined in step 1621, then the probability $P_{size}$ may be computed, in one embodiment of the present invention, as a constant coefficient $a_1$ times the difference between the size of the current segment minus threshold size, in step 1622. When the image has been properly oriented and the current segment is at least partially within the upper portion of the image, as determined in step 1623, then the probability $P_{location}$ may be computed as a constant coefficient times a ratio of the number of pixels in the segment that are in the upper portion of the image versus the total number of pixels in the segment, in step 1624. That portion of the image that corresponds to the upper portion of the image is specified by yet another parameter. Next, in step 1625, the probability $P_{color}$ is computed as a function of the color-channel histograms and other of the per-segment statistics, including the average r, g, and b components and standard deviations. In alternative embodiments of the present invention, the function for computing the probability $P_{color}$ may receive fewer or a greater number of statistics and/or computed metrics. For example, the probability $P_{color}$ may, in certain embodiments, be computed entirely from the histograms for each color channel or, alternatively, from the average r, g, and b components $\overline{r}$, $\overline{g}$, and $\overline{b}$. Next, in step 1626, when the computed texture for the segment is lower than some threshold texture, where the texture is a metric computed from the local entropies of the pixels within the segment, then the probability $P_{texture}$ may be computed as a coefficient times the texture metric, in step 1627. A similar probability $P_{edginess}$ may be computed from the cumulative edginess of the segment, or average gradient computed for pixels within the segment, in alternative embodiments. In step 1628, the probability $P_{intensity}$ may be computed as a function of the average intensity of the segment, the standard deviation of the intensity within the segment, the average intensity in the image, and the deviation of intensities within the image. Alternatively, a probability $P_{luminance}$ may be computed based on segment and image average luminances and standard deviations. When, as determined in step 1629, two orthogonal traces can be found within the segment that show the color characteristics described with reference to FIGS. 14A-B, then the probability $P_{Rayleigh}$ is computed, in step 1630, from the correspondence of pixel values along the two orthogonal traces to an ideal color change along the two characteristic directions for sky, as discussed with reference to FIG. 14B.

It should be noted that, in alternative embodiments of the present invention, different, fewer, or a greater number of individual probabilities may be initially computed. For example, as discussed above, a $P_{edginess}$ probability may be computed in place of, or in addition to, the probability $P_{texture}$. These probabilities may be computed from the statistics discussed with reference to FIG. 16B and shown in steps of FIG. 16C, or may be alternatively computed from different statistics, including both statistics and metrics computed for individual pixels as well as statistics and metrics computed for groups of pixels within a segment or for entire segments. In alternative embodiments, non-linear functions may be employed, rather than the simply linear functions discussed above, for computing the various probabilities from statistics and metrics.

Finally, in step 1631, the probability that the segment corresponds to blue sky, P(blue_sky), is computed as a function of the individual statistics $P_{size}$, $P_{location}$, $P_{color}$, $P_{texture}$, $P_{intensity}$, and $P_{Rayleigh}$. In various different embodiments of the present invention, the individual probabilities may be differently weighted when combined by this function, and various embodiments of the present invention may employ linear combinations or non-linear combinations of the underlying probabilities to compute P(blue_sky).

In general, in certain embodiments of the present invention, the probability that a segment corresponds to a blue-sky region within an image is greater when the segment is larger, since blue-sky regions within images are generally reasonably large. The probability the segment represents blue sky increases when the segment occurs in the upper portion of the image, since most images feature large blue-sky regions in the upper portion of the image. Many different images may be analyzed to construct a color model for blue sky within images, the color model expressed as an expected set of color-channel histograms, expected average color components and expected standard deviations of color components, and other such statistics. Per-segment statistics computed for an individual segment can be compared with the statistics that together comprise a general color model for sky in order to determine the probability that a particular segment corresponds to blue sky. In general, blue-sky regions of images are featureless, non-textured, and smooth, and therefore both the texture and edginess computed for blue-sky regions should have low values. In other words, the local entropy and average gradient within blue-sky regions are both low. In most images, blue-sky regions have the greatest average intensities of any regions within the image. Exceptions are images that feature both blue sky and snow. Therefore, when the average intensity of pixels within a segment is greater by some number of standard deviations than the average intensity of pixels in the image, the probability that the segment is blue sky is greater. The color variation along two orthogonal traces representing vertical and horizontal directions with respect to the sky has characteristic properties discussed with reference to FIGS. 14A-B. Therefore, the more closely two orthogonal traces identified within a segment correspond to the characteristics discussed with reference to FIG. 14B, the greater the probability that the segment corresponds to a blue-sky region within the image.

The routines for computing the probability that a segment corresponds to a gray-sky region of an image and the probability that a segment corresponds to a snow region of an image, as discussed above, are similar to the above-described routine for computing the probability that the segment corresponds to a blue-sky region of an image. Of course, neither the gray-sky calculation nor the snow calculation employs the Rayleigh scattering considerations employed in computing the blue-sky probability. Furthermore, the color model for gray sky and snow is different than the color model for blue sky. The texture and/or edginess model for snow may be somewhat different than that for sky regions and, as discussed above, snow regions generally exhibit greatest luminance or greatest intensity of any regions within an image. While sky-related segments should appear in the upper portion of an image, snow regions are more likely to occur in the lower portion of an image.

Figure 16D:
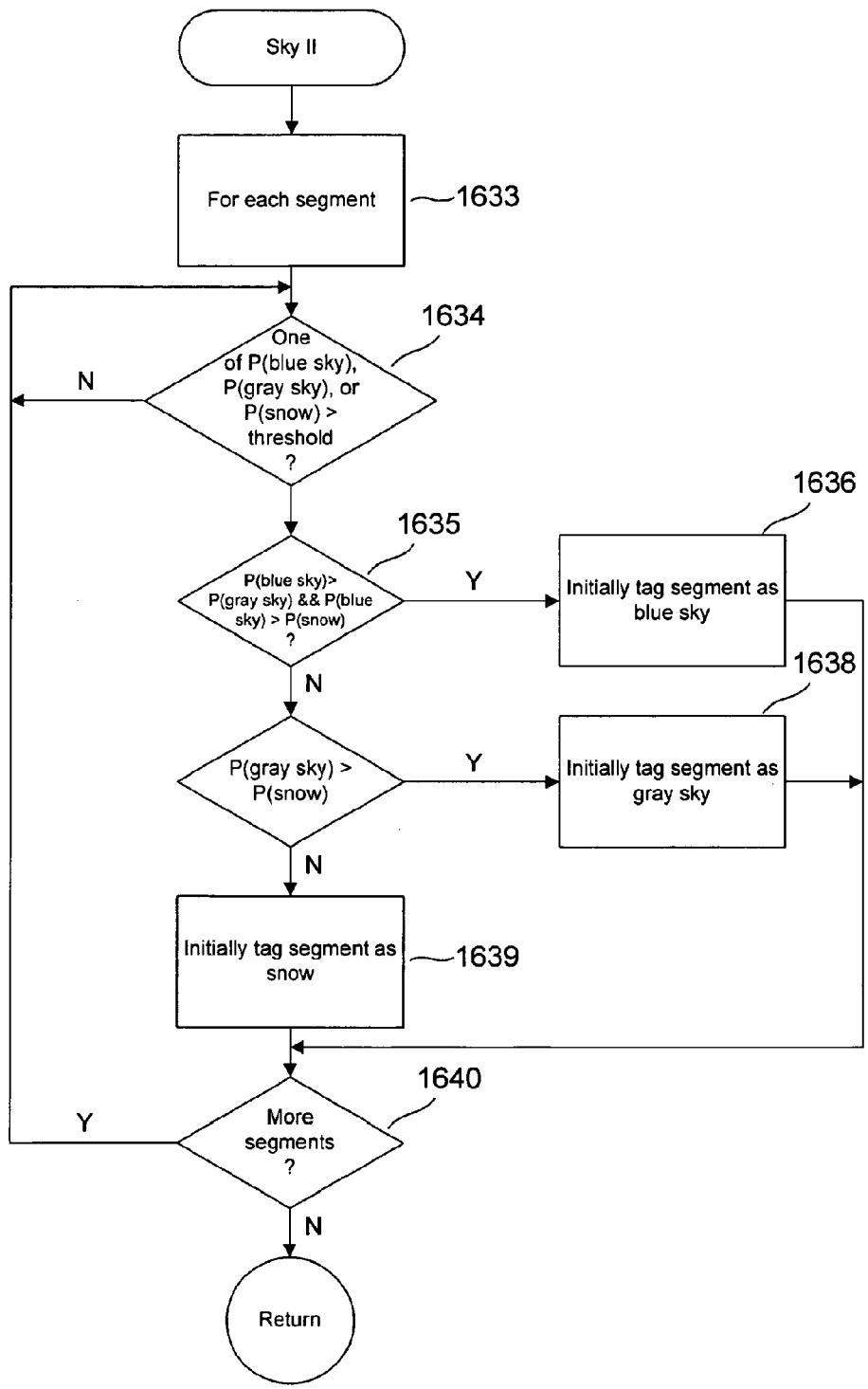

FIG. 16D provides a control-flow diagram for the second part of the "tag sky" routine, shown as step 1610 in FIG. 16A. This portion of the "tag sky and snow" routine includes a for-loop comprising steps 1633-1640. The for-loop of steps 1633-1644 iterates over each segment within the currently considered image. If one of the three probabilities P(blue_sky), P(gray_sky), or P(snow) is greater than a threshold value, as determined in step 1634, then additional steps of the for-loop may be executed to determine a tag for the segment. Otherwise, the segment is left untagged or, equivalently, left with the tag "unknown." If the probability P(blue_sky) is greater than P(gray_sky) and P(blue_sky) is greater than P(snow), as determined in step 1635, then the segment is initially tagged as "blue sky," in step 1636. Otherwise, if P(gray_sky) is greater than P(snow), as determined in step 1637, then the segment is initially tagged as "gray sky," in step 1638. Otherwise, the segment is initially tagged as "snow," in step 1639.

Figure 16E:
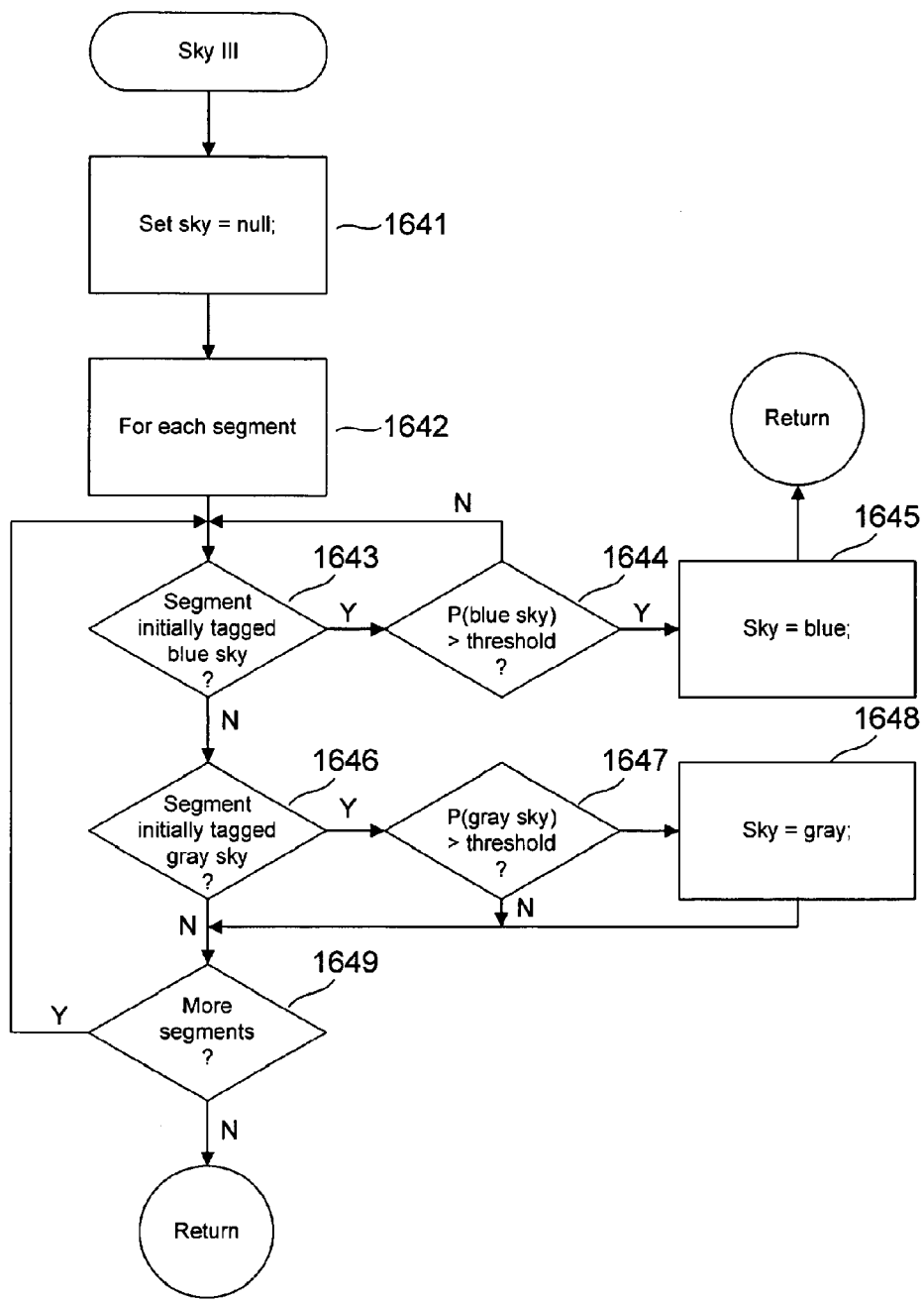

FIG. 16E provides a control-flow diagram for the third part of the "tag sky" routine, shown as step 1611 in FIG. 16A. The local variable "sky" is set to a null value in step 1641. Then, in the for-loop comprising steps 1642-1649, each segment in the image is again considered. If the segment has initially been tagged as "blue sky," as determined in step 1643, and if the probability that the segment represents blue sky is greater than a threshold probability, as determined in step 1644, the variable "sky" is set to "blue" in step 1645. Similarly, if the segment is initially tagged as "gray sky," as determined in step 1646, and if the probability that the segment corresponds to gray sky is greater than a threshold value, as determined in step 1647, then the variable "sky" is set to "gray."

Figure 16F:
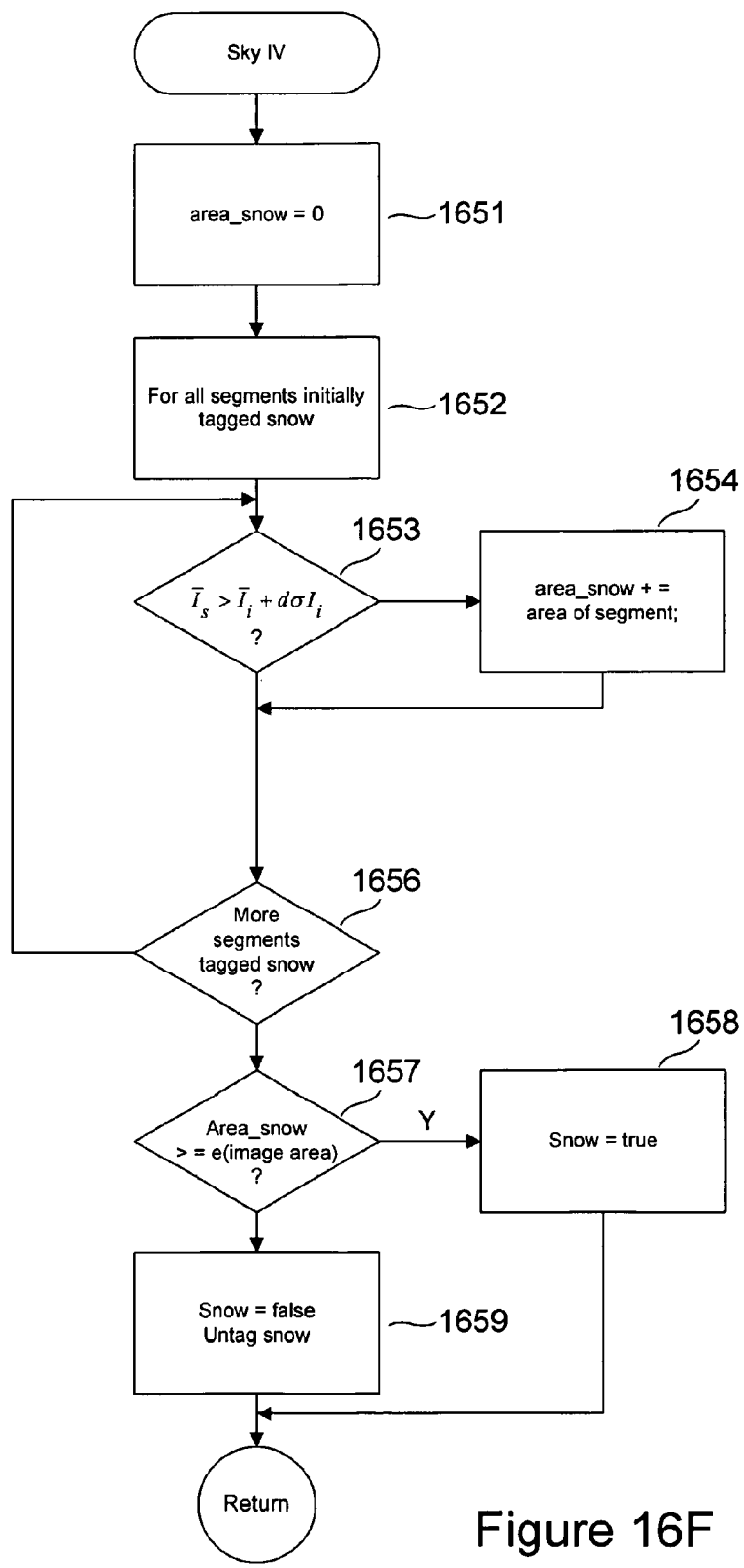

FIG. 16F provides a control-flow diagram for the fourth part of the "tag sky" routine, shown as step 1612 in FIG. 16A. In step 1651, the variable "area_snow" is set to 0. Then, in the for-loop comprising steps 1652-1656, each segment that is initially tagged as "snow" is again considered. If the average intensity for the segment is greater than the average intensity for the image plus a coefficient times the standard deviation for intensity, as determined in step 1653, then the variable "area_snow" is incremented by the area of the currently considered segment. When the value stored in variable "area_snow" exceeds some portion of the image area, as determined in step 1657, then the variable "snow" is set to TRUE, in step 1658. Otherwise, the variable "snow" is set to FALSE, in step 1659, and all segments tagged "snow" are untagged.

Figure 16G:
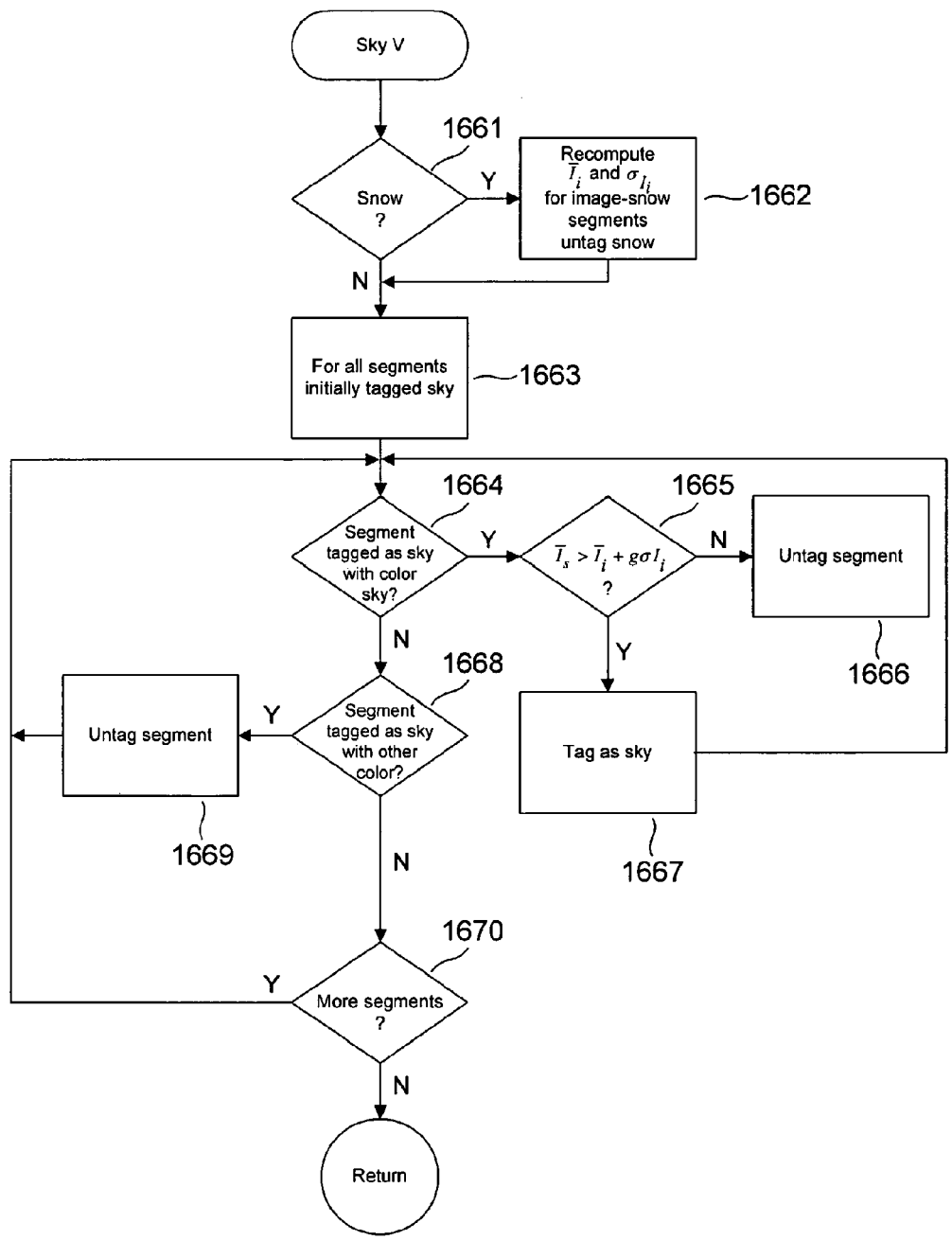

FIG. 16G provides a control-flow diagram for the fifth part of the "tag sky" routine, shown as step 613 in FIG. 16A. If the variable snow is TRUE, as determined in step 1661, then the average intensity and standard deviation for intensity for snow segments within the image is recomputed, in step 1662, and all segments tagged "snow" are untagged. Then, in the for-loop comprising steps 1663-1670, all segments initially tagged as "sky" are reconsidered. If the currently-considered segment was initially tagged as a sky segment having the color stored in variable "sky," as determined in step 1664, then if the average intensity within the segment is greater than the recomputed average image intensity plus a coefficient times the intensity standard deviation, as determined in step 1665, then the segment is permanently tagged as "sky," in step 1667. Otherwise the segment is untagged in step 1666. If the segment is tagged as sky of the color not stored in the variable "sky," as determined in step 1668, then the segment is untagged, in step 1669. Thus, in this portion of the "tag sky" routine, those segments tagged as sky of the dominant sky color with appropriate high intensities are permanently tagged as "sky," and all other segments initially tagged as "sky" or "snow" are untagged.

Figure 16H:
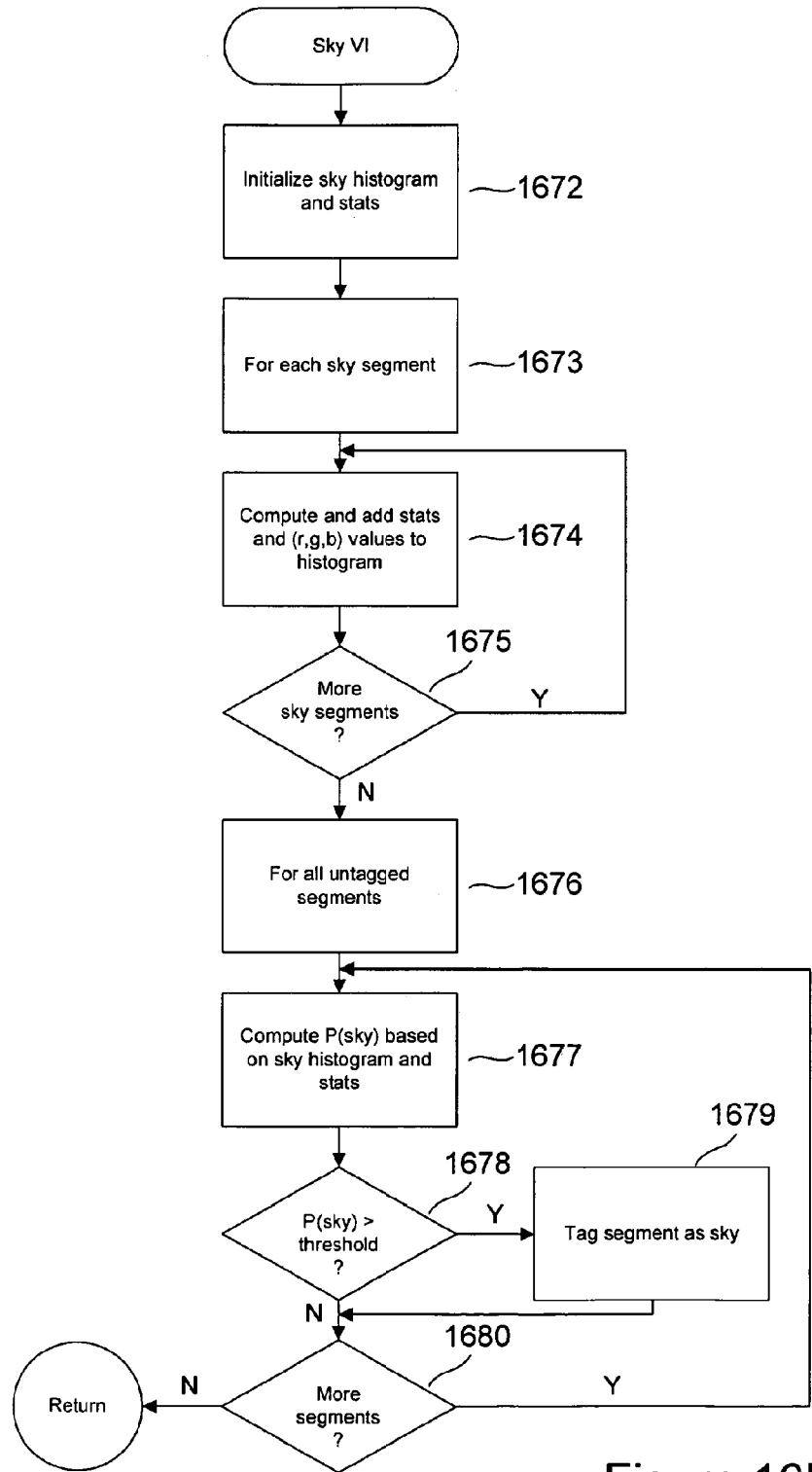

FIG. 16H provides a control-flow diagram for the sixth part of the "tag sky" routine, shown as step 1614 in FIG. 16A. In step 1672, a data structure for a sky histogram and various variables for sky statistics are initialized. Then, in the for-loop comprising steps 1673-1675, statistics and RGB components computed for each sky segment are added to the cumulative sky histogram and statistics initialized in step 1672. Then, in the for-loop comprising steps 1676-1680, all untagged segments in the image are reconsidered. A probability P(sky) is computed for the currently considered segment, in step 1677, based on the cumulative sky histogram and sky statistics computed in the for-loop of steps 1673-1675. When the probability that the currently considered segment is a sky segment is greater than a threshold value, as determined in step 1678, then the segment is tagged as "sky." Thus, in this final section of the "tag sky" routine, a color model based on the sky segments initially recognized in the previous portions of the "tag sky" routine is applied to all untagged segments in the image in order to identify any additional segments corresponding to sky. In this important step, for example, small regions of sky, such as sky regions in the background behind a tree or bushes, that would initially be rejected based on size, can now be correctly classified as sky. Thus, at the conclusion of the routine "tag sky," all segments in the image corresponding to sky are tagged as "sky," with relatively high probability. In alternative embodiments of the present invention, detected snow segments may remain tagged as "snow," and various mixed-sky segments, such as segments corresponding to clouds, may be recognized and tagged as "sky," based on more sophisticated sky models.

Figure 17:
FIG. 17 shows an exemplary image that includes human-face and human-skin regions.

With sky segments identified and tagged, the next segments identified and tagged by method embodiments of the present invention include segments corresponding to human-face and human-skin regions within images. FIG. 17 shows an exemplary image that includes human-face and human-skin regions. In a first step of face and skin tagging, a face-identifying routine is employed to identify human faces within the image. A variety of well-known face-detection methods can be used for this purpose. Face detection may employ both a human-skin color model as well as a template-based approach to recognizing common facial features.

Figure 18:
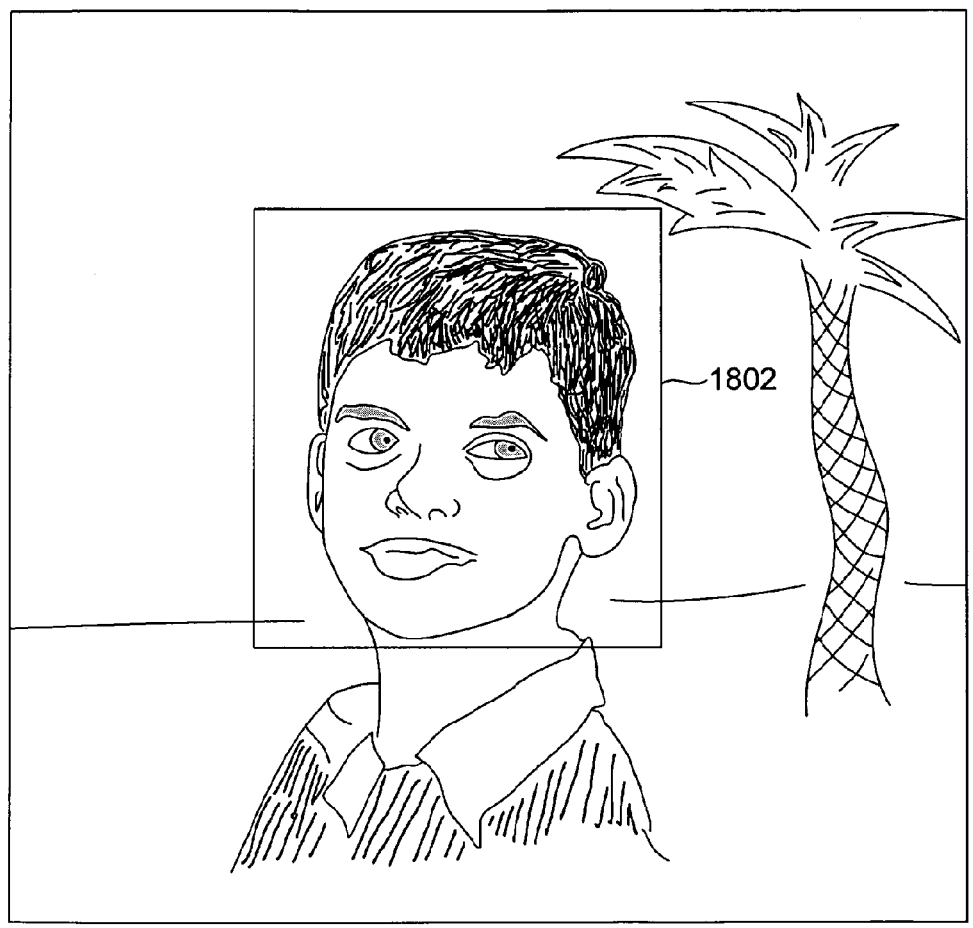
FIG. 18 shows a rectangular region that includes the face in the image shown in FIG. 17.

Once faces are identified in the image, each face is separately considered, by certain method and system embodiments of the present invention. First, a rectangular region is constructed within the image that encloses the face. FIG. 18 shows a rectangular region that includes the face in the image shown in FIG. 17. The rectangular region is sized to include the face as well as additional portions of the subject's head and portions of the background of the image that surrounds the face. The rectangular region 1802 may be scaled to a common scale and smoothed, for further analysis. Next, the skin-color model and relative location in the rectangle are used to partition the pixels within the rectangular region enclosing a face into three partitions: (1) likely face-region pixels; (2) likely non-face pixels; and (3) unknown pixels. In one embodiment of the present invention, 25% of the pixels within the rectangular region are assigned to the face partition, 25% are assigned to the non-face partition, and the remaining 50% of the pixels are assigned to the unknown partition, with pixels assigned based on a general face-skin-color model and pixel location relative to the middle of the rectangular around the face.

Figure 19:
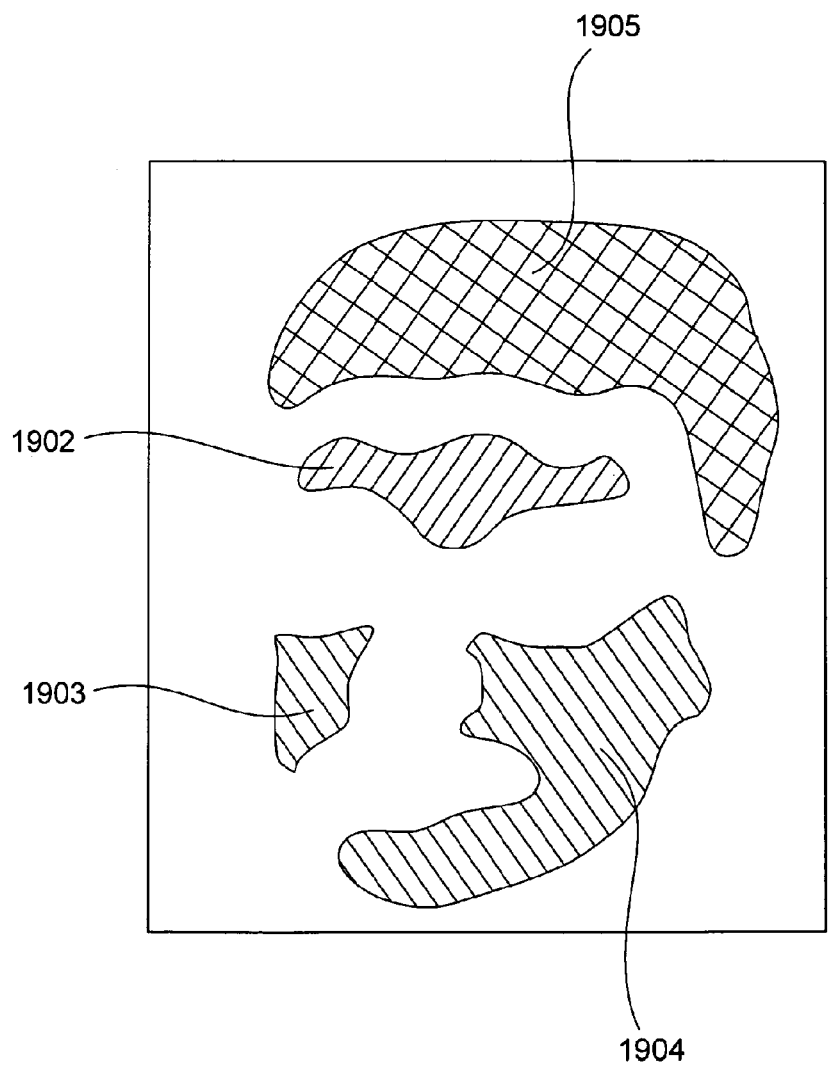
FIG. 19 illustrates partitioning of pixels within the rectangular region shown in FIG. 18 of the image initially shown in FIG. 17.

FIG. 19 illustrates partitioning of pixels within the rectangular region shown in FIG. 18 of the image initially shown in FIG. 17. In FIG. 19, the single cross-hatched areas 1902-1904 represent the face-pixel partition, the doubly cross-hatched region 1905 represents the non-face partition, and the remaining non-cross-hatched portion of the rectangle represents the unknown partition.

Figure 20A:
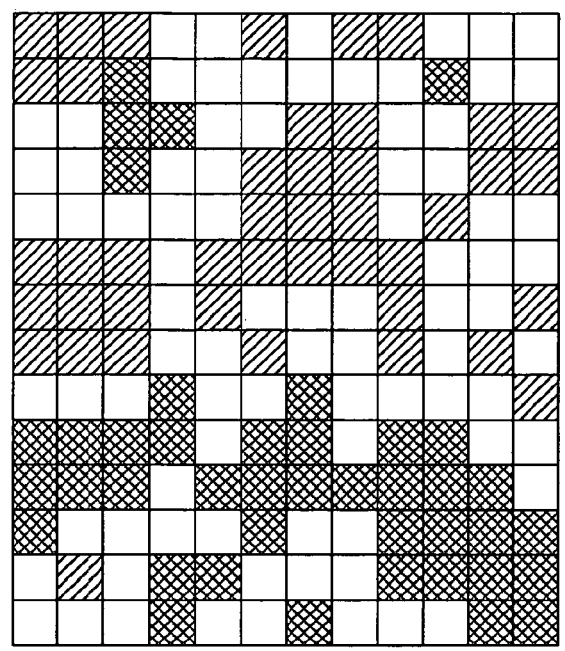
FIGS. 20A-D illustrate one approach to nearest-neighbor-based pixel-partition assignment.
Figure 20B:
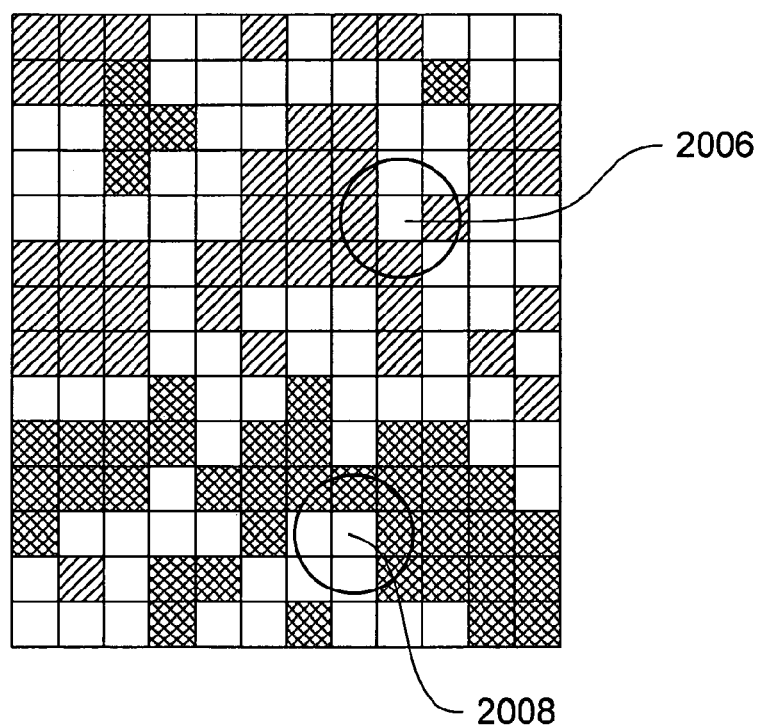
Figure 20C:
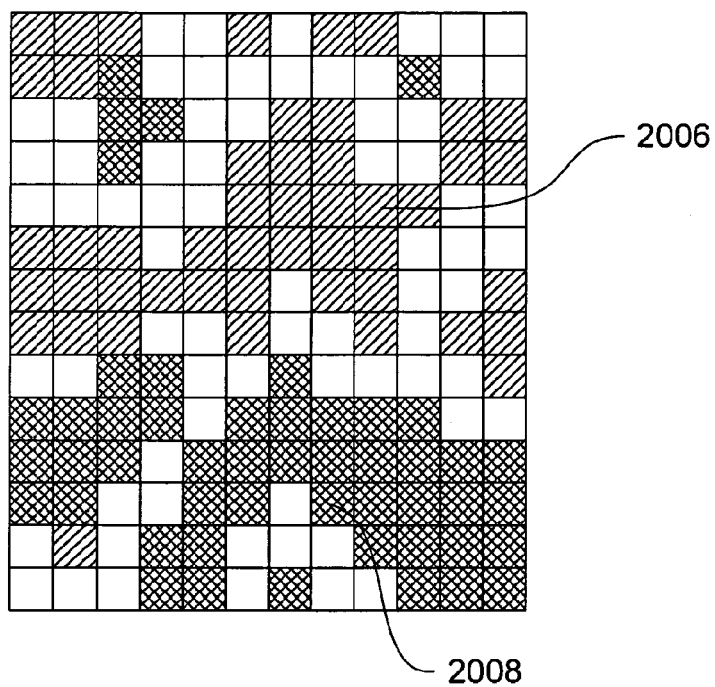

In a following step, the unknown pixels are assigned a number (measure) that estimates the likelihood that this pixel is skin. This measure is assigned based on one of various pixel-assignment methods, to either the face partition or non-face partition. One method for assigning unknown pixels to these other two partitions is a nearest-neighbor-based method. FIGS. 20A-D illustrate one approach to nearest-neighbor-based pixel-partition assignment. FIG. 20A shows a portion of a rectangular region overlying a face following initial assignment of pixels to the face, non-face, and unknown partitions. The cross-hatching conventions used in FIG. 19 are employed in FIGS. 20A-D. As shown in FIG. 20B, pixels that are identified to have a majority of nearest neighbors assigned to either the face partition or non-face partition are themselves assigned to the partition to which the majority of their nearest neighbors are assigned. For example, pixel 2006 has five face-partition neighbors out of eight nearest neighbors, and therefore is subsequently assigned to the face partition. Similarly, pixel 2008 has five of eight nearest neighbors assigned to the non-face partition, and is therefore subsequently assigned to the non-face partition. FIG. 20C shows the same rectangular region of pixels from a rectangular overlay of a face as shown in FIG. 20A, following a first additional round of pixel assignment. Pixel 2006 has been assigned to the face partition and pixel 2008 has been assigned to the non-face partition. Additional assignments based on the majority-of-nearest-neighbors criterion have also been made.

Figure 20D:
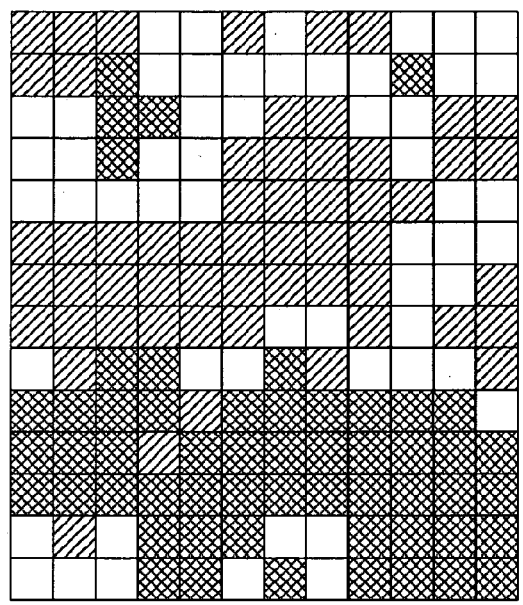

An additional iteration of majority-based assignments leads to the assignments shown in FIG. 20D. At some point, a tie-breaking method must be used to resolve cases in which pixel assignment cannot be made based on a majority of nearest neighbors.

In a more general case, the value assigned to a pixel is the weighted average of the values of the pixel's K nearest neighbors, where each weight is typically proportional to the inverse of the distance between the pixel and a neighbor pixel. The distance between the pixel and the neighbor pixel, d(V, Y), is defined by the square root of the weighted average of the square of a set of features of cardinality features:

$$d(V, Y) = \sqrt{\frac{\sum_{i=1 \text{ to features}} w_i(V-Y)_i^2}{\text{features}}}$$

The weight $w_i$ of each of the features can be determined in variety of methods. In one embodiment of the present invention, the weight is found as the Fischer's linear discriminate between the likely face-region pixels and the likely non-face pixels. In another embodiment, the weight maximizes the entropy of the separation between the likely face-region pixels and the likely non-face pixels. In yet another embodiment, the weight of each feature is the range of values of that feature in the likely face-region pixels and likely non-face pixels group, divided by the range of values of that region in the unknown pixels. In one embodiment of the present invention, the weights are a monotonic function of the weights obtained in one of the above methods.

Figure 21:
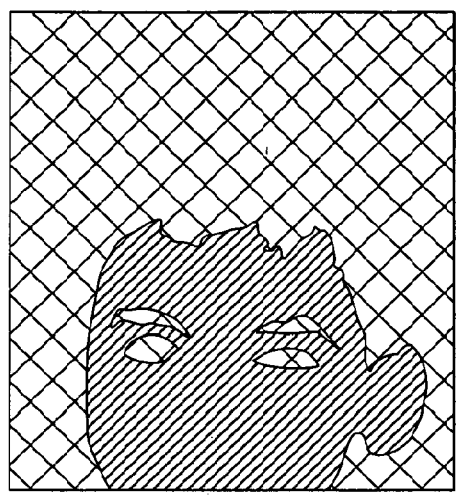
FIG. 21 shows the result of nearest-neighbor processing for the rectangular portion of the image shown in FIGS. 18 and 19.

In alternative nearest-neighbor methods, the neighborhood about a pixel may be expanded until a majority-of-neighbors-based decision can be made, and all pixel assignments can therefore be carried out in a single pass through the rectangular face-containing portion of the image. Many other nearest-neighbor-based approaches are possible. The approaches may also combine probabilities based on the number of nearest neighbors already assigned to either of the two partitions "face" and "non-face" as well as probabilities based on the color of the pixel and a skin-color model. As a result of nearest-neighbor analysis, all pixels within the rectangular portion of the image containing a detected face end up assigned either to the face partition or to the non-face partition. FIG. 21 shows the result of nearest-neighbor processing for the rectangular portion of the image shown in FIGS. 18 and 19.

Another alternative method for assigning a skin likelihood measure to each pixel is to first calculate the relative weights $w_i$ of each of the three color and two location features using one of the above methods. Next, a five dimensional weighted Gaussian model is calculated based on the "face" pixels only. Applying the learned Gaussian model to the "unknown" pixels in the face rectangular gives the skin likelihood measure.

Figure 22:
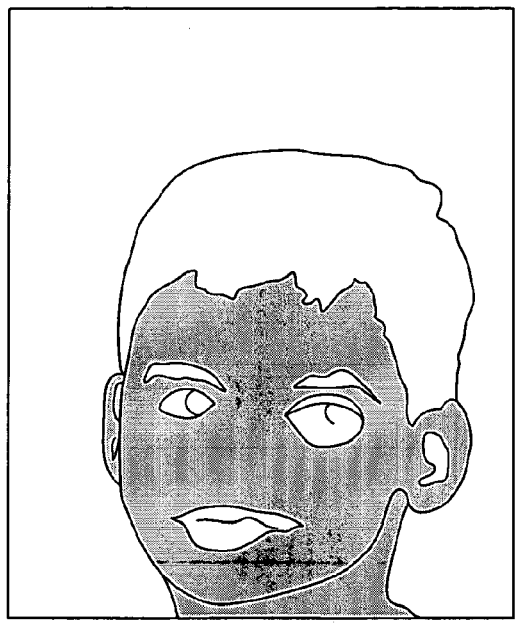
FIG. 22 illustrates a face skin map obtained by application of a face-specific color model to the rectangular region of an image shown in FIGS. 18, 19, and 21.
Figure 23:
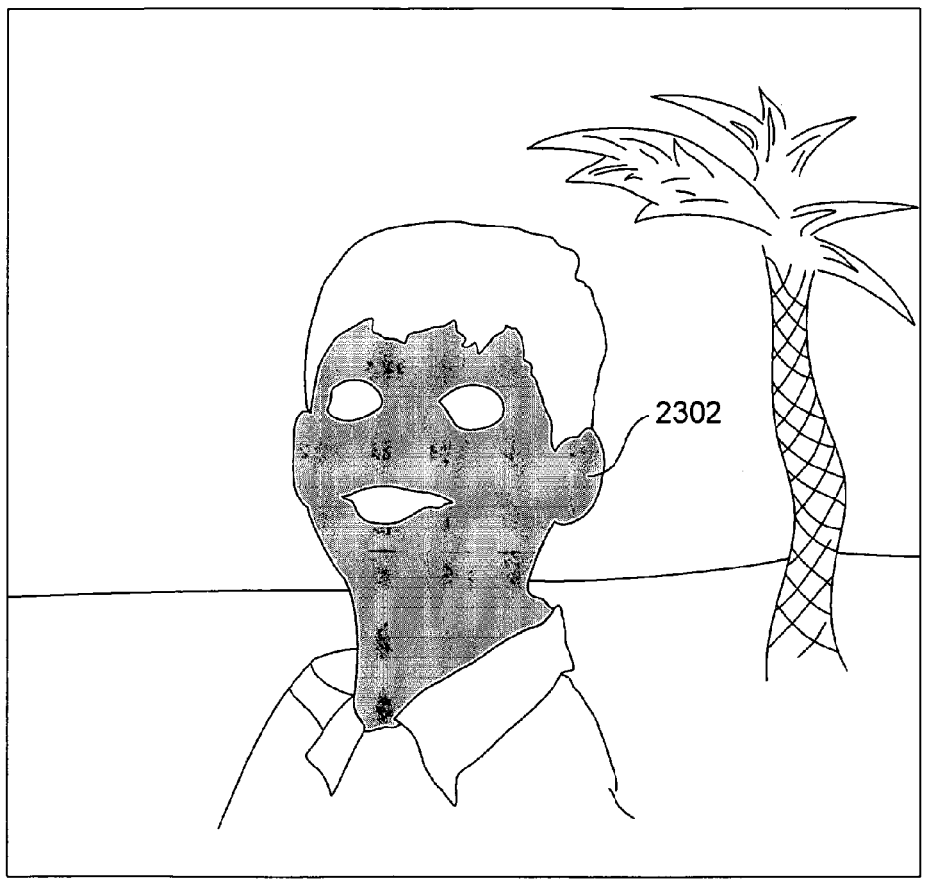
FIG. 23 illustrates the tagged face and skin segments within the original image shown in FIG. 27.

At this point, a face-skin segmentation can be extracted from the skin likelihood measure (e.g. by applying a threshold to the skin likelihood measure). FIG. 22 illustrates a face skin map obtained by application of a face-specific color model to the rectangular region of an image shown in FIGS. 18, 19, and 21. Eye-detection methods are then used to recognize eyes and remove regions about and including the eyes from the face skin map. Many consumers prefer that skin be smoothed, by image-processing techniques, but also prefer that high-resolution details of the eyes and skin surrounding the eyes be preserved, since these details contribute significantly to human facial expressions. The eye regions are removed from the face skin map in order to prevent those eye regions from subsequent smoothing operations directed to segments identified as skin. Those segments that fall completely or mostly within skin regions in the face skin map are tagged as skin-face segments, and a new color model, the body-skin color model, is generated for the identified face segments. In another embodiment, all of the pixels in the rectangular around the face are taken into account in the calculation of the body-skin color model, and their importance (weight) in the calculation is determined by their skin likelihood measure. The body-skin color model is then applied to remaining segments in the image to identify additional body-skin segments within the image based on this body-skin-color model. FIG. 23 illustrates the tagged face and skin segments within the original image shown in FIG. 27. In FIG. 23, the face and skin segments have all been shaded 2302. Face and skin tagging allows subsequent smoothing and color normalization of face and skin segments that lead to image enhancements preferred by many consumers.

Figure 24:
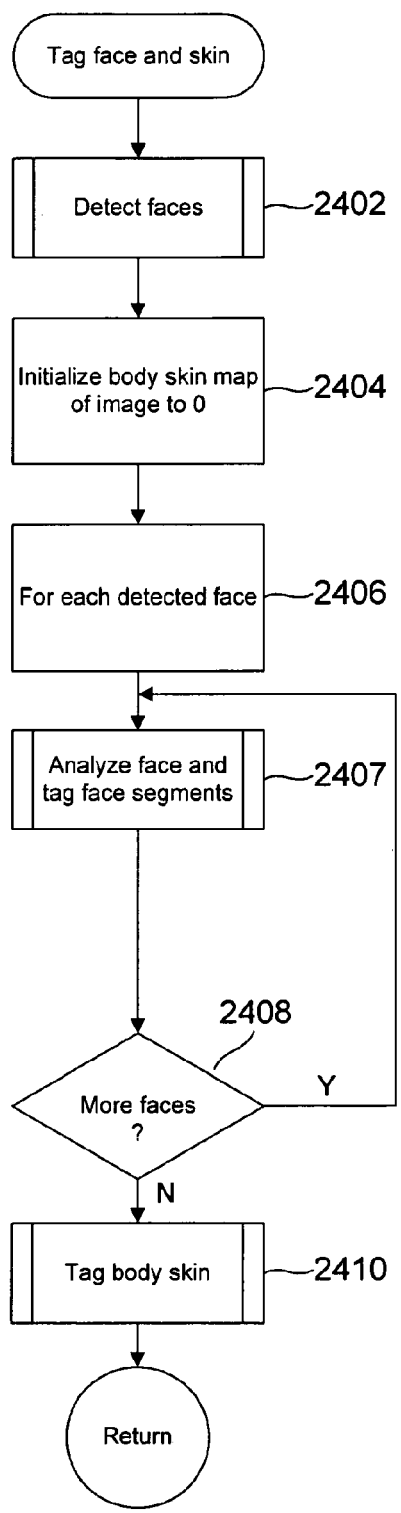
FIGS. 24-27 provide control-flow diagrams for the routine "tag face and skin" called in step 1506 of FIG. 15.

FIGS. 24-27 provide control-flow diagrams for the routine "tag face and skin" called in step 1506 of FIG. 15. FIG. 24 provides a control-flow diagram for the highest-level portion of the routine "tag face and skin." In step 2402, any of various face-detection routines are called in order to detect faces within an image. In step 2404, a body skin map for the image is initialized to 0, or, in other words, all pixels are initialized to be non-body skin. Then, in the for-loop of steps 2406-2408, each face detected by the face-detection routine called in step 2402 is separately considered by a face-analysis and face-tagging routine called in step 2407. Finally, the routine "tag body skin" is called, in step 2410, in order to tag all additional body skin in an image related to the detected faces.

Figure 25:
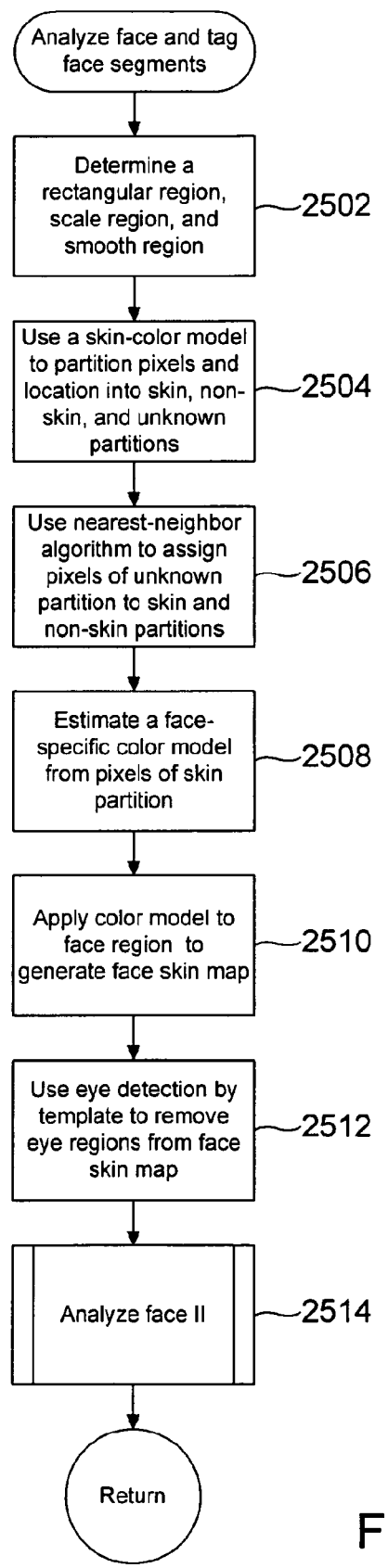

FIG. 25 provides a control-flow diagram for the first part of the face analysis routine called in step 2407 of FIG. 24. In step 2502, a rectangular region, such as that shown in FIG. 18, is constructed about a currently considered face detected by a face-detection routine called in step 2402 of FIG. 24. The rectangular region may be scaled to a fixed size and smoothed by any of various smoothing operators or methods. Next, in step 2504, a skin color model and the relative locations of pixels within the rectangular region are used to partition pixels within the rectangular region into face, non-face, and unknown partitions. Then, in step 2506, a nearest-neighbor-based method is used to assign the pixels in the unknown partition to either of the face or non-face partitions. In step 2508, a face-specific color model is constructed from those pixels within the face or skin partition resulting from nearest-neighbor analysis in the previous step 2506. In step 2510, the face-specific color model is applied to the rectangular portion of the image that includes the detected face to generate a face skin map. In the face skin map, in one embodiment, each pixel is associated with a bit. Bit value "0" indicates non-face and a bit value "1" indicating face. Alternative embodiments of the face skin map are possible. Next, in step 2512, an eye-detection method is used to remove the eyes and regions about the eyes from the face skin map. Various eye-detection routines can be employed. In certain cases, eye-detection routines apply an eye template to curves detected at locations known to correspond to eyes within the detected face. In alternative embodiments of the present invention, the eye-detection step 2512 may be omitted. Finally, a second part of the face analysis routine is executed, represented by step 2514 in FIG. 25.

Figure 26:
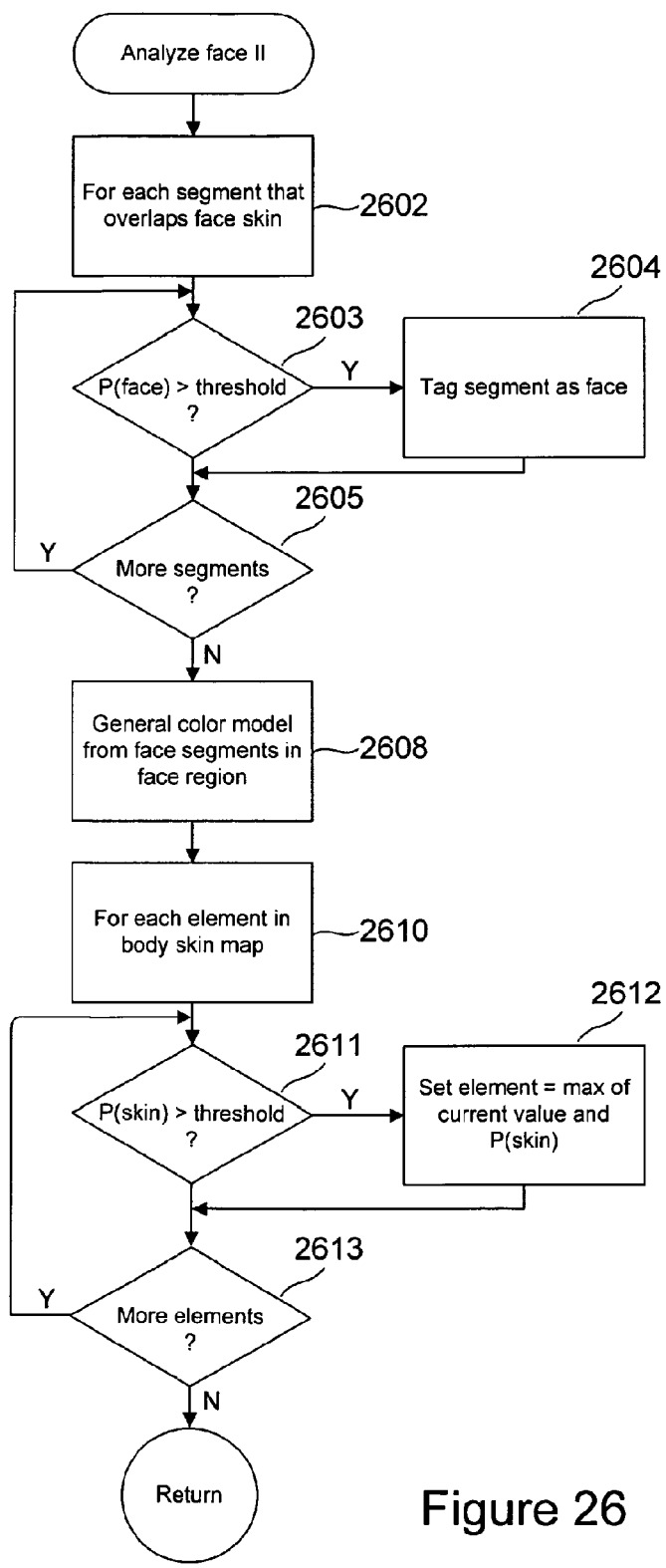

FIG. 26 provides a control-flow diagram for the second part of the face analysis routine, shown as step 2514 in FIG. 25. In the for-loop of steps 2602-2605, each segment of the image that overlaps face skin regions in the face skin map, generated in step 2510 of FIG. 25, is considered. If the probability that the segment corresponds to a face region is greater than a threshold value, as determined in step 2603, then the segment is tagged as "face." The probability P(face) may be computed from any of various per-segment statistics computed for the segment, including average color-space components, per-segment color-channel histograms, and other such information that can be compared to the face-specific color model generated in step 2508. In addition, the amount of overlap of the segment with face regions of the face skin map may contribute to the probability calculation. Next, in step 2608, a general color model for the face segments tagged in step 2604 is developed and, in the for-loop of steps 2610-2613, the color model developed in step 2608 is applied to all non-skin elements in the body skin map in order to identify any additional skin regions using the general color model developed for the current face. The probability that a particular element, such as a pixel or group of pixels, responds to skin, P(skin), is greater than a threshold value, as determined in step 2611, then the skin map is updated to indicate that that element, such as a pixel or a group of pixels, corresponds to skin in step 2612.

Figure 27:
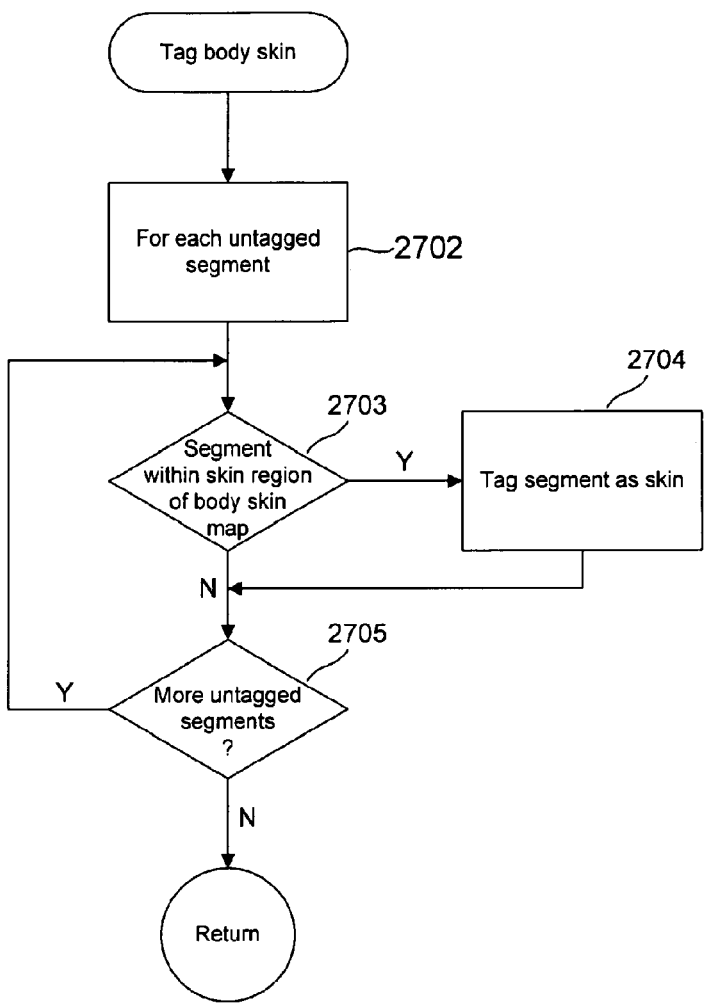

FIG. 27 provides a control-flow diagram for the routine "tag body skin" called in step 2410 of FIG. 24. Each untagged segment in the currently considered image is considered in the for-loop of steps 2702-2705. If the segment overlies a region identified as skin in the body skin map developed by consideration of all detected faces, as determined in step 2703, then the currently considered segment is tagged as "skin," in step 2704.

As a result of execution of the routine "tag face and skin," all segments within the currently considered image not previously tagged as "sky" and likely to correspond to regions of face or skin in the image are tagged as "face" or "skin." As with previously described routines, there are a variety of different possible alternative embodiments of the routine "tag face and skin," including methods for analyzing images at a coarser granularity than on a per-pixel basis, methods that use fewer or a greater number of computed metrics and statistics, and methods produced by variations in familiar programming parameters, including varying control structures, data structures, modular organization, and other well-known programming parameters.

Finally, the described method embodiment of the present invention identifies and tags segments in the image, already analyzed for sky and skin, which correspond to regions of foliage in an image. Foliage regions may include bushes, grass, trees, distant forest, and other such regions. The color variation of foliage is generally significantly greater than that of sky and skin. However, foliage does exhibit certain characteristics in images.

Figure 28A:
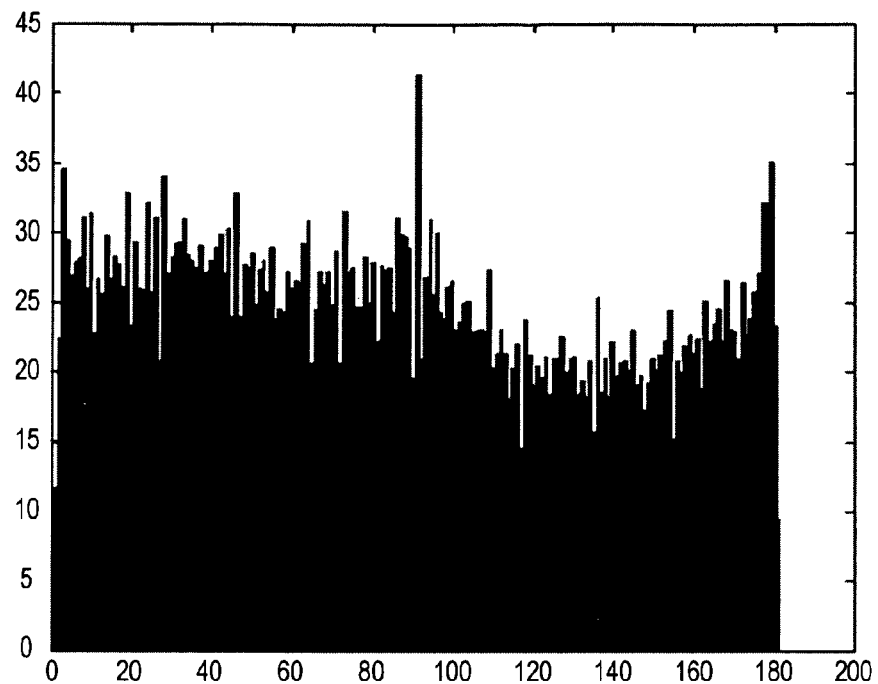
FIGS. 28A-B provide histograms of local directionality within two different types of regions of images.
Figure 28B:
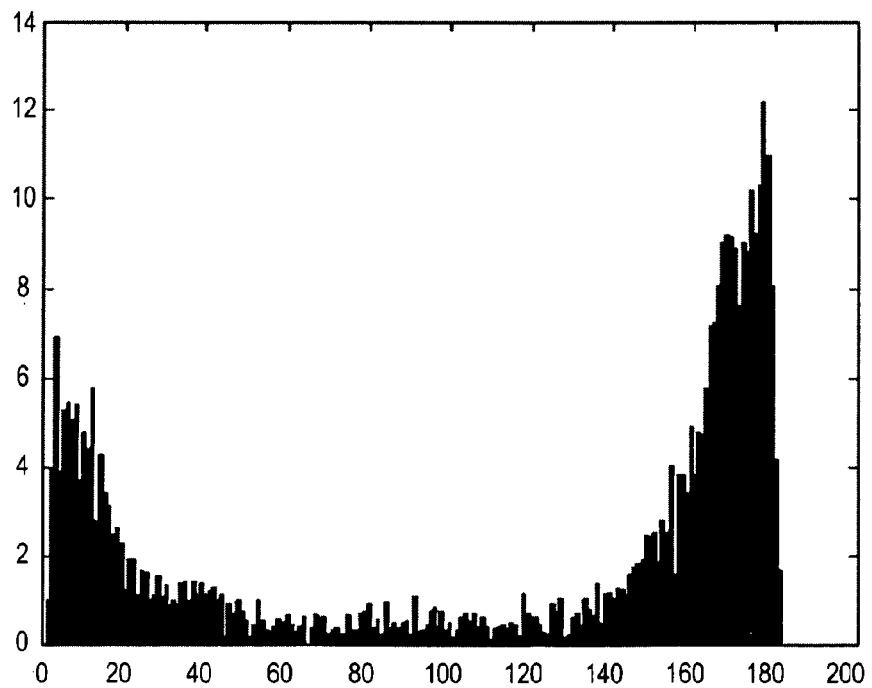

FIGS. 28A-B provide histograms of local directionality within two different types of regions of images. As discussed above, the gradient can be computed for each pixel within an image, where the magnitude of the gradient corresponds to the greatest distance, in color space, between a considered pixel and any of the pixel's neighboring pixels. As discussed above, the gradient has both a magnitude and direction. Within foliage regions, and other regions corresponding to natural features and objects, due to the generally fine-granularity and irregular detail, gradient directions tend to vary relatively uniformly throughout the possible angles in the range 0° to 360°. By contrast, many man-made objects, including walls, surfaces of machines, surfaces of buildings, and other such man-made objects often feature quite regular patterns, in which case the computed gradient directions within segments corresponding to man-made objects tend to be unimodally or bimodally distributed, with one or two prominent directions, such as the horizontal and vertical directions of a brick wall. FIG. 28A shows the gradient directions observed in a foliage segment, while FIG. 28B shows the gradient directions observed in a the picnic table of FIG. 1. The gradient directions in the foliage segment, shown in FIG. 28A, are relatively evenly distributed across all possible gradient directions, while those for the picnic table cluster around a single, relatively broad peak. The probability P(natural) is the gradient-directions-derived probability that a region corresponds to a natural feature or object that exhibits relatively uniformly distributed gradients, rather than the unimodal or bimodal gradient distributions characteristic of man-made objects and features.

Figure 29:
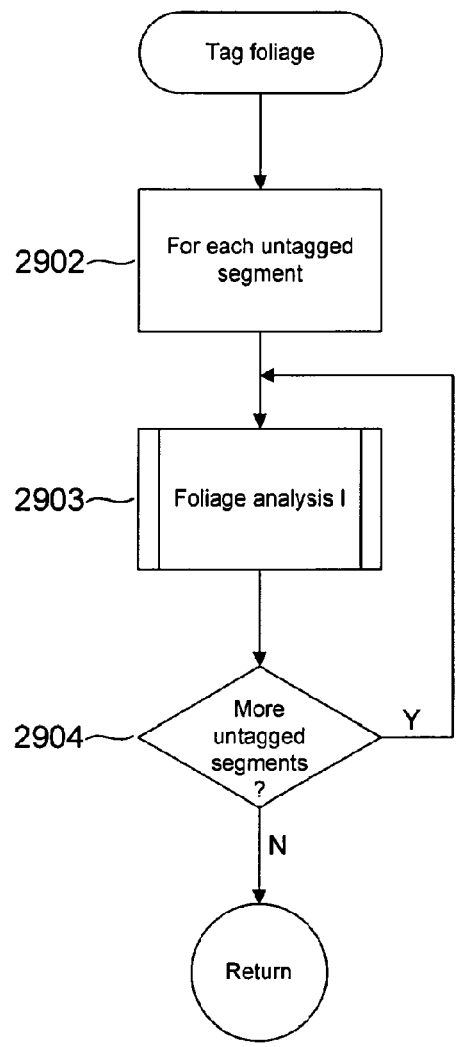
FIGS. 29-31 provide control-flow diagrams for the routine "tag foliage" called in step 1508 of FIG. 15.
Figure 30:
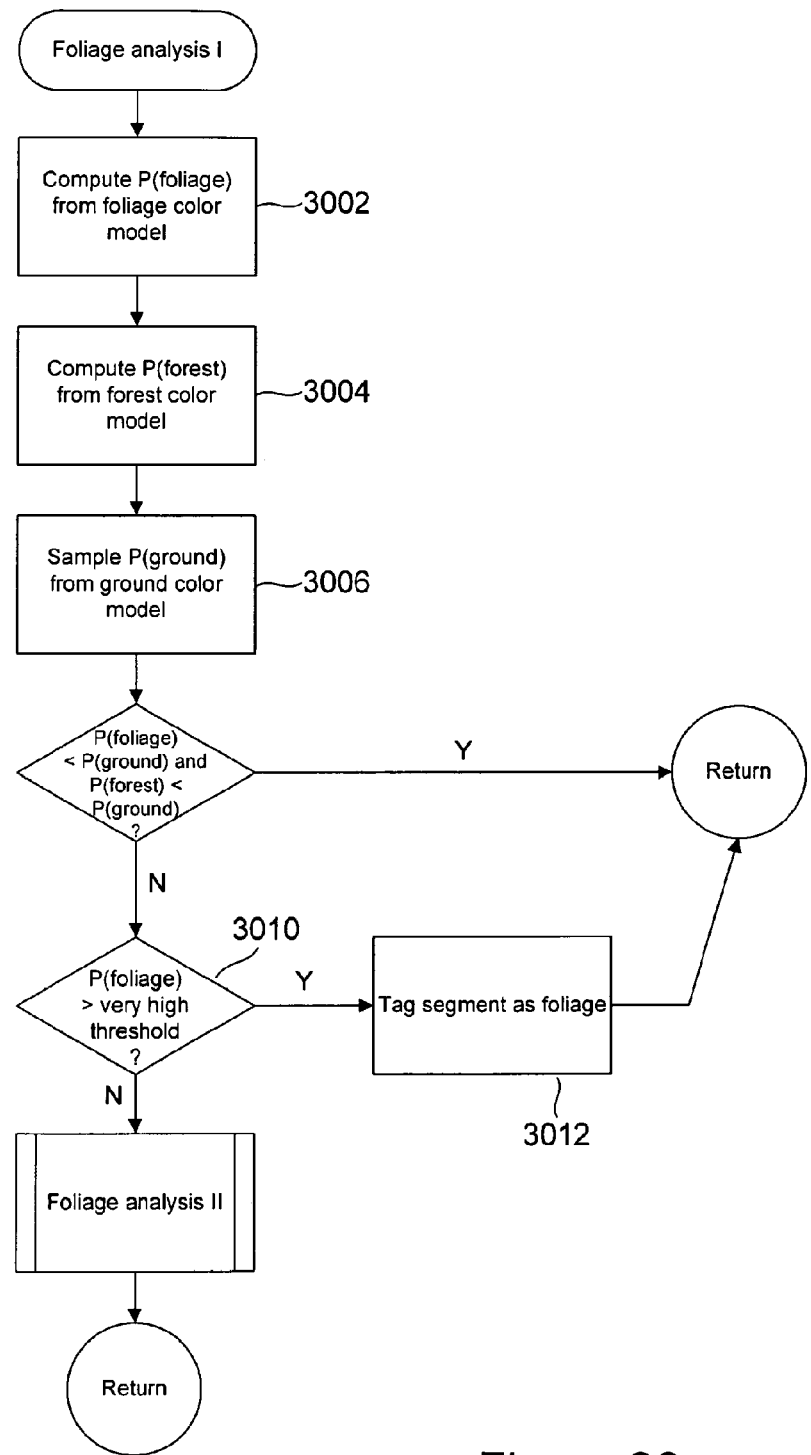
Figure 31:
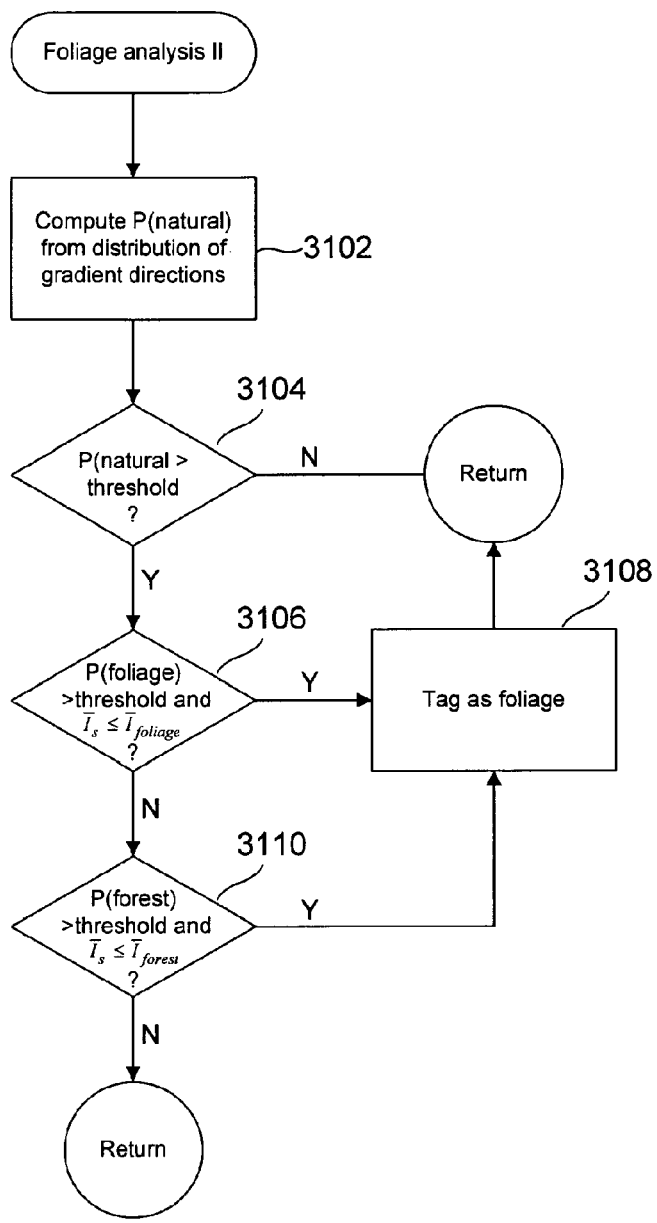

FIGS. 29-31 provide control-flow diagrams for the routine "tag foliage" called in step 1508 of FIG. 15. In the for-loop of steps 2902-2904, each untagged segment in the image is analyzed by a foliage-analysis routine called in step 2903. The foliage-analysis routine is shown in two parts, the first part in FIG. 30 and the second part in FIG. 31. Referring to FIG. 30, foliage analysis begins, in step 3002, by computing the probability that the segment corresponds to a foliage region of an image, P(foliage), from a generalized foliage color model. Similarly, the probability that the segment corresponds to forest and to ground are computed in steps 3004 and 3006. If the probability that the segment is foliage or forest, P(foliage) or P(forest), are both less than the probability that the segment corresponds to a ground region, P(ground), then the segment remains untagged. Otherwise, if the probability that the segment is foliage is greater than a very high threshold value, as determined in step 3010, the segment is tagged as "foliage," in step 3012. Otherwise, the second part of the foliage-analysis routine, shown in FIG. 31, is executed. In the second part of the foliage-analysis routine, the probability that the segment corresponds to a natural region of an image, as opposed to a man-made object, P(natural), is computed from a computed distribution of gradient directions within the segment, in step 3102. If the probability that the segment corresponds to a natural region, P(natural), is not greater than the threshold value, as is determined in step 3104, then the segment remains untagged. Otherwise, if the probability that the segment corresponds to foliage is greater than a threshold value and the average intensity or luminance within the segment is less than or equal to an average foliage intensity or luminance, as determined in step 3106, then the segment is tagged as "foliage," in step 3108. Otherwise, if the probability that the segment corresponds to forest, P(forest), is greater than a threshold value and the average intensity or average luminance within the segment is less than or equal to an average forest intensity or luminance, as determined in step 3110, then the segment is tagged as "foliage," in step 3108. Otherwise, the segment remains untagged.

Thus, following conceptual tagging, carried out by the routine "tag image" called in step 306 of FIG. 3, the segments of a segmented image are tagged as "sky," "face," "skin," "foliage," or "unknown." As discussed above, this tagging then allows, in certain image-processing applications, for an image to be enhanced effectively by applying different enhancement techniques to different types of regions within the image. For example, sky regions may be smoothed and normalized to an expected sky color. Face regions may also be smoothed and normalized, along with skin regions. Because the regions of faces surrounding eyes are not identified as face or skin, by the above-described method, those regions may be sharpened along with other regions of the image. Foliage regions may be sharpened, by subsequent image-processing techniques, to bring out the detail in grass, bushes, trees, and other foliage regions. The intensity or luminance of the various types of regions may also be adjusted, by subsequent image processing, to meet expectations of consumers. In other applications, regions identified as face may be used as the starting point for algorithms devoted to uniquely identifying individuals, or tracking the movement or behavior of individuals in a video stream. As discussed above, an approach similar to the approaches described for identifying sky, face, skin, and foliage segments may be used to recognize other types of segments within images. For example, segments corresponding to regions of snow in an image can be identified by tagging those segments as snow, rather than untagging snow segments, as is done in the above-discussed implementation. Any other type of region that can be characterized by color models, computed metrics, and other statistics and computed values may be added to the types of segments tagged by embodiments of the present invention. A set of metrics, statistics, and models used to identify an additional type of segment need to be specified, along with the algorithms and rules for applying those models, metrics, and statistics to computed per-segment statistics. In addition, routines for tagging such segments need to be called in a correct order with regard to other segment-tagging routines. For example, in the above implementation, sky segments are tagged first, followed by face and skin segments, and then by foliage segments. The sequence corresponds to the ease and reliability by which any particular type of segment can be identified. For example, sky segments are most reliably detected and tagged in the above implementation, and it therefore make sense to identify and tag sky segments prior to undertaking the identification and tagging of additional types of segments, identification and tagging of which are less reliable than identification and tagging of sky segments.

General Approach to Perceptual Segmentation According to the Present Invention

While the detailed embodiment of the present invention, described above with reference to FIGS. 1-31, represents one approach to perceptual segmentation of images according to the present invention, there are many alternative approaches to perceptual segmentation of images that fall within the scope of the present invention. Next, a more general summary of those aspects of perceptual segmentation of images common to, or characteristic of, the methods and systems for perceptual segmentation of images according to the present invention are provided.

Figure 32:
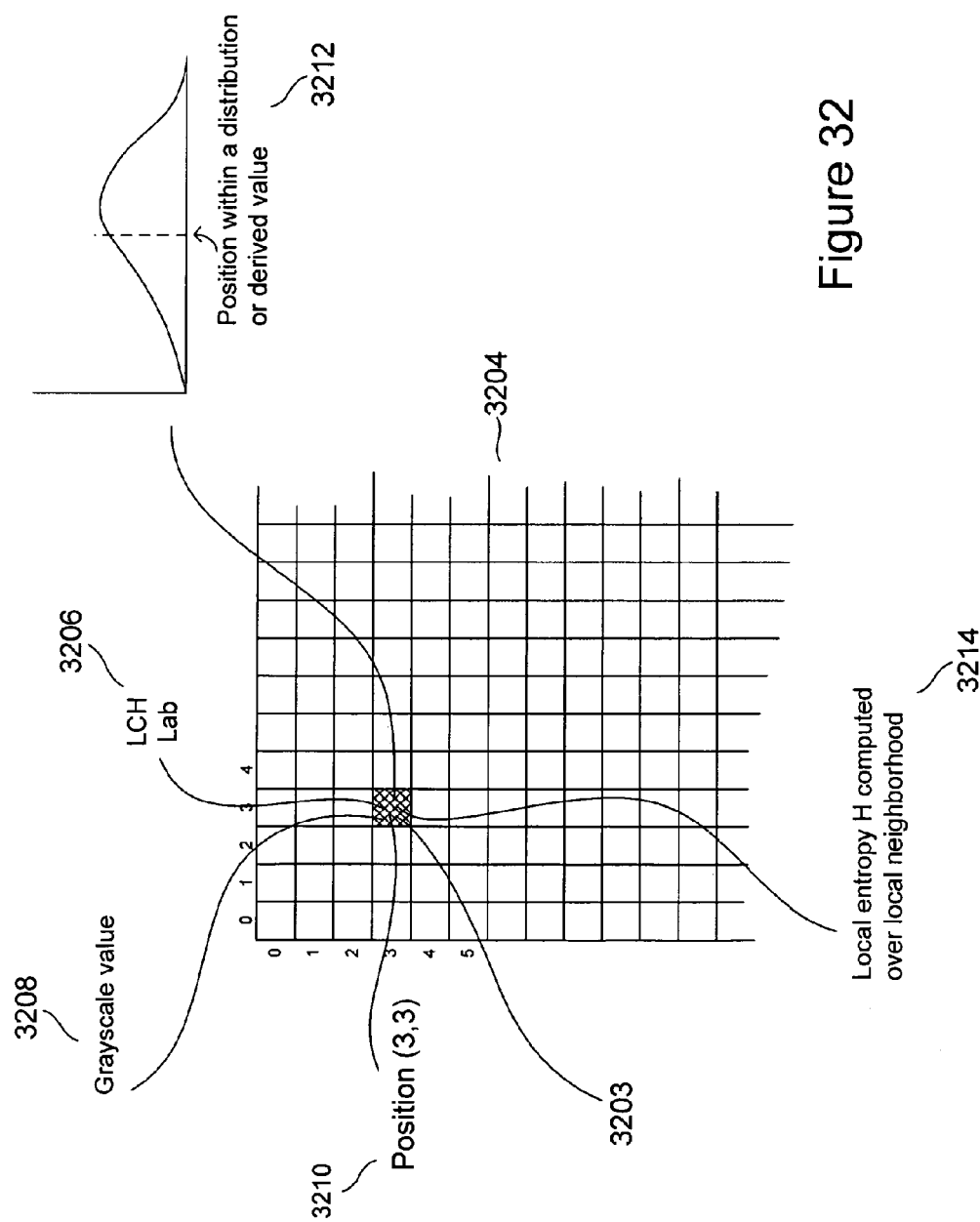
FIG. 32 illustrates the concept of pixel features.

FIG. 32 illustrates the concept of pixel features. FIG. 32 illustrates, in particular, various types of pixel features that may be associated with a particular pixel 3203 within an image 3204. Certain pixel features may be represented as numeric or alphanumeric values associated with the pixel in a digital encoding of the image. Examples of these intrinsic pixel features include the three values that specify the color of a pixel according to one of the well-known color models, including the LCH, Lab, HSI, or RGB color models 3206. Intrinsic pixel features are generally specifically associated with, or included in the representation of, each pixel of an image.

Each pixel of an image may be additionally characterized by a spatial position within the image 3210, generally a pair of coordinates relative to a two-dimensional, Cartesian coordinate system imposed on an image, although other coordinate systems or methods of specifying position may be used. The position of a pixel within an image is an example of a pixel feature extrinsic to the pixel, but intrinsic to the image containing the pixel.

Another type of pixel feature is a computed value for a pixel based on one or more pixel-feature values and a known distribution of pixel-feature values for a particular image containing the pixel, or set of images including the image containing the pixel, or some other set of entities from which pixel-feature-value distributions can be obtained 3212. For example, a computed pixel-feature value might be the number of standard deviations of a pixel-feature value away from a mean value with respect to a known distribution of pixel-feature values. Yet another type of pixel-feature value may be a pixel-feature value computed based on pixel-feature values of pixels in a local neighborhood of the pixel within an image 3214. One example of such a pixel-feature value is the local entropy H computed for a pixel, as discussed above. Another such type of pixel-feature value is a local gradient magnitude, discussed above, or values of various mathematical operators applied to a local neighborhood containing a pixel.

Pixel-feature values are used both in region and segment identification as well as for computing segment features, discussed below. As one example, when the three pixel-feature values related to color are compared to a color model developed for a particular type of region, such as blue sky, the comparison results may be the basis for a method to identify potential blue sky regions in an image and differentiate blue sky regions from other regions. When the three pixel-feature values for each pixel in a region are averaged, or otherwise mathematically processed to produce an aggregate or cumulative value or values for the segment, the aggregate or cumulative value or values may be used to assign one of a number of region or object types to the region.

Figure 33:
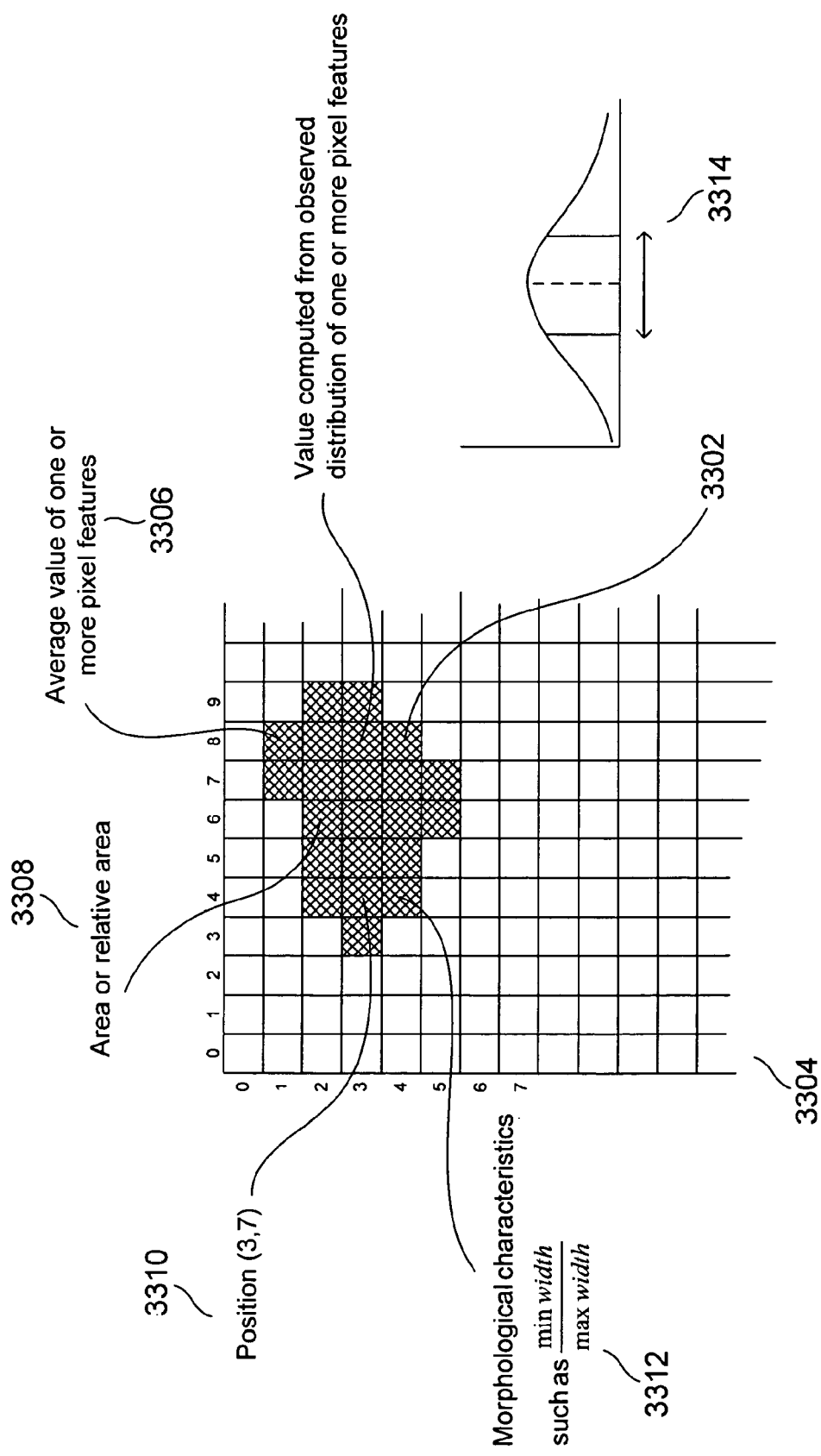
FIG. 33 shows various types of segment features.

FIG. 33 shows various types of segment features. In FIG. 33, a segment, or region, of an image is shown as a number of crosshatched pixels 3302 within a digitally encoded image 3304. One type of segment-feature value that can be computed for a segment is the average or mean value of one or more pixel features of the pixels within the segment 3306. For example, the average grayscale value for the pixels within a segment may be computed as a segment feature for a segment of a black-and-white image. Additional segment features include other values computed from pixel-feature values of pixels within the segment. Another type of segment feature may be the area or relative area 3308 of the segment. Yet another type of segment feature may be the position of the segment within the image 3310, such as the two-dimensional coordinates of the centroid pixel of the region, and/or the orientation of the segment or region within an image. Yet another type of segment feature may be one or more morphological characteristics computed for the segment, such as the ratio of the minimum width, or minimal-length line segment spanning the region, with respect to the maximum width, or maximum-length line segment spanning the region 3312. Another type of segment feature may be a value computed from the observed distribution of one or more pixel features over the pixels within the region 3314, including moments and the entropy. A similar type of segment feature may be a value computed from one of the above-mentioned types of segment features relative to a known distribution of segment features for a particular image, a set of images, or some other set of entities from which a distribution of segment features is obtained.

Figure 34:
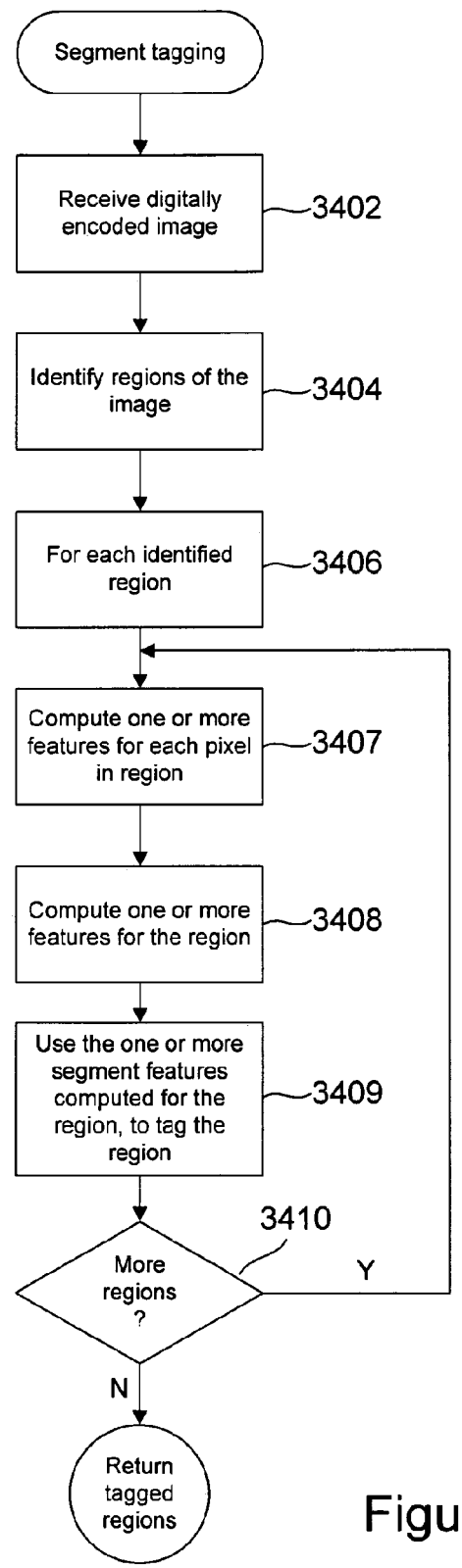
FIG. 34 provides a control-flow diagram for a general perceptual segmentation method that represents a general embodiment of the present invention.

FIG. 34 provides a control-flow diagram for a general perceptual segmentation method that represents a general embodiment of the present invention. First, in step 3402, the routine "segment tagging" receives a digitally encoded image. Next, in step 3404, regions of the image are identified. This step is discussed further, with respect to FIG. 34, below. Then, in the for-loop comprising steps 3406-3410, each region is tagged, or labeled. In each region, one or more pixel features for each pixel of the region are computed or accessed, in step 3407. Of course, any pixel features computed for the pixels of the region in previous steps may be reused, rather than computed de novo. Next, in step 3408, one or more segment features for the region are computed. Again, any segment features computed in previous steps may be reused, rather than computed de novo. Finally, in step 3409, the one or more segment features computed in step 3408 are used in order to determine a tag, or label, for the region. Determination may be made based on rules, such as the above-described rules for recognized blue-sky regions and skin, may be based on a machine-learning method, just as selection by a neural network trained to recognize region types using already tagged segments of a set of images as a training set, or may be based on various hybrid approaches that employ both rules and machine learning. In general, when application of rules or machine-learning decision tools provide an ambiguous result with respect to a region, or, in other words, a single region type cannot be unambiguously determined for the region, any of various disambiguation methods may need to be additionally employed to ascertain the most likely correct label, when disambiguation is possible, or apply a label to the region that indicates that a single region type could not be determined. In certain cases, the order of rule application or of particular machine-learning-method application may be significant, although, in general, the order of rule application or of particular machine-learning-method application is not significant with respect to the region-tagging results produced by method and systems of the present invention.

Figure 35:
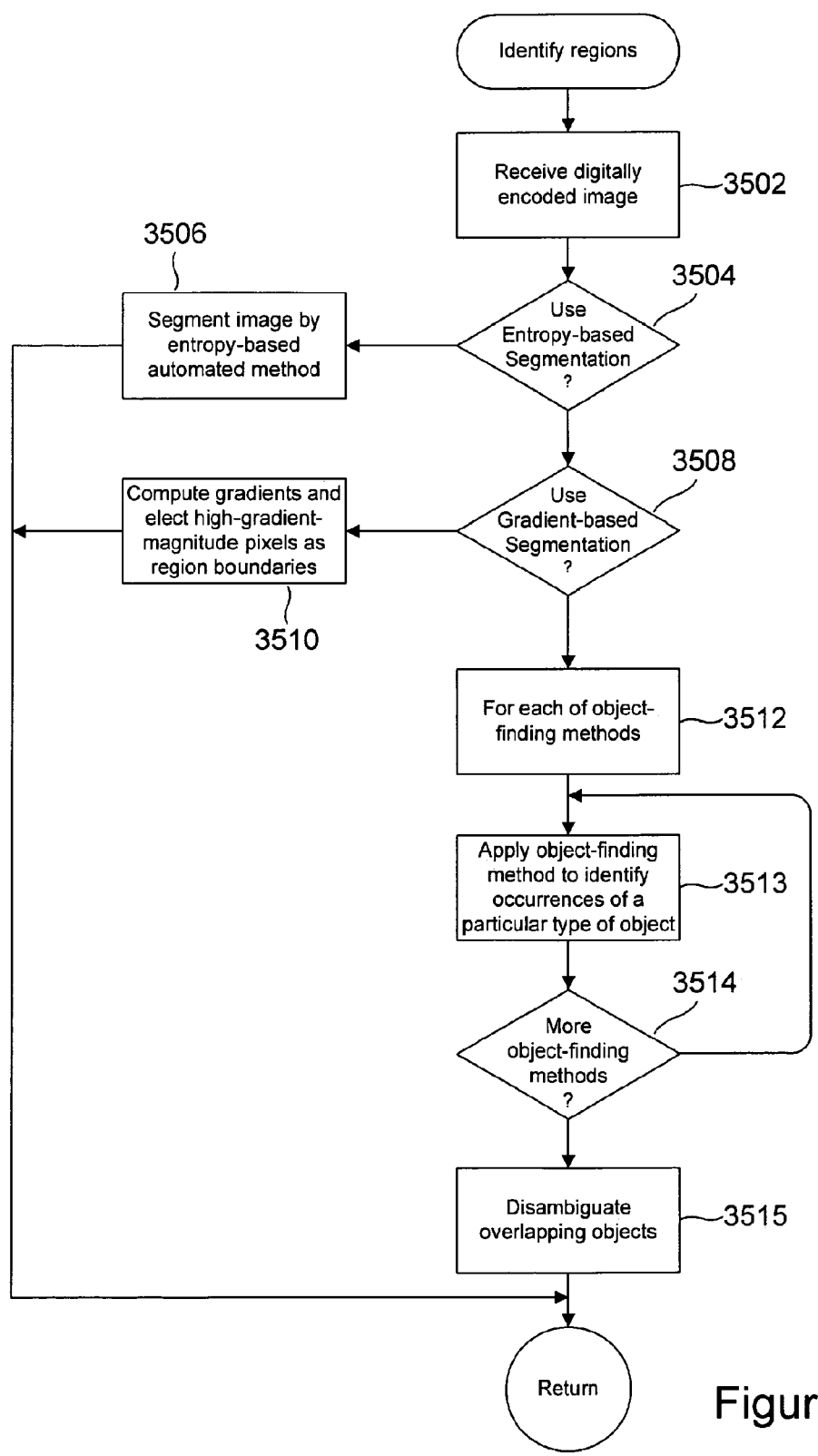
FIG. 35 illustrates a routine for identifying regions within an image.

FIG. 35 illustrates a routine for identifying regions within an image. In step 3502, a digitally encoded image is received. If the automated segmentation method, described above with reference to FIGS. 12A-13C, is to be used, as determined in step 3504, then that method is applied, in step 3506, to segment the image. Otherwise, if a gradient-based segmentation approach is to be used, as determined in step 3508, then local-gradient magnitudes are computed for each pixel and the pixels with greatest local-gradient magnitudes are used as region boundaries in order to segment the image, in step 3510. Otherwise, in the for-loop of steps 3512-3514, each of a number of particular object-finding methods is applied to the image to recognize a particular type of object. An example of such particular object-finding methods include the face-detecting methods described above and blue-sky-region recognition methods based on matching pixel colors to a blue-sky color model. At the conclusion of the for-loop, in step 3515, any overlapping objects identified by the individual object-finding methods may be disambiguated, by comparing non-overlapping to overlapping areas, by metrics for weighting each region of the overlapping regions by evaluating the certainty or probability of the result produced by each object-finding method, or by other means.

Although the present invention has been described in terms of particular embodiments, it is not intended that the invention be limited to these embodiments. Modifications within the spirit of the invention will be apparent to those skilled in the art. For example, any of many different possible implementations may be devised by specifying and altering various programming parameters, including modular organization, control structures used, data structures used, variables employed, programming languages, and operating-system platforms. As discussed above, fewer or a greater number of different types of metrics, statistics, and other computed values may be employed to characterize segments as well as to characterize types of segments. Metrics, models, and statistics may be refined during image analysis and image processing, or may be determined by extensive analysis of image and video databases.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A perceptual-segmentation system, comprising:
   a computer; and
   one or more perceptual-segmentation programs, stored within the computer and executed by the computer, that identify regions within an image;
      for each identified region,
         compute or access each of one or more pixel-feature values for pixels within region,
         using the one or more pixel-feature values computed or accessed for pixels within the region, compute one or more region-feature values, and
         using the one or more region-feature values, determine a region type for the region and associating the region type with the region; and
      store the associations of region types with regions for use in subsequent image-processing tasks;
   wherein the one or more perceptual-segmentation programs, stored within the computer and executed by the computer, identify regions within the image by:
      for each of a number of specific object-identifying methods,
         applying the object-identifying method to locate occurrences of objects of a specific type in the image; and
         disambiguating any regions of overlap of two or more objects identified by the object-identifying methods.

2. The perceptual-segmentation system of claim 1 wherein pixel features associated with a pixel include one or more of:
   one or more intrinsic pixel features, including
      a grayscale value, and
      three values that specify a color of the pixel according to a color model;
   one or more numeric values that specify a spatial location of the pixel within an image;
   a numeric value computed from pixel-feature values of the pixel and additional pixels that are located in a neighborhood of the pixel; and
   a numeric value computed by comparing one or more intrinsic pixel-values with a model or distribution of pixel-feature values.

3. The perceptual-segmentation system of claim 1 wherein segment features associated with a segment or region include one or more of:
   an average, median, or other mathematical value computed from pixel-feature values of pixels within the segment or region;
   an area computed for the segment or region;
   a relative area computed for the segment or region;
   numeric values that specify a position of the segment or region within an image;
   one or more numeric values that indicate an orientation of the region with an image;
   a morphological characteristic computed for the segment or region;
   a value computed by comparing a value computed from pixel-feature values of pixels within the segment or region to a model or distribution;
   a numeric value computed form pixel-feature values of the pixel and additional pixels that are located in a neighborhood of the pixel;
   a numeric value computed by comparing one or more intrinsic pixel-values with a model or distribution of pixel-feature values; and
   a numeric value from segment-feature values of the segment or region and additional segments or regions that are located in a neighborhood of the segment or region.

4. A perceptual-segmentation system, comprising:
   a computer; and
   one or more perceptual-segmentation programs, stored within the computer and executed by the computer, that identify regions within an image;
      for each identified region,
         compute or access each of one or more pixel-feature values for pixels within region,
         using the one or more pixel-feature values computed or accessed for pixels within the region, compute one or more region-feature values, and
         using the one or more region-feature values, determine a region type for the region and associating the region type with the region; and
      store the associations of region types with regions for use in subsequent image-processing tasks;
   wherein the one or more perceptual-segmentation programs, stored within the computer and executed by the computer, compute global statistics for the image;
   wherein the one or more perceptual-segmentation programs, stored within the computer and executed by the computer, compute, for each segment or region of an image:

per-segment statistics,
a probability that the segment corresponds to a blue-sky region of the image, P(blue_sky),
a probability that the segment corresponds to a gray-sky region of the image, P(gray_sky), and
a probability that the segment corresponds to a snow region of the image, P(snow); and
wherein the one or more perceptual-segmentation programs, stored within the computer and executed by the computer, identify and tag segments corresponding to regions of sky in the image using the computed probabilities P(blue_sky), P(gray_sky), and P(snow).

5. The perceptual-segmentation system of claim 4 wherein the probability P(blue_sky) computed for a segment is related to a location of the segment within the image, colors within the segment, a size of the segment, a texture computed for the segment, an intensity computed for the segment, and a correspondence of color changes along two orthogonal traces within the segment to expected color changes for blue sky;
wherein the probability P(gray_sky) computed for a segment is related to a location of the segment within the image, colors within the segment, a size of the segment, a texture computed for the segment, and an intensity computed for the segment; and
wherein the probability P(snow) computed for a segment is related to a location of the segment within the image, colors within the segment, a size of the segment, a texture computed for the segment, and an intensity computed for the segment.

6. The perceptual-segmentation system of claim 5 wherein the one or more perceptual-segmentation programs, stored within the computer and executed by the computer, identify and tag segments corresponding to regions of sky in the image using the computed probabilities P(blue_sky), P(gray_sky), and P(snow) by:
for each segment in the image,
initially tagging the segment as "blue sky" when P(blue_sky) computed for the segment is greater than a threshold and greater than both P(gray_sky) and P(snow),
otherwise initially tagging the segment as "gray sky" when P(gray_sky) computed for the segment is greater than a threshold and greater than P(snow),
otherwise initially tagging the segment as "snow" when P(snow) computed for the segment is greater than a threshold, and
otherwise leaving the segment untagged or, equivalently, tagged as "unknown;" and
selecting a dominant sky color and tagging those segments with a likelihood of representing sky of the dominant sky color greater than a threshold value as sky, while untagging previously tagged segments with a likelihood of representing sky of the dominant sky color less than the threshold value.

7. A perceptual-segmentation system, comprising:
a computer; and
one or more perceptual-segmentation programs, stored within the computer and executed by the computer, that identify regions within an image;
for each identified region,
compute or access each of one or more pixel-feature values for pixels within region,
using the one or more pixel-feature values computed or accessed for pixels within the region, compute one or more region-feature values, and
using the one or more region-feature values, determine a region type for the region and associating the region type with the region; and
store the associations of region types with regions for use in subsequent image-processing tasks;
wherein following associating region types with the identified regions, the one or more perceptual-segmentation programs, for each of one or more particular region types, further:
compute a color model from the regions associated with a the particular region type; and
apply the color model to other regions of the image to identify any additional pixels or regions of the image corresponding to the particular region type as determined by comparing between the color of the other segments and the computed color model.

8. A perceptual-segmentation system, comprising:
a computer; and
one or more perceptual-segmentation programs, stored within the computer and executed by the computer, that identify regions within an image;
for each identified region,
compute or access each of one or more pixel-feature values for pixels within region,
using the one or more pixel-feature values computed or accessed for pixels within the region, compute one or more region-feature values, and
using the one or more region-feature values, determine a region type for the region and associating the region type with the region; and
store the associations of region types with regions for use in subsequent image-processing tasks;
wherein the one or more perceptual-segmentation programs, stored within the computer and executed by the computer, identify segments within an image corresponding to regions in the image that represent human skin and tag the segments by:
detecting faces within the image;
for each detected face,
determining a rectangular region of the image that includes the face,
partitioning the rectangular region into face and non-face partitions based on a general skin-color model and pixel position,
determining a face-specific color model for the face, based on the face partition,
generating a face-skin map for the rectangular region,
generating a body-skin model based on pixels within the rectangular region identified by the face-skin map as corresponding to face skin, and
identifying additional segments within the image corresponding to body-skin regions based on the body-skin model.

9. A perceptual-segmentation system, comprising:
a computer; and
one or more perceptual-segmentation programs, stored within the computer and executed by the computer, that identify regions within an image;
for each identified region,
compute or access each of one or more pixel-feature values for pixels within region,
using the one or more pixel-feature values computed or accessed for pixels within the region, compute one or more region-feature values, and
using the one or more region-feature values, determine a region type for the region and associating the region type with the region; and store the associations of region types with regions for use in subsequent image-processing tasks;

wherein the one or more perceptual-segmentation programs, stored within the computer and executed by the computer, tag segments within an image corresponding to regions in the image that represent foliage by:

for each untagged segment in the image, computing a probability that the segment corresponds to a region of foliage in the image, P(foliage), based on a color model for foliage, computing a probability that the segment corresponds to a region of forest in the image, P(forest), based on a color model for forest, computing a probability that the segment corresponds to a region of ground in the image, P(ground), based on a color model for forest, when P(foliage) is greater than one of P(forest) and P(ground) as well as greater than a threshold value, tagging the segment as foliage, and otherwise tagging the segment based on a computed probability that the segment corresponds to a natural region of the image and not to an artificial region of the image, P(natural), by when P(natural) is greater than a threshold value, P(foliage) is greater than a threshold value, and a computed intensity for the segment is less than a threshold intensity, tagging the segment as foliage, and when P(naturel) is greater than a threshold value, P(forest) is greater than a threshold value, and a computed intensity for the segment is less than a threshold intensity, tagging the segment as foliage.

10. A method, executed by a computer, for perceptual segmentation of an image, comprising:

identifying regions within an image;

for each identified region, computing or accessing each of one or more pixel-feature values for pixels within the region, using the one or more pixel-feature values computed or accessed for pixels within the region to compute one or more region-feature values, and using the one or more region-feature values to determine a region type for the region and associating the region type with the region; and storing, on a non-transitory, computer-readable medium, the associations of region types with regions for use in subsequent image-processing tasks;

wherein identifying the regions within the image is accomplished by:

for each of a number of specific object-identifying methods, applying the object-identifying method to locate occurrences of objects of a specific type in the image; and disambiguating any regions of overlap of two or more objects identified by the object-identifying methods.

11. The method of claim 10 wherein pixel features associated with a pixel include one or more of:

one or more intrinsic pixel features, including:
a grayscale value, and
three values that specify a color of the pixel according to a color model, one or more numeric values that specify a spatial location of the pixel within an image, a numeric value computed from pixel-feature values of the pixel and additional pixels that are located in a neighborhood of the pixel, and a numeric value computed by comparing one or more intrinsic pixel-values with a model or distribution of pixel-feature values;

and wherein segment features associated with a segment or region include one or more of:

an average, median, or other mathematical value computed from pixel-feature values of pixels within the segment or region, an area computed for the segment or region, a relative area computed for the segment or region, numeric values that specify a position of the segment or region within an image, one or more numeric values that indicate an orientation of the region within an image, a morphological characteristic computed for the segment or region, a value computed by comparing a value computed from pixel-feature values of pixels within the segment or region to a model or distribution, a numeric value computed from pixel-feature values of the pixel and additional pixels that are located in a neighborhood of the pixel, a numeric value computed by comparing one or more intrinsic pixel-values with a model or distribution of pixel-feature values, and a numeric value from segment-feature values of the segment or region and additional segments or regions that are located in a neighborhood of the segment or region.

* * * * *

UNITED STATES PATENT AND TRADEMARK OFFICE
CERTIFICATE OF CORRECTION

| | | |
|---|---|---|
| PATENT NO. | : 8,913,831 B2 | Page 1 of 1 |
| APPLICATION NO. | : 13/055118 | |
| DATED | : December 16, 2014 | |
| INVENTOR(S) | : Ruth Bergman et al. | |

It is certified that error appears in the above-identified patent and that said Letters Patent is hereby corrected as shown below:

In the Claims,

In column 30, line 11, in Claim 7, delete "a the" and insert -- the --, therefor.

Signed and Sealed this
Nineteenth Day of May, 2015

Michelle K. Lee
*Director of the United States Patent and Trademark Office*